United States Patent
Chapman et al.

(10) Patent No.: US 8,003,725 B2
(45) Date of Patent: Aug. 23, 2011

(54) PLASTICIZED HETERO-PHASE POLYOLEFIN BLENDS

(75) Inventors: Bryan R. Chapman, Annandale, NJ (US); Jeffrey Valentage, Katy, TX (US); Jared M. Hill, Katy, TX (US); Bruce R. Lundmark, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 875 days.

(21) Appl. No.: 11/504,447

(22) Filed: Aug. 15, 2006

(65) Prior Publication Data

US 2008/0045638 A1 Feb. 21, 2008

Related U.S. Application Data

(63) Continuation-in-part of application No. 10/782,228, filed on Feb. 19, 2004, now Pat. No. 7,531,594, which is a continuation-in-part of application No. 10/640,435, filed on Aug. 12, 2003, now Pat. No. 7,619,026, and a continuation-in-part of application No. 10/634,351, filed on Aug. 4, 2003, now Pat. No. 7,632,887.

(60) Provisional application No. 60/402,665, filed on Aug. 12, 2002.

(51) Int. Cl.
*C08K 3/26* (2006.01)
*C08K 5/01* (2006.01)

(52) U.S. Cl. ........................ 524/425; 524/474

(58) Field of Classification Search .............. 524/425
See application file for complete search history.

(56) References Cited

U.S. PATENT DOCUMENTS

| | | |
|---|---|---|
| 2,567,016 A | 1/1952 | Gessler et al. |
| 2,817,693 A | 12/1957 | Koome et al. |
| 3,149,178 A | 9/1964 | Hamilton et al. |
| 3,201,364 A | 8/1965 | Salyer |
| 3,228,896 A | 1/1966 | Canterino |
| 3,235,529 A | 2/1966 | Nagle |
| 3,239,478 A | 3/1966 | Harlan, Jr. |
| 3,262,992 A | 7/1966 | Holzer et al. |
| 3,281,390 A | 10/1966 | O'Leary, Jr. |
| 3,299,568 A | 1/1967 | Tobolsky |
| 3,308,086 A | 3/1967 | Wartman |
| 3,318,835 A | 5/1967 | Hagemeyer, Jr. et al. |
| 3,338,778 A | 8/1967 | Hutchins et al. |
| 3,361,702 A | 1/1968 | Wartman et al. |
| 3,378,606 A | 4/1968 | Kontos |
| 3,415,925 A | 12/1968 | Marans |
| 3,437,627 A | 4/1969 | Gude et al. |
| 3,439,088 A | 4/1969 | Edman |
| 3,464,949 A | 9/1969 | Wartman et al. |
| 3,475,368 A | 10/1969 | Metz |
| 3,536,796 A | 10/1970 | Rock |
| 3,541,039 A | 11/1970 | Whiton |
| 3,551,943 A | 1/1971 | Staton et al. |
| 3,563,934 A | 2/1971 | Burnett |
| 3,590,528 A | 7/1971 | Shepherd |
| 3,601,370 A | 8/1971 | Rieben |
| 3,686,385 A | 8/1972 | Rohn |
| 3,752,779 A | 8/1973 | Maciejewski |
| 3,818,105 A | 6/1974 | Coopersmith et al. |
| 3,821,148 A | 6/1974 | Makowski et al. |
| 3,828,105 A | 8/1974 | Saurano et al. |
| 3,839,261 A | 10/1974 | Aronoff et al. |
| 3,853,969 A | 12/1974 | Kontos |
| 3,860,543 A | 1/1975 | Masuda et al. |
| 3,882,197 A | 5/1975 | Fritz et al. |
| 3,888,949 A | 6/1975 | Shih |
| 3,894,120 A | 7/1975 | Frese et al. |
| 3,925,504 A | 12/1975 | Koleske et al. |
| 3,925,947 A | 12/1975 | Meyers et al. |
| 3,935,344 A | 1/1976 | Haggerty et al. |
| 3,945,975 A | 3/1976 | Strack |
| 3,957,898 A | 5/1976 | Girotti et al. |
| 3,988,276 A | 10/1976 | Kutch et al. |
| 3,999,707 A | 12/1976 | Nielsen |
| 4,006,115 A | 2/1977 | Elbert |
| 4,010,127 A | 3/1977 | Taka et al. |
| 4,016,118 A | 4/1977 | Hamada et al. |
| 4,038,237 A | 7/1977 | Snyder |
| 4,038,238 A | 7/1977 | Cravens |
| 4,041,002 A | 8/1977 | Aboshi et al. |
| 4,041,103 A | 8/1977 | Davison et al. |
| 4,061,805 A | 12/1977 | Thompson et al. |

(Continued)

FOREIGN PATENT DOCUMENTS

CS 215313 8/1982

(Continued)

OTHER PUBLICATIONS

Jens Stehr, Investigation of the Effects of Poly(α-olefin) Plasticizers on the Properties of Elastomers, KGK, Jan./Feb. 2007, pp. 14-19 (translated from German by McElroy Translation Company.

(Continued)

*Primary Examiner* — Hui Chin
(74) *Attorney, Agent, or Firm* — Catherine L. Bell

(57) ABSTRACT

This invention relates to hetero-phase polyolefin compositions comprising: a) 30 to 99.7 wt % of a polypropylene-based TPO comprising at least 50 wt % propylene and at least 10 wt % ethylene, and b) 0.1 to 20 wt % of one or more non-functionalized plasticizer, and c) 0.2 to 50 wt % of one or more filler; based upon the weight of the composition, and having: i) an MFR of 5 dg/min or more, and ii) a flexural modulus of 500 MPa or more, and iii) a notched Charpy impact strength at −30° C. of 1 kJ/m$^2$ or more or a notched Izod impact strength at −18° C. of 50 J/m or more.

These compositions are especially useful in applications such as automotive parts that demand both high stiffness and high impact toughness, as well as good processibility during fabrication.

139 Claims, No Drawings

U.S. PATENT DOCUMENTS

| | | |
|---|---|---|
| 4,063,002 A | 12/1977 | Wilson, Jr. |
| 4,073,782 A | 2/1978 | Kishi et al. |
| 4,087,505 A | 5/1978 | Sugimoto et al. |
| 4,092,282 A | 5/1978 | Callan |
| 4,094,850 A | 6/1978 | Morgan et al. |
| 4,097,543 A | 6/1978 | Haag et al. |
| 4,104,216 A | 8/1978 | Clampitt |
| 4,110,185 A | 8/1978 | Williams et al. |
| 4,113,802 A | 9/1978 | Matteoli et al. |
| 4,118,359 A | 10/1978 | Brenner |
| 4,118,362 A | 10/1978 | Makowski et al. |
| 4,131,587 A | 12/1978 | Brenner |
| 4,132,698 A | 1/1979 | Gessler et al. |
| 4,136,072 A | 1/1979 | Ladish et al. |
| 4,138,378 A | 2/1979 | Doss |
| 4,147,831 A | 4/1979 | Balinth |
| 4,153,582 A | 5/1979 | Puffr et al. |
| 4,153,588 A | 5/1979 | Makowski et al. |
| 4,153,594 A | 5/1979 | Wilson, Jr. |
| 4,154,244 A | 5/1979 | Becker et al. |
| 4,154,712 A | 5/1979 | Lee, Jr. |
| 4,157,992 A | 6/1979 | Lundberg et al. |
| 4,166,057 A | 8/1979 | Takemori |
| 4,169,822 A | 10/1979 | Kutch et al. |
| 4,170,586 A | 10/1979 | Clampitt et al. |
| 4,175,069 A | 11/1979 | Brenner |
| 4,189,411 A | 2/1980 | Haaf |
| 4,206,101 A | 6/1980 | Wysong |
| 4,207,373 A | 6/1980 | Segal |
| 4,210,570 A | 7/1980 | Trotter et al. |
| 4,221,887 A | 9/1980 | Brenner et al. |
| 4,229,337 A | 10/1980 | Brenner |
| 4,237,083 A | 12/1980 | Young et al. |
| 4,274,932 A | 6/1981 | Williams et al. |
| 4,288,358 A | 9/1981 | Trotter et al. |
| 4,288,480 A | 9/1981 | Grzywinski et al. |
| 4,289,668 A | 9/1981 | Li |
| 4,304,713 A | 12/1981 | Perelman |
| 4,311,628 A | 1/1982 | Abdou-Sabet et al. |
| 4,321,334 A | 3/1982 | Chatterjee |
| 4,322,336 A | 3/1982 | Machurat et al. |
| 4,325,850 A | 4/1982 | Mueller |
| 4,327,007 A | 4/1982 | Vanderkooi, Jr. et al. |
| 4,335,026 A | 6/1982 | Balinth |
| 4,335,034 A | 6/1982 | Zuckerman et al. |
| 4,340,513 A | 7/1982 | Moteki et al. |
| 4,347,332 A | 8/1982 | Odorzynski et al. |
| 4,352,823 A | 10/1982 | Cherukuri et al. |
| 4,358,384 A | 11/1982 | Newcomb |
| 4,369,284 A | 1/1983 | Chen |
| 4,379,169 A | 4/1983 | Reggio et al. |
| 4,387,108 A | 6/1983 | Koch et al. |
| 4,399,248 A | 8/1983 | Singh et al. |
| 4,399,251 A | 8/1983 | Lee |
| 4,403,005 A | 9/1983 | Nevins et al. |
| 4,403,007 A | 9/1983 | Coughlin |
| 4,409,345 A | 10/1983 | Moteki et al. |
| 4,430,289 A | 2/1984 | McKinney et al. |
| 4,434,258 A | 2/1984 | Schumacher et al. |
| 4,438,228 A | 3/1984 | Schenck |
| 4,438,229 A | 3/1984 | Fujimori et al. |
| 4,440,829 A | 4/1984 | Gerace et al. |
| 4,450,250 A | 5/1984 | McConnell et al. |
| 4,451,589 A | 5/1984 | Morman et al. |
| 4,452,820 A | 6/1984 | D'Amelia et al. |
| 4,459,311 A | 7/1984 | DeTora et al. |
| 4,460,729 A | 7/1984 | Books |
| 4,461,872 A | 7/1984 | Su |
| 4,467,010 A | 8/1984 | Shii et al. |
| 4,467,065 A | 8/1984 | Williams et al. |
| 4,469,770 A | 9/1984 | Nelson |
| 4,483,886 A | 11/1984 | Kowalski |
| 4,483,952 A | 11/1984 | Uchiyama |
| 4,497,926 A | 2/1985 | Toy |
| 4,504,604 A | 3/1985 | Pilkington et al. |
| 4,518,615 A | 5/1985 | Cherukuri et al. |
| 4,529,666 A | 7/1985 | Salzburg et al. |
| 4,532,305 A | 7/1985 | Dickinson |
| 4,536,537 A | 8/1985 | Klingensmith et al. |
| 4,542,053 A | 9/1985 | Nevins et al. |
| 4,542,122 A | 9/1985 | Payne et al. |
| 4,551,507 A | 11/1985 | Haylock et al. |
| 4,552,801 A | 11/1985 | Odorzynski et al. |
| 4,568,663 A | 2/1986 | Mauldin |
| 4,579,901 A | 4/1986 | Allen et al. |
| 4,584,215 A | 4/1986 | Bré et al. |
| 4,592,851 A | 6/1986 | Stadtmiller et al. |
| 4,594,172 A | 6/1986 | Sie |
| 4,604,322 A | 8/1986 | Reid |
| 4,616,052 A | 10/1986 | Habibullah |
| 4,621,072 A | 11/1986 | Aratz et al. |
| 4,645,791 A | 2/1987 | Theodore et al. |
| 4,659,757 A | 4/1987 | Okamoto et al. |
| 4,663,220 A | 5/1987 | Wisneski et al. |
| 4,663,305 A | 5/1987 | Mauldin et al. |
| 4,665,130 A | 5/1987 | Hwo |
| 4,666,959 A | 5/1987 | Weissberger et al. |
| 4,666,968 A | 5/1987 | Downey et al. |
| 4,670,341 A | 6/1987 | Lundsager |
| 4,684,682 A | 8/1987 | Lee, Jr. |
| 4,693,838 A | 9/1987 | Varma et al. |
| 4,703,078 A | 10/1987 | Machara et al. |
| 4,726,989 A | 2/1988 | Mrozinski |
| 4,745,143 A | 5/1988 | Mason et al. |
| 4,746,388 A | 5/1988 | Inaba et al. |
| 4,749,734 A | 6/1988 | Williams et al. |
| 4,764,535 A | 8/1988 | Leicht |
| 4,772,657 A | 9/1988 | Akiyama et al. |
| 4,774,277 A | 9/1988 | Janac et al. |
| 4,814,375 A | 3/1989 | Esposito |
| 4,822,688 A | 4/1989 | Nogues |
| 4,824,718 A | 4/1989 | Hwang |
| 4,824,891 A | 4/1989 | Laurent et al. |
| 4,827,064 A | 5/1989 | Wu |
| 4,827,073 A | 5/1989 | Wu |
| 4,833,172 A | 5/1989 | Schwarz et al. |
| 4,833,192 A | 5/1989 | Adur et al. |
| 4,840,988 A | 6/1989 | Nakayama et al. |
| 4,845,137 A | 7/1989 | Williams et al. |
| 4,853,428 A | 8/1989 | Jaffe |
| 4,863,785 A | 9/1989 | Berman et al. |
| 4,897,178 A | 1/1990 | Best et al. |
| 4,897,452 A | 1/1990 | Berrier et al. |
| 4,900,407 A | 2/1990 | Saito et al. |
| 4,904,731 A | 2/1990 | Holden et al. |
| 4,906,350 A | 3/1990 | Lucien et al. |
| 4,912,148 A | 3/1990 | Kim et al. |
| 4,914,145 A | 4/1990 | Tohdoh et al. |
| 4,919,992 A | 4/1990 | Blundell et al. |
| 4,921,594 A | 5/1990 | Miller |
| 4,921,749 A | 5/1990 | Bossaert et al. |
| 4,923,588 A | 5/1990 | Cody et al. |
| 4,937,399 A | 6/1990 | Wachter et al. |
| 4,939,040 A | 7/1990 | Oreglia et al. |
| 4,943,672 A | 7/1990 | Hamner et al. |
| 4,948,840 A | 8/1990 | Berta |
| 4,952,457 A | 8/1990 | Cartier et al. |
| 4,957,958 A | 9/1990 | Schleifstein |
| 4,959,285 A | 9/1990 | Hoffmann |
| 4,959,396 A | 9/1990 | Yankov et al. |
| 4,959,402 A | 9/1990 | Williams et al. |
| 4,960,820 A | 10/1990 | Hwo |
| 4,975,177 A | 12/1990 | Garwood et al. |
| 4,994,552 A | 2/1991 | Williams et al. |
| 4,995,884 A | 2/1991 | Ross et al. |
| 4,996,094 A | 2/1991 | Dutt |
| 5,026,756 A | 6/1991 | Arendt |
| 5,028,647 A | 7/1991 | Haylock et al. |
| 5,049,605 A | 9/1991 | Rekers |
| 5,075,269 A | 12/1991 | Degnan et al. |
| 5,076,988 A | 12/1991 | Rifi |
| 5,079,273 A | 1/1992 | Kuroda et al. |
| 5,079,287 A | 1/1992 | Takeshi et al. |
| 5,080,942 A | 1/1992 | Yau |
| 5,091,454 A | 2/1992 | Arendt |
| 5,093,197 A | 3/1992 | Howard et al. |
| 5,105,038 A | 4/1992 | Chen et al. |

| | | | | | | |
|---|---|---|---|---|---|---|
| 5,106,447 A | 4/1992 | Di Rado et al. | | 5,696,045 A | 12/1997 | Winter et al. |
| 5,106,899 A | 4/1992 | Maresca | | 5,698,650 A | 12/1997 | Jourdain et al. |
| 5,114,763 A | 5/1992 | Brant et al. | | 5,700,312 A | 12/1997 | Fausnight et al. |
| 5,116,626 A | 5/1992 | Synosky et al. | | 5,723,217 A | 3/1998 | Stahl et al. |
| 5,124,384 A | 6/1992 | Goldstein | | 5,726,103 A | 3/1998 | Stahl et al. |
| 5,143,978 A | 9/1992 | Berta | | 5,726,239 A | 3/1998 | Maes et al. |
| 5,149,736 A | 9/1992 | Gamarra | | 5,728,754 A | 3/1998 | Lakshmanan et al. |
| 5,162,436 A | 11/1992 | Davis et al. | | 5,728,760 A | 3/1998 | Rose et al. |
| 5,171,628 A | 12/1992 | Arvedson et al. | | 5,736,197 A | 4/1998 | Gaveske |
| 5,171,908 A | 12/1992 | Rudnick | | 5,736,465 A | 4/1998 | Stahl et al. |
| 5,173,317 A | 12/1992 | Hartman et al. | | 5,739,200 A | 4/1998 | Cheung et al. |
| 5,180,865 A | 1/1993 | Heilman et al. | | 5,741,563 A | 4/1998 | Mehta et al. |
| 5,185,398 A | 2/1993 | Kehr et al. | | 5,741,840 A | 4/1998 | Lindquist et al. |
| 5,206,276 A | 4/1993 | Lee, Jr. | | 5,747,573 A | 5/1998 | Ryan |
| 5,213,744 A | 5/1993 | Bossaert | | 5,753,773 A | 5/1998 | Langhauser et al. |
| 5,230,843 A | 7/1993 | Howard et al. | | 5,763,080 A | 6/1998 | Stahl et al. |
| 5,231,128 A | 7/1993 | Nakata et al. | | 5,776,589 A | 7/1998 | Mace et al. |
| 5,238,735 A | 8/1993 | Nagou et al. | | 5,783,531 A | 7/1998 | Andrew et al. |
| 5,240,966 A | 8/1993 | Iwasaki et al. | | 5,786,418 A | 7/1998 | Strelow et al. |
| 5,250,628 A | 10/1993 | Seguela et al. | | 5,789,529 A | 8/1998 | Matsumura et al. |
| 5,254,378 A | 10/1993 | Krueger et al. | | 5,804,630 A | 9/1998 | Heyer et al. |
| 5,256,717 A | 10/1993 | Stauffer et al. | | 5,834,562 A | 11/1998 | Silvestri et al. |
| 5,258,419 A | 11/1993 | Rolando et al. | | 5,837,769 A | 11/1998 | Graafland et al. |
| 5,264,277 A | 11/1993 | Frognet et al. | | 5,849,806 A | 12/1998 | St. Clair et al. |
| 5,264,474 A | 11/1993 | Schleifstein et al. | | 5,869,555 A | 2/1999 | Simmons et al. |
| 5,264,493 A | 11/1993 | Palate et al. | | 5,869,560 A | 2/1999 | Kobayashi et al. |
| 5,278,220 A | 1/1994 | Vermeire et al. | | 5,869,562 A | 2/1999 | Lindquist et al. |
| 5,286,500 A | 2/1994 | Synosky et al. | | 5,872,183 A | 2/1999 | Bonnet et al. |
| 5,290,635 A | 3/1994 | Matsumura et al. | | 5,891,814 A | 4/1999 | Richeson et al. |
| 5,290,886 A | 3/1994 | Ellul | | 5,891,946 A | 4/1999 | Nohara et al. |
| 5,298,561 A | 3/1994 | Cecchin et al. | | 5,906,727 A | 5/1999 | Wittenbrink et al. |
| 5,308,395 A | 5/1994 | Burditt et al. | | 5,908,412 A | 6/1999 | Beger |
| 5,308,904 A | 5/1994 | Fujii et al. | | 5,910,362 A | 6/1999 | Aratake et al. |
| 5,312,856 A | 5/1994 | Hert et al. | | 5,916,953 A | 6/1999 | Jacoby et al. |
| 5,324,580 A | 6/1994 | Allan et al. | | 5,916,959 A | 6/1999 | Lindquist et al. |
| 5,331,047 A | 7/1994 | Giacobbe | | 5,925,707 A | 7/1999 | Shafer et al. |
| 5,340,848 A | 8/1994 | Asanuma et al. | | 5,929,147 A | 7/1999 | Pierick et al. |
| 5,350,817 A | 9/1994 | Winter et al. | | 5,939,483 A | 8/1999 | Kueppers |
| 5,356,709 A | 10/1994 | Woo et al. | | 5,948,557 A | 9/1999 | Ondeck et al. |
| 5,356,948 A | 10/1994 | Payne, Jr. et al. | | 5,959,006 A | 9/1999 | Pungtrakul |
| 5,356,986 A | 10/1994 | Stewart et al. | | 5,968,455 A | 10/1999 | Brickley |
| 5,360,868 A | 11/1994 | Mosier et al. | | 5,969,021 A | 10/1999 | Reddy et al. |
| 5,376,716 A | 12/1994 | Nayak et al. | | 5,994,482 A | 11/1999 | Pungtrakul |
| 5,389,711 A | 2/1995 | Westbrook et al. | | 5,998,547 A | 12/1999 | Hohner |
| 5,397,832 A | 3/1995 | Ellul | | 6,001,455 A | 12/1999 | Nishio et al. |
| 5,409,041 A | 4/1995 | Yoshida et al. | | 6,010,588 A | 1/2000 | Stahl et al. |
| 5,412,020 A | 5/1995 | Yamamoto et al. | | 6,013,727 A | 1/2000 | Dharmarajan et al. |
| 5,415,791 A | 5/1995 | Chou et al. | | 6,017,615 A | 1/2000 | Thakker et al. |
| 5,424,080 A | 6/1995 | Synosky et al. | | 6,017,986 A | 1/2000 | Burton |
| 5,437,877 A | 8/1995 | Synosky et al. | | 6,025,448 A | 2/2000 | Swindoll et al. |
| 5,442,004 A | 8/1995 | Sutherland et al. | | 6,027,557 A | 2/2000 | Hayner |
| 5,453,318 A | 9/1995 | Giacobbe | | 6,027,674 A | 2/2000 | Yates |
| 5,459,193 A | 10/1995 | Anderson et al. | | 6,037,384 A | 3/2000 | Kakizawa et al. |
| 5,462,754 A | 10/1995 | Synosky et al. | | 6,042,902 A | 3/2000 | Kuder et al. |
| 5,462,981 A | 10/1995 | Bastioli et al. | | 6,045,922 A | 4/2000 | Janssen et al. |
| 5,476,914 A | 12/1995 | Ewen et al. | | 6,060,561 A | 5/2000 | Wolfschwenger et al. |
| 5,482,780 A | 1/1996 | Wilkie et al. | | 6,069,196 A | 5/2000 | Akao et al. |
| 5,489,646 A | 2/1996 | Tatman et al. | | 6,077,899 A | 6/2000 | Yatsuyanagi et al. |
| 5,492,943 A | 2/1996 | Stempel | | 6,080,301 A | 6/2000 | Berlowitz et al. |
| 5,494,962 A | 2/1996 | Gauthy et al. | | 6,080,818 A | 6/2000 | Thakker et al. |
| 5,504,172 A | 4/1996 | Imuta et al. | | 6,084,031 A | 7/2000 | Medsker et al. |
| 5,512,625 A | 4/1996 | Butterbach et al. | | 6,086,996 A | 7/2000 | Rancich et al. |
| 5,548,008 A | 8/1996 | Asanuma et al. | | 6,090,081 A | 7/2000 | Sudo et al. |
| 5,552,482 A | 9/1996 | Berta | | 6,090,989 A | 7/2000 | Trewella et al. |
| 5,563,222 A | 10/1996 | Fukuda et al. | | 6,096,420 A | 8/2000 | Wilhoit et al. |
| 5,569,693 A | 10/1996 | Doshi et al. | | 6,107,240 A | 8/2000 | Wu et al. |
| 5,591,817 A | 1/1997 | Asanuma et al. | | 6,111,039 A | 8/2000 | Miro et al. |
| 5,594,074 A | 1/1997 | Hwo et al. | | 6,114,457 A | 9/2000 | Markel et al. |
| 5,601,858 A | 2/1997 | Mansukhani et al. | | 6,124,428 A | 9/2000 | Schmieg et al. |
| 5,610,217 A | 3/1997 | Yarnell et al. | | 6,127,444 A | 10/2000 | Kadri |
| 5,614,297 A | 3/1997 | Velazquez | | 6,133,414 A | 10/2000 | Pfaendaer et al. |
| 5,624,627 A | 4/1997 | Yagi et al. | | 6,143,818 A | 11/2000 | Huang et al. |
| 5,624,986 A | 4/1997 | Bunnelle et al. | | 6,143,846 A | 11/2000 | Herrmann et al. |
| 5,652,308 A | 7/1997 | Merrill et al. | | 6,147,180 A | 11/2000 | Markel et al. |
| 5,663,230 A | 9/1997 | Haman | | 6,153,703 A | 11/2000 | Lustiger et al. |
| 5,681,897 A | 10/1997 | Silvis et al. | | 6,165,599 A | 12/2000 | Demeuse |
| 5,683,634 A | 11/1997 | Fujii et al. | | 6,165,949 A | 12/2000 | Berlowitz et al. |
| 5,683,815 A | 11/1997 | Leiss | | 6,177,190 B1 | 1/2001 | Gehlsen et al. |
| 5,688,850 A | 11/1997 | Wyffels | | 6,184,326 B1 | 2/2001 | Razavi et al. |

| | | |
|---|---|---|
| 6,184,327 B1 | 2/2001 | Weng et al. |
| 6,187,449 B1 | 2/2001 | Sasaki et al. |
| 6,190,769 B1 | 2/2001 | Wang |
| 6,191,078 B1 | 2/2001 | Shlomo et al. |
| 6,194,498 B1 | 2/2001 | Anderson et al. |
| 6,197,285 B1 | 3/2001 | Kowalik et al. |
| 6,207,606 B1 | 3/2001 | Lue et al. |
| 6,207,754 B1 | 3/2001 | Yu |
| 6,225,432 B1 | 5/2001 | Weng et al. |
| 6,228,171 B1 | 5/2001 | Shirakawa |
| 6,231,936 B1 | 5/2001 | Kozimor et al. |
| 6,231,970 B1 | 5/2001 | Andersen et al. |
| 6,245,856 B1 | 6/2001 | Kaufman et al. |
| 6,245,870 B1 | 6/2001 | Razavi |
| 6,258,903 B1 | 7/2001 | Mawson et al. |
| 6,271,294 B1 | 8/2001 | Lasson et al. |
| 6,271,323 B1 | 8/2001 | Loveday et al. |
| 6,288,171 B2 | 9/2001 | Finerman et al. |
| 6,294,631 B1 | 9/2001 | Brant |
| 6,297,301 B1 | 10/2001 | Erderly et al. |
| 6,303,067 B1 | 10/2001 | Wong et al. |
| 6,310,134 B1 | 10/2001 | Templeton et al. |
| 6,316,068 B1 | 11/2001 | Masubuchi et al. |
| 6,326,426 B1 | 12/2001 | Ellul |
| 6,329,468 B1 | 12/2001 | Wang |
| 6,337,364 B1 | 1/2002 | Sakaki et al. |
| 6,340,703 B1 | 1/2002 | Kelly |
| 6,342,209 B1 | 1/2002 | Patil et al. |
| 6,342,320 B2 | 1/2002 | Liu et al. |
| 6,342,565 B1 | 1/2002 | Cheng et al. |
| 6,342,566 B2 | 1/2002 | Burkhardt et al. |
| 6,342,574 B1 | 1/2002 | Weng et al. |
| 6,348,563 B1 | 2/2002 | Fukuda et al. |
| 6,362,252 B1 | 3/2002 | Prutkin |
| 6,372,379 B1 | 4/2002 | Samii et al. |
| 6,372,847 B1 | 4/2002 | Wouters |
| 6,380,292 B1 | 4/2002 | Gibes et al. |
| 6,383,634 B1 | 5/2002 | Kornfeldt et al. |
| 6,384,115 B1 | 5/2002 | Van Gysel et al. |
| 6,388,013 B1 | 5/2002 | Saraf et al. |
| 6,399,200 B1 | 6/2002 | Sugimoto et al. |
| 6,399,707 B1 | 6/2002 | Meka et al. |
| 6,403,692 B1 | 6/2002 | Traugott et al. |
| 6,410,200 B1 | 6/2002 | Williams et al. |
| 6,413,458 B1 | 7/2002 | Pearce |
| 6,423,800 B1 | 7/2002 | Musgrave |
| 6,448,338 B1 | 9/2002 | Born et al. |
| 6,448,349 B1 | 9/2002 | Razavi |
| 6,451,915 B1 | 9/2002 | Ellul et al. |
| 6,465,109 B2 | 10/2002 | Ohtsuka |
| 6,476,135 B1 | 11/2002 | Bugada et al. |
| 6,482,281 B1 | 11/2002 | Schmidt |
| 6,498,213 B2 | 12/2002 | Jeong et al. |
| 6,500,563 B1 | 12/2002 | Datta et al. |
| 6,503,588 B1 | 1/2003 | Hayashi et al. |
| 6,509,128 B1 | 1/2003 | Everaerts et al. |
| 6,515,231 B1 | 2/2003 | Strobech et al. |
| 6,525,157 B2 | 2/2003 | Cozewith et al. |
| 6,531,214 B2 | 3/2003 | Carter et al. |
| 6,538,066 B2 | 3/2003 | Watanabe et al. |
| 6,559,232 B2 | 5/2003 | Inoue et al. |
| 6,583,076 B1 | 6/2003 | Pekrul et al. |
| 6,583,207 B2 | 6/2003 | Stanhope et al. |
| 6,610,768 B1 | 8/2003 | Jelenic et al. |
| 6,620,892 B1 | 9/2003 | Bertin et al. |
| 6,623,847 B2 | 9/2003 | Yates |
| 6,627,723 B2 | 9/2003 | Karandinos et al. |
| 6,632,385 B2 | 10/2003 | Kauschke et al. |
| 6,632,974 B1 | 10/2003 | Suzuki et al. |
| 6,635,715 B1 | 10/2003 | Datta et al. |
| 6,639,020 B1 | 10/2003 | Brant |
| 6,642,316 B1 | 11/2003 | Datta et al. |
| 6,653,385 B2 | 11/2003 | Lynch et al. |
| 6,656,385 B2 | 12/2003 | Lynch et al. |
| 6,659,965 B1 | 12/2003 | Kensey et al. |
| 6,706,828 B2 | 3/2004 | DiMaio |
| 6,720,376 B2 | 4/2004 | Itoh et al. |
| 6,730,739 B2 | 5/2004 | Gipson |
| 6,730,754 B2 | 5/2004 | Resconi et al. |
| 6,747,114 B2 | 6/2004 | Karandinos et al. |
| 6,750,284 B1 | 6/2004 | Dharmarajan et al. |
| 6,750,292 B2 | 6/2004 | Dozeman et al. |
| 6,750,306 B2 | 6/2004 | Brant |
| 6,753,373 B2 | 6/2004 | Winowiecki |
| 6,787,593 B2 | 9/2004 | Bell et al. |
| 6,803,103 B2 | 10/2004 | Kauschke et al. |
| 6,803,415 B1 | 10/2004 | Mikielski et al. |
| 6,818,704 B2 | 11/2004 | Brant |
| 6,855,777 B2 | 2/2005 | McLoughlin et al. |
| 6,858,767 B1 | 2/2005 | DiMaio et al. |
| 6,861,143 B2 | 3/2005 | Castellani et al. |
| 6,867,253 B1 | 3/2005 | Chen |
| 6,875,485 B2 | 4/2005 | Kanai et al. |
| 6,887,941 B2 | 5/2005 | Zhou |
| 6,887,944 B2 | 5/2005 | Wakabayashi et al. |
| 6,900,147 B2 | 5/2005 | Morman et al. |
| 6,905,760 B1 | 6/2005 | Mukohara et al. |
| 6,906,160 B2 | 6/2005 | Stevens et al. |
| 6,916,882 B2 | 7/2005 | Brant |
| 6,921,794 B2 | 7/2005 | Cozewith et al. |
| 6,984,696 B2 | 1/2006 | Curry et al. |
| 7,015,283 B2 | 3/2006 | Schauder et al. |
| 7,037,989 B2 | 5/2006 | Kacker et al. |
| 7,049,356 B2 | 5/2006 | Itoh et al. |
| 6,992,131 B2 | 6/2006 | Faissat et al. |
| 6,992,146 B2 | 6/2006 | McLoughlin et al. |
| 7,153,571 B2 | 12/2006 | Allermann |
| 7,223,822 B2 | 5/2007 | Abhari et al. |
| 7,226,977 B2 | 6/2007 | Kim et al. |
| 7,238,747 B2 | 7/2007 | Brant |
| 7,271,209 B2 | 9/2007 | Li et al. |
| 7,294,681 B2 | 11/2007 | Jiang et al. |
| 7,319,077 B2 | 1/2008 | Mehta et al. |
| 7,365,137 B2 | 4/2008 | Resconi et al. |
| 7,413,784 B2 | 8/2008 | Ouhadi |
| 7,459,635 B2 | 12/2008 | Belli et al. |
| 7,470,740 B2 | 12/2008 | Givord et al. |
| 7,476,710 B2 | 1/2009 | Mehta et al. |
| 7,524,910 B2 | 4/2009 | Jiang et al. |
| 7,531,594 B2 | 5/2009 | Lin et al. |
| 7,541,402 B2 | 6/2009 | Abhari et al. |
| 7,595,365 B2 | 9/2009 | Kappes et al. |
| 7,615,589 B2 | 11/2009 | Westwood et al. |
| 7,619,026 B2 | 11/2009 | Yang et al. |
| 7,619,027 B2 | 11/2009 | Lundmark et al. |
| 7,622,523 B2 | 11/2009 | Li et al. |
| 7,629,416 B2 | 12/2009 | Li et al. |
| 7,632,887 B2 | 12/2009 | Lin et al. |
| 7,645,829 B2 | 1/2010 | Tse et al. |
| 7,652,092 B2 | 1/2010 | Tse et al. |
| 7,652,093 B2 | 1/2010 | Yang et al. |
| 7,652,094 B2 | 1/2010 | Lin et al. |
| 7,662,885 B2 | 2/2010 | Coffey et al. |
| 7,683,129 B2 | 3/2010 | Mehta et al. |
| 2001/0007896 A1 | 7/2001 | Agarwal et al. |
| 2001/0051265 A1 | 12/2001 | Williams et al. |
| 2001/0056159 A1 | 12/2001 | Jeong et al. |
| 2002/0007696 A1 | 1/2002 | Peyre |
| 2002/0010257 A1 | 1/2002 | Templeton et al. |
| 2002/0049276 A1 | 4/2002 | Zwick |
| 2002/0050124 A1 | 5/2002 | Jaeger |
| 2002/0077409 A1 | 6/2002 | Sakaki et al. |
| 2002/0082328 A1 | 6/2002 | Yu et al. |
| 2002/0147266 A1 | 10/2002 | Rawlinson et al. |
| 2002/0155267 A1 | 10/2002 | Bader |
| 2002/0160137 A1 | 10/2002 | Varma |
| 2002/0168518 A1 | 11/2002 | Bond et al. |
| 2002/0183429 A1 | 12/2002 | Itoh et al. |
| 2002/0188057 A1 | 12/2002 | Chen |
| 2003/0004266 A1 | 1/2003 | Kitazaki et al. |
| 2003/0022977 A1 | 1/2003 | Hall |
| 2003/0032696 A1 | 2/2003 | Sime et al. |
| 2003/0035951 A1 | 2/2003 | Magill et al. |
| 2003/0036577 A1 | 2/2003 | Hughes et al. |
| 2003/0036592 A1 | 2/2003 | Longmoore et al. |
| 2003/0060525 A1 | 3/2003 | Gupta |
| 2003/0060557 A1 | 3/2003 | Tasaka et al. |
| 2003/0091803 A1 | 5/2003 | Bond et al. |

| Publication | Date | Inventor |
|---|---|---|
| 2003/0092826 A1 | 5/2003 | Pearce |
| 2003/0100238 A1 | 5/2003 | Morman et al. |
| 2003/0119988 A1 | 6/2003 | Johnson et al. |
| 2003/0130430 A1 | 7/2003 | Cozewith et al. |
| 2003/0134552 A1 | 7/2003 | Mehawej et al. |
| 2003/0144415 A1 | 7/2003 | Wang et al. |
| 2003/0157859 A1 | 8/2003 | Ishikawa |
| 2003/0181575 A1 | 9/2003 | Schmidt et al. |
| 2003/0181584 A1 | 9/2003 | Handlin, Jr. et al. |
| 2003/0187081 A1 | 10/2003 | Cui |
| 2003/0204017 A1 | 10/2003 | Stevens et al. |
| 2003/0213938 A1 | 11/2003 | Farley et al. |
| 2004/0030287 A1 | 2/2004 | Matthijs et al. |
| 2004/0034148 A1 | 2/2004 | Kelly et al. |
| 2004/0038058 A1 | 2/2004 | Zhou |
| 2004/0054040 A1 | 3/2004 | Lin et al. |
| 2004/0054086 A1 | 3/2004 | Schauder et al. |
| 2004/0063806 A1 | 4/2004 | Kaarnakari |
| 2004/0070653 A1 | 4/2004 | Mashita et al. |
| 2004/0091631 A1 | 5/2004 | Belli et al. |
| 2004/0106723 A1 | 6/2004 | Yang et al. |
| 2004/0116515 A1 | 6/2004 | Anderson et al. |
| 2004/0122388 A1 | 6/2004 | McCormack et al. |
| 2004/0186214 A1 | 9/2004 | Li et al. |
| 2004/0214498 A1 | 10/2004 | Webb et al. |
| 2004/0241309 A1 | 12/2004 | Garnier |
| 2004/0249046 A1 | 12/2004 | Abhari et al. |
| 2004/0260001 A1* | 12/2004 | Lin et al. ............ 524/474 |
| 2004/0266948 A1 | 12/2004 | Jacob et al. |
| 2005/0009993 A1 | 1/2005 | Morioka et al. |
| 2005/0018983 A1 | 1/2005 | Brown et al. |
| 2005/0043484 A1 | 2/2005 | Wang et al. |
| 2005/0101210 A1 | 5/2005 | Bindschedler et al. |
| 2005/0106978 A1 | 5/2005 | Cheng et al. |
| 2005/0107534 A1 | 5/2005 | Datta et al. |
| 2005/0130544 A1 | 6/2005 | Cheng et al. |
| 2005/0170117 A1 | 8/2005 | Cleveland et al. |
| 2005/0215717 A1 | 9/2005 | Dozeman |
| 2005/0222861 A1 | 10/2005 | Silverman et al. |
| 2005/0250894 A1 | 11/2005 | Null |
| 2005/0262464 A1 | 11/2005 | Esch, Jr. et al. |
| 2005/0271851 A1 | 12/2005 | Shibatou et al. |
| 2005/0277738 A1 | 12/2005 | Hoyweghen et al. |
| 2006/0008643 A1 | 1/2006 | Lin et al. |
| 2006/0020067 A1 | 1/2006 | Brant et al. |
| 2006/0079617 A1 | 4/2006 | Kappes et al. |
| 2006/0100347 A1 | 5/2006 | Ouhadi et al. |
| 2006/0100379 A1 | 5/2006 | Ouhadi |
| 2006/0135699 A1 | 6/2006 | Li et al. |
| 2006/0167184 A1 | 7/2006 | Waddell et al. |
| 2006/0173123 A1 | 8/2006 | Yang et al. |
| 2006/0183860 A1 | 8/2006 | Mehta et al. |
| 2006/0247331 A1 | 11/2006 | Coffey et al. |
| 2006/0247332 A1 | 11/2006 | Coffey et al. |
| 2006/0264557 A1* | 11/2006 | Lustiger et al. ............ 524/451 |
| 2006/0293460 A1 | 12/2006 | Jacob et al. |
| 2007/0021560 A1 | 1/2007 | Tse et al. |
| 2007/0021561 A1 | 1/2007 | Bichler et al. |
| 2007/0072980 A1* | 3/2007 | Rainer et al. ............ 524/445 |
| 2007/0167553 A1 | 7/2007 | Westwood et al. |
| 2007/0203273 A1* | 8/2007 | Van Riel et al. ............ 524/232 |
| 2007/0240605 A1 | 10/2007 | Iyer et al. |
| 2008/0045638 A1 | 2/2008 | Chapman et al. |
| 2008/0070994 A1 | 3/2008 | Li et al. |
| 2008/0177123 A1 | 7/2008 | Blais et al. |
| 2008/0221274 A1 | 9/2008 | Jourdain |
| 2008/0227919 A9 | 9/2008 | Li et al. |
| 2008/0234157 A1 | 9/2008 | Yoon et al. |
| 2008/0268272 A1 | 10/2008 | Jourdain |
| 2008/0317990 A1 | 12/2008 | Runyan et al. |
| 2009/0003781 A1 | 1/2009 | Parris et al. |
| 2009/0043049 A1 | 2/2009 | Chapman et al. |
| 2009/0062429 A9 | 3/2009 | Coffey et al. |
| 2009/0171001 A1 | 7/2009 | Lin et al. |
| 2009/0197995 A1 | 8/2009 | Tracey et al. |
| 2010/0036038 A1 | 2/2010 | Rodgers et al. |

FOREIGN PATENT DOCUMENTS

| | | |
|---|---|---|
| DE | 1961981 | 7/1970 |
| DE | 1921649 | 11/1970 |
| DE | 2019945 | 11/1971 |
| DE | 1769723 | 2/1972 |
| DE | 2108293 | 8/1972 |
| DE | 2632957 | 1/1978 |
| DE | 3735502 | 5/1989 |
| DE | 3911725 | 10/1990 |
| DE | 4417191 | 8/1995 |
| DE | 4420991 | 12/1995 |
| DE | 19841303 | 3/2000 |
| EP | 0 210 733 | 2/1972 |
| EP | 0 039 126 | 11/1981 |
| EP | 0 046 536 | 3/1982 |
| EP | 0 083 049 | 7/1983 |
| EP | 0 087 294 | 8/1983 |
| EP | 0 097 969 | 1/1984 |
| EP | 0 050 548 | 1/1985 |
| EP | 0 058 331 | 6/1985 |
| EP | 0 058 404 | 1/1986 |
| EP | 0 168 923 | 1/1986 |
| EP | 0 214 112 | 3/1987 |
| EP | 0 217 516 | 4/1987 |
| EP | 0 073 042 | 10/1987 |
| EP | 0 240 563 | 10/1987 |
| EP | 0 255 735 | 2/1988 |
| EP | 0 332 802 | 3/1988 |
| EP | 0 315 363 | 10/1988 |
| EP | 0 299 718 | 1/1989 |
| EP | 0 300 682 | 1/1989 |
| EP | 0 300 689 | 1/1989 |
| EP | 0 308 286 | 3/1989 |
| EP | 0 321 868 | 6/1989 |
| EP | 0 322 169 | 6/1989 |
| EP | 0 315 481 | 8/1989 |
| EP | 0 326 753 | 8/1989 |
| EP | 0 343 943 | 11/1989 |
| EP | 0 344 014 | 11/1989 |
| EP | 0 369 164 | 5/1990 |
| EP | 0 374 695 | 6/1990 |
| EP | 0 389 695 | 10/1990 |
| EP | 0 400 333 | 12/1990 |
| EP | 0 404 011 | 12/1990 |
| EP | 0 407 098 | 1/1991 |
| EP | 0 409 155 | 1/1991 |
| EP | 0 416 939 | 3/1991 |
| EP | 0 428 153 | 5/1991 |
| EP | 0 431 475 | 6/1991 |
| EP | 0 448 259 | 9/1991 |
| EP | 0 462 574 | 12/1991 |
| EP | 0 464 546 | 1/1992 |
| EP | 0 464 547 | 1/1992 |
| EP | 0 476 401 | 3/1992 |
| EP | 0 476 700 | 3/1992 |
| EP | 0 477 748 | 4/1992 |
| EP | 0 513 470 | 11/1992 |
| EP | 0 548 040 | 6/1993 |
| EP | 0 565 073 | 10/1993 |
| EP | 0 583 836 | 2/1994 |
| EP | 0 604 917 | 7/1994 |
| EP | 0 614 939 | 9/1994 |
| EP | 0 617 077 | 9/1994 |
| EP | 0 618 261 | 10/1994 |
| EP | 0 622 432 | 11/1994 |
| EP | 0 629 631 | 12/1994 |
| EP | 0 629 632 | 12/1994 |
| EP | 0 654 070 | 5/1995 |
| EP | 0 664 315 | 7/1995 |
| EP | 0 677 548 | 10/1995 |
| EP | 0 682 074 | 11/1995 |
| EP | 0 373 660 | 2/1996 |
| EP | 0 699 519 | 3/1996 |
| EP | 0 716 124 | 6/1996 |
| EP | 0 733 677 | 9/1996 |
| EP | 0 742 227 | 11/1996 |
| EP | 0 755 970 | 1/1997 |
| EP | 0 757 076 | 2/1997 |
| EP | 0 774 347 | 5/1997 |

| | | | | | | |
|---|---|---|---|---|---|---|
| EP | 0 801 104 | 10/1997 | | JP | 62-132943 | 6/1987 |
| EP | 0 827 526 | 3/1998 | | JP | 62-223245 | 10/1987 |
| EP | 0 886 656 | 12/1998 | | JP | 63-251436 | 10/1988 |
| EP | 0 902 051 | 3/1999 | | JP | 64-016638 | 1/1989 |
| EP | 0 909 280 | 4/1999 | | JP | 64-017495 | 1/1989 |
| EP | 0 940 433 | 9/1999 | | JP | 64-066253 | 3/1989 |
| EP | 0 969 043 | 1/2000 | | JP | 01-106628 | 4/1989 |
| EP | 0 990 675 | 5/2000 | | JP | 01-152448 | 6/1989 |
| EP | 1 002 814 | 5/2000 | | JP | 01-192365 | 8/1989 |
| EP | 1 003 814 | 5/2000 | | JP | 01-282280 | 11/1989 |
| EP | 1 028 145 | 8/2000 | | JP | 02-038114 | 2/1990 |
| EP | 1 104 783 | 6/2001 | | JP | 02-067344 | 3/1990 |
| EP | 1 138 478 | 10/2001 | | JP | 02-080445 | 3/1990 |
| EP | 1 357 150 | 4/2002 | | JP | 03-037481 | 2/1991 |
| EP | 1 201 391 | 5/2002 | | JP | 03-269036 | 11/1991 |
| EP | 1 201 406 | 5/2002 | | JP | 04-063851 | 2/1992 |
| EP | 1 211 285 | 6/2002 | | JP | 04-214709 | 8/1992 |
| EP | 1 214 386 | 6/2002 | | JP | 04-257361 | 9/1992 |
| EP | 1 223 191 | 7/2002 | | JP | 05-098088 | 4/1993 |
| EP | 1 239 004 | 9/2002 | | JP | 05-112842 | 5/1993 |
| EP | 1 241 224 | 9/2002 | | JP | 05-202339 | 8/1993 |
| EP | 1 252 231 | 10/2002 | | JP | 93-287132 | 11/1993 |
| EP | 1 313 805 | 5/2003 | | JP | 06-001892 | 1/1994 |
| EP | 1 331 258 | 7/2003 | | JP | 06-316659 | 11/1994 |
| EP | 1 366 087 | 12/2003 | | JP | 06-345893 | 12/1994 |
| EP | 1 453 912 | 9/2004 | | JP | 07-118492 | 5/1995 |
| EP | 1 505 181 | 2/2005 | | JP | 07-214685 | 8/1995 |
| EP | 1 607 440 | 12/2005 | | JP | 07-216143 | 8/1995 |
| EP | 1 342 249 | 1/2009 | | JP | 07-085907 | 9/1995 |
| FR | 1167244 | 11/1958 | | JP | 07-247387 | 9/1995 |
| FR | 1536425 | 8/1968 | | JP | 07-292167 | 11/1995 |
| FR | 1566388 | 5/1969 | | JP | 08-019286 | 2/1996 |
| FR | 1580539 | 9/1969 | | JP | 08-019287 | 2/1996 |
| FR | 2094870 | 3/1972 | | JP | 08-034862 | 2/1996 |
| FR | 2110824 | 6/1972 | | JP | 08-067782 | 3/1996 |
| FR | 2212382 | 7/1974 | | JP | 08-246232 | 9/1996 |
| FR | 2256207 | 7/1975 | | JP | 08-253754 | 10/1996 |
| FR | 2272143 | 12/1975 | | JP | 08-269417 | 10/1996 |
| FR | 2602515 | 2/1988 | | JP | 08-333557 | 12/1996 |
| GB | 0511319 | 8/1939 | | JP | 09-076260 | 3/1997 |
| GB | 0511320 | 8/1939 | | JP | 09-077901 | 3/1997 |
| GB | 0964845 | 7/1964 | | JP | 09-087435 | 3/1997 |
| GB | 0977113 | 12/1964 | | JP | 09-104801 | 4/1997 |
| GB | 1044028 | 9/1966 | | JP | 97-111061 | 4/1997 |
| GB | 1044502 | 10/1966 | | JP | 09-176359 | 7/1997 |
| GB | 1044503 | 10/1966 | | JP | 09-208761 | 8/1997 |
| GB | 1068783 | 5/1967 | | JP | 9-208761 | 12/1997 |
| GB | 1108298 | 4/1968 | | JP | 10-017693 | 1/1998 |
| GB | 1134422 | 11/1968 | | JP | 10-036569 | 2/1998 |
| GB | 1166664 | 10/1969 | | JP | 10-158971 | 6/1998 |
| GB | 1252638 | 11/1971 | | JP | 10-168252 | 6/1998 |
| GB | 1329915 | 9/1973 | | JP | 10-279750 | 10/1998 |
| GB | 1331988 | 9/1973 | | JP | 10-324783 | 12/1998 |
| GB | 1350257 | 4/1974 | | JP | 10-325060 | 12/1998 |
| GB | 1352311 | 5/1974 | | JP | 11-012402 | 1/1999 |
| GB | 1390359 | 4/1975 | | JP | 11-020397 | 1/1999 |
| GB | 1429494 | 3/1976 | | JP | 11-049903 | 2/1999 |
| GB | 1440230 | 6/1976 | | JP | 11-060789 | 3/1999 |
| GB | 1452911 | 10/1976 | | JP | 11-080455 | 3/1999 |
| GB | 1458915 | 12/1976 | | JP | 11-239587 | 9/1999 |
| GB | 1559058 | 1/1980 | | JP | 11-291422 | 10/1999 |
| GB | 2061339 | 5/1981 | | JP | 2000-109640 | 4/2000 |
| GB | 2180790 | 4/1987 | | JP | 2000-154281 | 6/2000 |
| GB | 2195642 | 4/1988 | | JP | 2001-049056 | 2/2001 |
| GB | 2187455 | 9/1989 | | JP | 2001-064523 | 3/2001 |
| JP | 68-013376 | 6/1943 | | JP | 2001-131509 | 5/2001 |
| JP | 44-029554 | 12/1969 | | JP | 2001-233992 | 8/2001 |
| JP | 74-041101 | 11/1974 | | JP | 2001-279031 | 10/2001 |
| JP | 50-123148 | 9/1975 | | JP | 2001-342355 | 12/2001 |
| JP | 50-151243 | 12/1975 | | JP | 3325376 | 9/2002 |
| JP | 51-012842 | 1/1976 | | JP | 3325377 | 9/2002 |
| JP | 76-029170 | 3/1976 | | JP | 2003-003023 | 1/2003 |
| JP | 51-144998 | 12/1976 | | JP | 2003-155387 | 5/2003 |
| JP | 53-023388 | 3/1978 | | JP | 3474677 | 12/2003 |
| JP | 53-060383 | 5/1978 | | JP | 4345327 | 10/2009 |
| JP | 53-102381 | 9/1978 | | RU | 455976 | 1/1975 |
| JP | 56-045932 | 4/1981 | | RU | 812800 | 12/1978 |
| JP | 56-095938 | 8/1981 | | RU | 857179 | 3/1979 |
| JP | 60-112439 | 6/1985 | | SU | 455976 | 1/1975 |

| | | |
|---|---|---|
| WO | WO 89/08681 | 9/1989 |
| WO | WO 91/18045 | 11/1991 |
| WO | WO 92/14784 | 9/1992 |
| WO | WO 92/16583 | 10/1992 |
| WO | WO 94/15014 | 7/1994 |
| WO | WO 95/13316 | 5/1995 |
| WO | WO 96/04419 | 2/1996 |
| WO | WO 96/11231 | 4/1996 |
| WO | WO 96/11232 | 4/1996 |
| WO | WO 96/26242 | 8/1996 |
| WO | WO 97/10298 | 3/1997 |
| WO | WO 97/19582 | 6/1997 |
| WO | WO 97/22662 | 6/1997 |
| WO | WO 97/33921 | 9/1997 |
| WO | WO 97/49737 | 12/1997 |
| WO | WO 98/32784 | 7/1998 |
| WO | WO 98/36783 | 8/1998 |
| WO | WO 98/42437 | 10/1998 |
| WO | WO 98/44041 | 10/1998 |
| WO | WO 98/46694 | 10/1998 |
| WO | WO 98/49229 | 11/1998 |
| WO | WO 99/07788 | 2/1999 |
| WO | WO 99/13016 | 3/1999 |
| WO | WO 99/19547 | 4/1999 |
| WO | WO 99/24501 | 5/1999 |
| WO | WO 99/24506 | 5/1999 |
| WO | WO 99/62987 | 12/1999 |
| WO | WO 00/00564 | 1/2000 |
| WO | WO 00/01745 | 1/2000 |
| WO | WO 00/37514 | 6/2000 |
| WO | WO 00/66662 | 11/2000 |
| WO | WO 00/69963 | 11/2000 |
| WO | WO 00/69965 | 11/2000 |
| WO | WO 00/69966 | 11/2000 |
| WO | WO 01/02263 | 1/2001 |
| WO | WO 01/09200 | 2/2001 |
| WO | WO 01/18109 | 3/2001 |
| WO | WO 01/43963 | 6/2001 |
| WO | WO 01/48034 | 7/2001 |
| WO | WO 01/81493 | 11/2001 |
| WO | WO 01/90113 | 11/2001 |
| WO | WO 02/10310 | 2/2002 |
| WO | WO 02/17973 | 3/2002 |
| WO | WO 02/18487 | 3/2002 |
| WO | WO 02/24767 | 3/2002 |
| WO | WO 02/30194 | 4/2002 |
| WO | WO 02/31044 | 4/2002 |
| WO | WO 02/36651 | 5/2002 |
| WO | WO 02/47092 | 6/2002 |
| WO | WO 02/051634 | 7/2002 |
| WO | WO 02/053629 | 7/2002 |
| WO | WO 02/062891 | 8/2002 |
| WO | WO 02/072689 | 9/2002 |
| WO | WO 02/074873 | 9/2002 |
| WO | WO 02/083753 | 10/2002 |
| WO | WO 02/088238 | 11/2002 |
| WO | WO 02/100153 | 12/2002 |
| WO | WO 03/021569 | 3/2003 |
| WO | WO 03/029379 | 4/2003 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 03/048252 | 6/2003 |
| WO | WO 03/060004 | 7/2003 |
| WO | WO 03/066729 | 8/2003 |
| WO | WO 03/083003 | 10/2003 |
| WO | WO 2004/009699 | 1/2004 |
| WO | WO 2004/014988 | 2/2004 |
| WO | WO 2004/014994 | 2/2004 |
| WO | WO 2004/014997 | 2/2004 |
| WO | WO 2004/014998 | 2/2004 |
| WO | WO 2004/020195 | 3/2004 |
| WO | WO 2004/031292 | 4/2004 |
| WO | WO 2004/035681 | 4/2004 |
| WO | WO 2004/060994 | 7/2004 |
| WO | WO 2004/087806 | 10/2004 |
| WO | WO 2004/113438 | 12/2004 |
| WO | WO 2005/010094 | 2/2005 |
| WO | WO 2005/014872 | 2/2005 |
| WO | WO 2005/049670 | 6/2005 |
| WO | WO 2005/052052 | 6/2005 |
| WO | WO 2005/080495 | 9/2005 |
| WO | WO 2006/006346 | 1/2006 |
| WO | WO 2006/027327 | 3/2006 |
| WO | WO 2006/044149 | 4/2006 |
| WO | WO 2006/083540 | 8/2006 |
| WO | WO 2006/118674 | 11/2006 |
| WO | WO 2006/128467 | 12/2006 |
| WO | WO 2006/128646 | 12/2006 |
| WO | WO 2007/048422 | 5/2007 |
| WO | WO 2007/145713 | 12/2007 |
| WO | WO 80/00028 | 5/2011 |

OTHER PUBLICATIONS

Chemical Additives for the Plastics Industry, Radian Corporation, McLean, Virginia, 1987, pp. 107-116.
Polypropylene Handbook, 2nd Ed., N. Pasquini, Ed. (Hanser, 2005), pp. 314-330.
Polymer Blends, D.R. Paul and C.B. Bucknall, Eds. (Wiley-Interscience, 2000), vol. 2, pp. 177-224.
60/649,107.
60/649,264.
61/203,523.
61/203,524.
12/012,380.
12/108,312.
12/492,747.
12/581,334.
12/653,742.
12/653,743.
12/693,287.
12/705,835.
12/722,292.
Fink et al., Ed., Ziegler Catalysts—Recent Scientific Innovations and Technological Improvements, Springer-Verlag, Berlin Heidelberg, 1995.
Chemical Additives for Plastics Industry 107-116 (Radian Corp., Noyes Data Corporation, NJ 1987).
Concise Encyclopedia of Polymer Science and Engineering 90-92 (Jacqueline I. Kroschwitz, ed., John Wiley & sons 1990).
CRC Handbook of Chemistry and Physics (David R. Lide, ed. 60th ed.) 1986, p. E-60.
Blomenhofer et al., "Designer" Nucleating Agents for Polypropylene, Macromol., 2005, vol. 38, p. 3688-3695.
Wild, et al., Determination of Branching Distributions in Polyethylene and Ethylene Copolymers, J. Poly. Sci., Poly. Phys. Ed., vol. 20, p. 441 (1982).
Sun et al.,Effect of Short chain Branching on the Coil Dimensions of Polyolefins in Dilute Solution, T. Macromol., vol. 34, No. 19, 6812-6820 (2001).
Collette et al., "Elastomeric Polypropylenes from Alumina-Supported Tetraalkyl Group IVB Catalysts, 1. Synthesis and Properties of High Molecular Weight Stereoblock Homopolymers and 2. Chain Microstructure, Crystallinity, and Morphology", Macromol., vol. 22, 3851-3866, 1989.
Bovey, Polymer Conformation and Configuration, A Polytechnic Press of the Polytechnic Institute of Brooklyn Book, Academic Press, New York, London, 1969.
Cheng et al., 13C Nuclear Magnetic Resonance Characterization of Poly(propylene) Prepared With Homogeneous Catalysts, Makromol. Chem., 1989, 190, pp. 1931-1943.
Metallocene-based Polyolefins, Preparation, properties and technology, Scheirs et al. Editors, Wiley Series in Polymer Science, vol. 2, John Wiley & Sons, Ltd., England, 2000.
*Rubber Technology Handbook*, Werner Hoffman, Hanser Publishers, New York, 1989, p. 294-305.
K. Nitta et al., "Plasticizing of isotactic polypropylene upon addition of hydrocarbon oils", e-Polymers, vol. 021, 2004, pp. 1-11.
Plastics Additives and A-Z Reference, 499-504 (Geoffrey Pritchard, ed., Chapman & Hall 1998).

Plastics Processing, Technology and Health Effects, Radian Corporation, McLean, Virginia, Noyes Data Corporation, 1986.
Brandrup et al., Ed., Polymer Handbook, 4th Edition, a Wiley-Interscience Publication, 1999.
*Additives for Plastics*, J. Stepek, H. Daoust, Springer Verlag, New York, 1983, p. 6-69.
Synthetic Lubricants and High-Performance Functional Fluids (Leslie R. Rudnick & Ronald L. Shubkin, ed. Marcel Dekker, Inc. 1999) p. 3-52.
Polypropylene Handbook pp. 304-348 (Edward P. Moore, Jr. ed., Hanser Publishers 1996).
Tsutsui et al., Propylene Homo- and copolymerization with ethylene using an ethylenebis(1-indenyl)zirconium dichloride and methlaluminoxane catalyst system.
Resconi et al., Selectivity in Propene Polymerization with Metallocene Catalysts, 100 Chem. Rev. 1253-1345 (2000).
Risch, Ph.D., "Swelling Interaction, Plasticization, and Antioxidant extraction Between Fiber Optic Cable Gels and Polyolefins", SPE-ANTEC, 1999, pp. 1-5.
McShane, et al., The Effect of Oil Type and Content on the Rheological, Mechanical and Thermal Proper6ties of a Polyolefinic Based Thermoplastic Elastomer, SPE ANTEC 2002, p. 1-5.
B.J. Gedeon et al., "Use of "Clean" paraffinic Processing Oils to Improve TPE Properties", TPEs, 2000, pp. 157-170.
Wheeler et al., Gel Permeation Chromatography/Fourier Transform Infrared Interface for Polymer Analysis, Applied Spectroscopy, 1993, vol. 47, pp. 1128-1130.
Wu et al., "Plasticizing Characteristics of High-Density polyethylene", Suliao, 1988, 17 (4), 3-8 (Abstract).
Kanauzov et al., "Effect of Technological Additives on Properties of Thermoplastic vulcanizates Base don Ethylene Propylene rubber and Polyolefins", Kauchuk I Rezina, 2000, (40), 12-15 (Abstract).
J.D. Fotheringham, Polybutenes: a versatile modifier for plastics, AddCon Asia (RAPRA), International Plastics Additives and Modifiers Conference, Singapore, Oct. 28-29, 1997 (Abstract).
M.D. Nasibova et al., "Effect of Petroleum Plasticizers and Synthetic Oils on Rheological and service Properties of Polyolefins", Olefinovs Opyt. Z-dom, 1991 (14), 60-66 (Abstract).

Handbook of Plastics, Elastomers, and Composites, Charles A. Harper Editor in Chief, $2^{nd}$ Edition, McGraw-Hill, Inc., 1992, pp. 1.13-1.14.
Maltby et al., "Slip Additives for Film Extrusion", Journal of Plastic Film & Sheeting, Boston, MA, Apr. 1998, vol. 14, pp. 111-120.
Encyclopedia of Polymer Science and Engineering, G. ver Strate, vol. 6, $2^{nd}$ Ed., 1986, pp. 522-564.
Polypropylene Handbook, $2^{ND}$ Ed., N. Pasquini, Ed. (Hanser, 2005), p. 314-330.
Maier et al., Polypropylene—The Definitive User's Guide and Databook, 1998, pp. 11-25 and 97-106.
Gande, et al. CIBA Chemicals, Improved MB Fabrics Through Innovative Vis-breaking Techn., $14^{th}$ Annual TANDEC Conf., Nov. 9-11, 2004.
Gande et al. of CIBA Chemicals, Peroxide-Free Vis-Breaking Additive for Improved Qualities in Meltblown Fabrics, CR76 TANDEC Conference 2006.
Hawley's Condensed Chemical Dictionary, $14^{th}$Ed. (2001) p. 835.
Dharmarajan et al., Modifying Polypropylene with a Metallocene Plastomer, Plastics Engr., Aug. 1996, pp. 33-35.
Synthetic Lubricants and High-Performance Functional Fluids (Rudnick et al. ed., Marcel Dekker 1999), pp. 357-392.
Stehr, Investigation of the Effects of Poly($\alpha$-olefin) Plasticizers on the Properties of Elastomers, KGK, Jan./Feb. 2007, pp. 14-19 (translation).
Khungar, Flexible Films of Polypropylene Plasticized with Polybutenes, Amoco Chemicals, 1996, pp. 2992-2996.
Pratt et al., Control of Phase Separation and Voiding in Oil-Filled Polypropylene, Journal of Applied Polymers Science, vol. 18, 1974, pp. 3621-3631.
Synthetic Lubricants and High-Performance Functional Fluids (Rudnick et al. ed., Marcel Dekker 1999), pp. 393-411.
Hawleys Condensed Chemical Dictionary, 1997, pp. 888, 889, 903, 1097.
Nucleation of Polypropylene, Polymer Additives and Colors, Nov. 27, 2000, Provided by www.specialchem4polymers.com.

\* cited by examiner

PLASTICIZED HETERO-PHASE POLYOLEFIN BLENDS

PRIORITY CLAIMS

This application is a continuation in part of U.S. Ser. No. 10/782,228 filed Feb. 19, 2004 (now granted as U.S. Pat. No. 7,531,594), which is a continuation in part of Ser. No. 10/640,435 filed Aug. 12, 2003 (now granted as U.S. Pat. No. 7,619,026), which claims priority to and the benefit of U.S. Ser. No. 60/402,665, filed Aug. 12, 2002. U.S. Ser. No. 10/782,228 is also a continuation in part of Ser. No. 10/634,351 filed Aug. 4, 2003 (now granted as U.S. Pat. No. 7,632,887), which claims priority to and the benefit of U.S. Ser. No. 60/402,665, filed Aug. 12, 2002.

FIELD OF THE INVENTION

This invention relates to hetero-phase polyolefin compositions, such as polypropylene-based thermoplastic polyolefin compositions, for use in the manufacture of automotive components, among other uses, and for articles made from such compositions.

BACKGROUND OF THE INVENTION

Multi-phase polyolefin compositions—often consisting of a "plastic" matrix phase and a "rubber" dispersed phase—are used in many applications that require a material that is lightweight, tough, stiff, and easily processed. Particularly successful in this respect are compositions based on a high-modulus polypropylene and a low-modulus polyolefin modifier, which are typically referred to as thermoplastic polyolefins, or TPOs. The modifier component has elastomeric characteristics and typically provides impact resistance, whereas the polypropylene component typically provides overall stiffness.

Commercially, the most common example of a TPO is a polypropylene impact copolymer (ICP). In an ICP, the matrix phase is essentially a propylene homopolymer (hPP) or random copolymer (RCP), and the dispersed phase is typically an ethylene or propylene copolymer with a relatively high comonomer content, traditionally an ethylene-propylene rubber (EPR). A third phase containing mostly comonomer, such as an ethylene homopolymer or copolymer (PE), as well as additives such as fillers, may also be present.

Low-crystallinity ethylene-alpha olefin copolymers have also been used instead of (or in addition to) EPR as the polyolefin modifier (or dispersed phase) in TPOs. The most common such ethylene-alpha olefin copolymers are so-called plastomers, which are often ethylene-butene, ethylene-hexene, or ethylene-octene copolymers with densities of 0.90 g/cm$^3$ or less.

A major market for TPOs is in the manufacture of automotive parts, especially exterior parts like bumper fascia and body side-molding, and interior parts like instrument panels and side pillars. These parts, which have demanding stiffness and toughness (and, in some cases, uniform surface appearance) requirements, are generally made using an injection molding process. To increase efficiency and reduce costs, manufacturers have sought to decrease melt viscosity, decrease molding times, and reduce wall thickness in the molds, primarily by turning to high melt flow rate (MFR) polypropylenes (MFR greater than about 20, 25, or even 30 dg/min). However, these high MFR polypropylenes tend to be low in molecular weight, and therefore difficult to toughen, resulting in low impact strength especially at sub-ambient temperatures. To achieve a satisfactory balance of stiffness, toughness, and processibility, one option is to combine a moderate MFR polypropylene, a high content of polyolefin modifier (typically EPR and/or plastomer), and a reinforcing filler. Unfortunately, this approach has limitations in terms of the maximum MFR that can be achieved while still meeting the stiffness and toughness requirements. In addition, it can lead to poor surface appearance, in terms of the appearance of flow marks (or "tiger stripes").

What is needed is a way to improve the MFR characteristics of a TPO without sacrificing its level of performance in terms of mechanical properties, including impact strength and/or stiffness, that are demanded for applications like automotive parts. One way to increase MFR is to add a low molecular weight compound, such as an even higher MFR polypropylene (hPP, RCP, or ICP). However, this approach compromises the balance of mechanical properties of the final blend by also lowering its sub-ambient impact strength. A fundamental problem is that typical TPO's based on polypropylene are brittle at even moderately low temperatures due to its relatively high glass transition temperature (~0° C.). Therefore, there is a need for a low molecular weight additive that also lowers the glass transition temperature of the polypropylene component of a TPO. The plasticizers described herein accomplish this objective.

It would be particularly desirable to use a simple compound such as a conventional mineral oil as the low molecular weight additive for this purpose. After all, such compounds are routinely used as process oils or extender oils in polyolefin elastomers. However, it has been taught that conventional mineral oils, even paraffinic mineral oils, impair the properties of polyolefins, in particular semi-crystalline polyolefins (see WO 01/18109 A1 and *Chemical Additives for the Plastics Industry*, Radian Corp., 1987, p. 107-116). Indeed, such compounds are often detrimental to semicrystalline polypropylene, in that they migrate to the surface causing parts to become oily (except at very low concentrations), or they degrade mechanical properties because they fail to depress the glass transition temperature effectively. The plasticizers described herein overcome these limitations.

WO 04/014998 discloses blends of polyolefins with non-functionalized plasticizers. In particular, Tables 8, 11, and 21a to 22f describe blends of certain impact copolymers with certain liquids and/or plasticizers, and Tables 23a to 23f describe blends of a certain thermoplastic polyolefin composition with certain liquids and/or plasticizers. These blends however are unsuitable for automotive TPO applications because they do not have the appropriate balance of stiffness, toughness, and flow properties.

Plasticized polyolefin compositions and their applications are also described in WO 04/014997 and US 2004/260001. Additional references of interest include: U.S. Pat. Nos. 4,132,698, 4,536,537, 4,774,277, JP 09-208761, WO 98/44041, WO 03/48252, and US 2004/034148.

TPOs, including compositions that comprise polypropylene and or filler, are described in POLYPROPYLENE HANDBOOK, 2$^{ND}$ ED., N. Pasquini, Ed. (Hanser, 2005), p. 314-330; POLYMER BLENDS, D. R. Paul and C. B. Bucknall, Eds. (Wiley-Interscience, 2000), Vol. 2; U.S. Pat. Nos. 5,681,897; 6,245,856; and 6,399,707. However, the addition of both a filler and a non-functionalized plasticizer to a polypropylene-based TPO to give an improved balance of properties, as described herein, has not been previously disclosed.

SUMMARY OF THE INVENTION

This invention relates to the use of certain of hydrocarbon liquids as plasticizers for hetero-phase polyolefin compositions based on polypropylene. Such compositions are especially useful in automotive components and other applications that demand high stiffness, excellent impact toughness at low temperatures, and good processibility during fabrication.

More specifically, this invention relates to a hetero-phase polyolefin composition comprising:
 a) 30 to 99.7 wt % of a polypropylene-based TPO comprising at least 50 wt % propylene and at least 10 wt % ethylene, and
 b) 0.1 to 20 wt % of one or more non-functionalized plasticizer(s), and
 c) 0.2 to 50 wt % of one or more filler(s);
based upon the weight of the composition, and having:
 i) a melt flow rate, 230° C., 2.16 kg, (MFR) of 5 dg/min or more, and
 ii) a flexural modulus of 500 MPa or more, and
 iii) a notched Charpy impact strength at −30° C. of 1 kJ/m$^2$ or more, or a notched Izod impact strength at −18° C. of 50 J/m or more.

DEFINITIONS

The following definitions are made for purposes of this invention and the claims thereto.

When a polymer or oligomer is referred to as comprising an olefin, the olefin present in the polymer or oligomer is the polymerized or oligomerized form of the olefin, respectively. The term polymer is meant to encompass homopolymers and copolymers. The term copolymer includes any polymer having two or more different monomers in the same chain, and encompasses random copolymers, statistical copolymers, interpolymers, and (true) block copolymers.

When a polymer blend is said to comprise a certain percentage of a monomer, that percentage of monomer is based on the total amount of monomer units in all the polymer components of the blend. For example if a blend comprises 50 wt % of polymer A, which has 20 wt % monomer X, and 50 wt % of a polymer B, which has 10 wt % monomer X, the blend comprises 15 wt % of monomer X.

A "polymer" has a number-average molecular weight ($M_n$) of 20 kg/mol or more, while an "oligomer" has a $M_n$ of less than 20 kg/mol. Preferably, a polymer has a $M_n$ of 40 kg/mol or more (preferably 60 kg/mol or more, preferably 80 kg/mol or more, preferably 100 kg/mol or more). Preferably, an oligomers has a $M_n$ of less than 15 kg/mol (preferably less than 13 kg/mol, preferably less than 10 kg/mol, preferably less than 5 kg/mol, preferably less than 4 kg/mol, preferably less than 3 kg/mol, preferably less than 2 kg/mol, preferably less than 1 kg/mol).

A "polyolefin" is a polymer comprising at least 50 mol % of one or more olefin monomers. Preferably, a polyolefin comprises at least 60 mol % (preferably at least 70 mol %, preferably at least 80 mol %, preferably at least 90 mol %, preferably at least 95 mol %, preferably 100 mol %) of one or more olefin monomers, preferably 1-olefins, having carbon numbers of 2 to 20 (preferably 2 to 16, preferably 2 to 10, preferably 2 to 8, preferably 2 to 6). Preferably, a polyolefin has an Mn of 20 kg/mol or more, preferably 40 kg/mol or more (preferably 60 kg/mol or more, preferably 80 kg/mol or more, preferably 100 kg/mol or more).

An "isotactic" polyolefin has at least 10% isotactic pentads, a "highly isotactic" polyolefin has at least 50% isotactic pentads, and a "syndiotactic" polyolefin has at least 10% syndiotactic pentads, according to analysis by $^{13}$C-NMR. Preferably isotactic polymers have at least 20% (preferably at least 30%, preferably at least 40%) isotactic pentads. A polyolefin is "atactic" if it has less than 5% isotactic pentads and less than 5% syndiotactic pentads.

The terms "polypropylene" and "propylene polymer" mean a polyolefin comprising at least 50 mol % propylene units and having less than 35 mol % ethylene units. Preferably the "polypropylene" and "propylene polymer" comprise at least 60 mol % (preferably at least 70 mol %, preferably at least 80 mol %, preferably at least 90 mol %, preferably at least 95 mol %, preferably 100 mol %) propylene units; and have less than 35 mol % ethylene units. While propylene-rich ethylene/propylene copolymers are generically a class of propylene copolymer, a special distinction is made herein for the composition range commonly associated with EP Rubber, as defined below. The comonomers in a propylene copolymer are preferably chosen from among ethylene and $C_4$ to $C_{20}$ olefins (preferably ethylene and $C_4$ to $C_8$ 1-olefins). The term "polypropylene" is meant to encompass isotactic polypropylene (iPP), highly isotactic polypropylene, syndiotactic polypropylene (sPP), homopolymer polypropylene (hPP, also called propylene homopolymer or homopolypropylene), and so-called random copolymer polypropylene (RCP, also called propylene random copolymer). Herein, an RCP is specifically defined to be a copolymer of propylene and 1 to 10 wt % of an olefin chosen from ethylene and $C_4$ to $C_8$ 1-olefins. Preferably, the olefin comonomer in an RCP is ethylene or 1-butene, preferably ethylene.

The terms "polyethylene" and "ethylene polymer" mean a polyolefin comprising at least 50 mol % ethylene units and having less than 15 mol % propylene units. Preferably the "polyethylene" and "ethylene polymer" comprise at least 60 mol % (preferably at least 70 mol %, preferably at least 80 mol %, even preferably at least 90 mol %, even preferably at least 95 mol % or preferably 100 mole %) ethylene units; and have less than 15 mol % propylene units. While ethylene-rich ethylene/propylene copolymers are generically a class of ethylene copolymer, a special distinction is made herein for the composition range commonly associated with EP Rubber, as defined below. The comonomers in an ethylene copolymer are preferably chosen from $C_3$ to $C_{20}$ olefins (preferably $C_3$ to $C_8$ 1-olefins). An "ethylene elastomer" is an ethylene copolymer having a density of less than 0.86 g/cm$^3$. An "ethylene plastomer" (or simply a "plastomer") is an ethylene copolymer having a density of 0.86 to 0.91 g/cm$^3$. A "low density polyethylene" is an ethylene polymer having a density of more than 0.91 g/cm$^3$ to less than 0.94 g/cm$^3$; this class of polyethylene includes copolymers made using a heterogeneous catalysis process (often identified as linear low density polyethylene, LLDPE) and homopolymers or copolymers made using a high-pressure/free radical process (often identified as LDPE). A "high density polyethylene" ("HDPE") is an ethylene polymer having a density of 0.94 g/cm$^3$ or more.

The term "EP Rubber" means a copolymer of ethylene and propylene, and optionally one or more diene monomer(s), where the ethylene content is from 35 to 85 mol %, the total diene content is 0 to 5 mol %, and the balance is propylene with a minimum propylene content of 15 mol %.

The term "hetero-phase" refers to the presence of two or more morphological phases in a blend of two or more polymers, where each phase comprises a different ratio of the polymers as a result of partial or complete immiscibility (i.e., thermodynamic incompatibility). A common example is a morphology consisting of a "matrix" (continuous) phase and at least one "dispersed" (discontinuous) phase. The dispersed phase takes the form of discrete domains (particles) distributed within the matrix (or within other phase domains, if there are more than two phases). Another example is a co-continuous morphology, where two phases are observed but it is unclear which is the continuous phase and which is the discontinuous phase. The presence of multiple phases is determined using microscopy techniques, e.g., optical microscopy, scanning electron microscopy (SEM), or atomic force microscopy (AFM); or by the presence of two glass transition peaks in a dynamic mechanical analysis (DMA) experiment; in the event of disagreement among these methods, the AFM determination shall be used.

A "thermoplastic polyolefin" (TPO) is a specific type of hetero-phase polyolefin composition. These are blends of a high-crystallinity "base polyolefin" (typically having a melting point of 100° C. or more) and a low-crystallinity or amorphous "polyolefin modifier" (typically having a Tg of −20° C. or less). The hetero-phase morphology consists of a matrix phase comprised primarily of the base polyolefin, and a dispersed phase (which is not, or only modestly, cross-linked) comprised primarily of the polyolefin modifier. Thus, the matrix phase has a modulus that is higher, often substantially higher, than that of the dispersed phase. TPO compositions may also comprise components such as fillers, additives, and other useful compounding ingredients.

A "polypropylene-based thermoplastic polyolefin" (or equivalently, a "polypropylene-based TPO") is a specific type of TPO, in that the matrix phase comprises primarily a high-crystallinity polypropylene having a melting point ($T_m$) of 100° C. or more, and the dispersed phase comprises primarily a polyolefin having a glass transition temperature ($T_g$) of −20° C. or less. Preferably, the matrix phase comprises primarily homopolymer polypropylene (hPP) and/or random copolymer polypropylene (RCP) with relatively low comonomer content (less than 5 wt %), and has a melting point of 110° C. or more (preferably 120° C. or more, preferably 130° C. or more, preferably 140° C. or more, preferably 150° C. or more, preferably 160° C. or more). Preferably, the dispersed phase comprises primarily one or more ethylene copolymer(s) with relatively high comonomer content (at least 5 wt %, preferably at least 10 wt %); and has a $T_g$ of −30° C. or less (preferably −40° C. or less, preferably −50° C. or less).

A "polypropylene impact copolymer" (herein simply referred to as an "impact copolymer" (ICP)) is a specific type of polypropylene-based TPO, comprising 60 to 95 wt % of (A) hPP or RCP with a $T_m$ of 120° C. or more, and 5 to 40 wt % of (B) propylene copolymer with a $T_g$ of −30° C. or less. The morphology of an ICP is such that the matrix phase is comprised primarily of component (A) while the dispersed phase is comprised primarily of component (B). Preferably, the ICP comprises only two monomers: propylene and a single comonomer chosen from among ethylene and $C_4$ to $C_8$ 1-olefins (preferably ethylene or 1-butene, preferably ethylene). Preferably, the (A) component has a $T_m$ of 120° C. or more (preferably 130° C. or more, preferably 140° C. or more, preferably 150° C. or more, preferably 160° C. or more). Preferably, the (B) component is EP Rubber. Preferably, the (B) component has a Tg of −40° C. or less (preferably −50° C.).

An "in-situ ICP" is a specific type of ICP which is a reactor blend of the (A) and (B) components of an ICP, meaning (A) and (B) were made in separate reactors (or reactions zones) physically connected in series, with the effect that an intimately mixed final product is obtained in the product exiting the final reactor (or reaction zone). Typically, the components are produced in a sequential polymerization process, wherein (A) is produced in a first reactor is transferred to a second reactor where (B) is produced and incorporated as domains into the (A) matrix. There may also be a minor amount of a third component (C), produced as a byproduct during this process, comprising primarily the non-propylene comonomer (e.g., (C) will be an ethylene polymer if ethylene is used as the comonomer). In the literature, especially in the patent literature, an in-situ ICP is sometimes identified as "reactor-blend ICP" or a "block copolymer", although the latter term is misleading since there is at best only a very small fraction of molecules that are (A)-(B) copolymers.

An "ex-situ ICP" is a specific type of ICP which is a physical blend of (A) and (B), meaning (A) and (B) were synthesized independently and then subsequently blended typically using a melt-mixing process, such as an extruder. An ex-situ ICP is distinguished by the fact that (A) and (B) are collected in solid form after exiting their respective synthesis processes, and then combined; whereas for an in-situ ICP, (A) and (B) are combined within a common synthesis process and only the blend is collected in solid form.

For purposes of this invention, TPO compositions do not include those hetero-phase polyolefins generally referred to as "Thermoplastic Vulcanizates" (TPVs). These are blends of a high-crystallinity polypropylene and a low-crystallinity or amorphous polyolefin modifier (often an ethylene-propylene elastomer) which is highly cross-linked (vulcanized) through the use of a cross-linking agent to provide a rubber-like resilience to the composition, and optionally other compounding ingredients; see, for example, U.S. Pat. No. 4,311,628. The polyolefin modifier in hetero-phase polyolefin compositions of the instant invention are not crosslinked to an appreciable extent. That is, the so-called "gel content" of the composition is low, so that preferably less than 50 wt %, preferably less than 40 wt %, preferably less than 30 wt %, preferably less than 20 wt %, preferably less than 10 wt %, preferably less than 5 wt %, preferably 0%) of the polyolefin modifier is insoluble in boiling xylene.

A "liquid" is defined to be a material that flows at room temperature, having a pour point of less than +20° C. and a kinematic viscosity at 25° C. of 30,000 cSt or less.

The term "paraffin" refers to saturated hydrocarbons, including normal paraffins, branched paraffins, isoparaffins, cycloparaffins, and blends thereof, and may be derived synthetically or from refined crude oil by means known in the art. More specifically, the following terms have the indicated meanings: "isoparaffins" are branched chain-type saturated hydrocarbons (i.e., branched alkanes, having at least one tertiary or quaternary carbon atom), which possess at least one $C_1$ to $C_{18}$ (more commonly $C_1$ to $C_{10}$) alkyl branch along at least a portion of each chain; "normal paraffins" are un-branched chain-type saturated hydrocarbons (i.e., normal alkanes); and "cycloparaffins" (also known as "naphthenes") are cyclic (mono-ring and/or multi-ring) saturated hydrocarbons and branched cyclic saturated hydrocarbons. For each class of paraffin, various structural isomers will typically be present for each carbon number. Unsaturated hydrocarbons include alkenes (olefins, diolefins, etc.), alkynes, and "aromatics" (unsaturated mono-ring and/or multi-ring cyclic moieties, including branched cyclic unsaturated hydrocarbons).

The term "mineral oil" includes any hydrocarbon liquid of lubricating viscosity (i.e., a kinematic viscosity at 100° C. of 1 cSt or more) derived from petroleum crude oil and subjected to one or more refining and/or hydroprocessing steps (such as fractionation, hydrocracking, dewaxing, isomerization, and hydrofinishing) to purify and chemically modify the components to achieve a final set of properties. Such "refined" oils are in contrast to "synthetic" oils, which are manufactured by combining monomer units using catalysts and/or heat. In the lubricant industry, refined "basestocks" (which are mineral oils) are commonly divided into three categories based on their properties, as follows:

| Category | Saturates | | Sulfur | | Viscosity Index |
|---|---|---|---|---|---|
| Group I | <90 wt % | and/or | >0.03 wt % | and | 80-119 |
| Group II | ≧90 wt % | and | ≦0.03 wt % | and | 80-119 |
| Group III | ≧90 wt % | and | ≦0.03 wt % | and | ≧120 |

However, even if a mineral oil is not specifically identified by one of these basestocks classification, it is still possible to categorize it using this scheme. Accordingly, herein, a "Group III Mineral Oil" is defined to be a mineral oil having a viscosity index of 120 or more, whereas a "Group III basestock" is defined according to the above table; therefore, any Group III basestock will also be a Group III Mineral Oil, but the opposite is not necessarily true.

In the polymer industry, mineral oils are often called "process oils" (or "extender oils"). A common classification system for process oils is to identify them as either "paraffinic", "naphthenic", or "aromatic" mineral (or process or extender) oils based on the relative content of paraffinic, naphthenic, and aromatic moieties (see Typical in the table below). Herein, the three common classes are defined based on the compositions described under Definitions in the table below:

| Mineral Oil | Typical | | | Definitions | | |
|---|---|---|---|---|---|---|
| Type | $C_P$ | $C_N$ | $C_A$ | $C_P$ | $C_N$ | $C_A$ |
| Paraffinic | 60-80% | 20-40% | 0-10% | ≧60% | <40% | <20% |
| Naphthenic | 40-55% | 40-55% | 6-15% | | ≧40% | <20% |
| Aromatic | 35-55% | 10-35% | 30-40% | | | ≧20% | where $C_P$, $C_N$, and $C_A$ indicate the percentage of carbons in paraffinic chain-like (i.e., isoparaffinic and normal paraffinic) structures, naphthenic (i.e., saturated ring) structures, and aromatic (i.e., unsaturated ring) structures, respectively.

The term "substantially absent" means that the compounds in question are not added deliberately to the compositions and, if present, are present at less than 1 wt %, based upon the total weight of the composition. Preferably, the compounds in question are present at less than 0.5 wt % (preferably less than 0.1 wt %, preferably less than 0.05 wt %, preferably less than 0.01 wt %, preferably less than 0.001 wt %), based upon the total weight of the composition.

For purpose of this invention and the claims thereto, unless otherwise noted, physical and chemical properties described herein are measured using the test methods described under the Experimental Methods section.

DETAILED DESCRIPTION OF THE INVENTION

This invention relates to plasticized hetero-phase polyolefin compositions comprising a polypropylene-based TPO, one or more non-functionalized plasticizers, and one or more filler.

The non-functionalized plasticizer (NFP) compounds of the present invention are hydrocarbon liquids with certain characteristics as described herein. We discovered that addition of one or more NFP improves the overall performance of polypropylene-based TPO compositions that meet the stringent array of mechanical property requirements for automotive (and other) applications. In particular, these compositions exhibit better processability than can be achieved using previous formulation approaches. Generally, the compositions comprise a polypropylene-based TPO, an NFP, and a filler, and optionally additives.

More specifically, this invention relates to a hetero-phase polyolefin composition comprising:
 a) 30 to 99.7 wt % of a polypropylene-based TPO comprising at least 50 wt % propylene and at least 10 wt % ethylene, and
 b) 0.1 to 20 wt % of one or more non-functionalized plasticizer, and
 c) 0.2 to 50 wt % of one or more filler;
based upon the weight of the composition, and having:
 i) an MFR of 5 dg/min or more, and
 ii) a flexural modulus of 500 MPa or more, and
 iii) a notched Charpy impact strength at −30° C. of 1 kJ/m$^2$ or more, and/or a notched Izod impact strength at −18° C. of 50 J/m or more.

The polypropylene-based TPO may be an impact copolymer (especially an in-situ ICP), or it may be a physical blend of an ICP with a plastomer and/or ethylene-propylene rubber (EP Rubber), or it may be a physical blend of a propylene polymer (especially a homopolymer polypropylene (hPP) or a random copolymer polypropylene (RCP)) with a plastomer and/or EP Rubber. Preferred polymeric components are described more fully below. In a preferred embodiment, the polypropylene-based TPO comprises a matrix having a melting point ($T_m$) of 110° C. or more (preferably 120° C. or more, preferably 125° C. or more, preferably 130° C. or more, preferably 140° C. or more, preferably 150° C. or more, preferably 160° C. or more). In another preferred embodiment, the polypropylene-based TPO comprises a dispersed phase having a glass transition temperature ($T_g$) of −20° C. or less (preferably −25° C. or less, preferably −30° C. or less, preferably −35° C. or less, preferably −40° C. or less, preferably −45° C. or less, preferably −50° C. or less, preferably −55° C. or less).

The non-functional plasticizer (NFP) may be a PAO oligomer, or it may be a Group III Mineral Oil, or it may be a GTL basestock, or it may be an Exceptional Paraffinic Process Oil. Preferably, the NFP has a kinematic viscosity at 100° C. of 5 cSt or more, a viscosity index of 100 or more, a pour point of −20° C. or less, a specific gravity less than 0.86, and a flash point greater than 200° C. Preferred NFPs are described more fully below.

The filler may be inorganic mineral particulates, inorganic fibers, or engineering thermoplastic fibers. Preferred fillers are described more fully below.

Hetero-Phase Polyolefin Composition

In one embodiment, this invention relates to a hetero-phase polyolefin composition comprising:
 a) 30 to 99.7 wt % (preferably 35 to 95 wt %, preferably 40 to 90 wt %, preferably 45 to 85 wt %) of a polypropylene-based TPO,
 b) 0.1 to 20 wt % (preferably 0.5 to 15 wt %, preferably 1 to 10 wt %, preferably 1.5 to 5 wt %) of one or more NFP(s), and
 c) 0.2 to 50 wt % (preferably 0.5 to 40 wt %, preferably 1 to 30 wt %, preferably 5 to 20 wt %) of one or more filler(s),
based upon the weight of the composition; and having
 i) a melt flow rate of 5 dg/min or more (preferably 10 dg/min or more, preferably 15 to 400 dg/min, preferably 20 to 300 dg/min, preferably 30 to 200 dg/min or more, preferably 35 to 100 dg/min),
 ii) a flexural modulus of 500 MPa or more (preferably 800 MPa or more, preferably 900 to 3500 MPa, preferably 1000 to 3000 MPa, preferably 1100 to 2500 MPa), and
 iii) a notched Charpy impact strength at −30° C. of 1 kJ/m$^2$ or more (preferably 2 kJ/m$^2$ or more, preferably 2.5 to 15 kJ/m$^2$, preferably 3 to 12 kJ/m$^2$), and/or a notched Izod impact strength at −18° C. of 50 J/m or more (preferably 60 J/m or more, preferably 70 to 500 J/m, preferably 80 to 400 J/m, preferably 90 to 300 J/m, preferably 100 to 200 J/m);

where the polypropylene-based TPO comprises at least 50 wt % (preferably at least 55 wt %, preferably at least 60 wt %, preferably at least 65 wt %) propylene and at least 10 wt % (preferably at least 15 wt %, preferably at least 20 wt %, preferably at least 25 wt %) ethylene, based on the total weight of the propylene based-TPO. The polypropylene-based TPO may comprise one or more ICP(s); or one or more propylene polymer and one or more ethylene copolymer and/or EP Rubber; or one or more ICP and one or more propylene polymer and one or more ethylene copolymer and/or EP Rubber.

In another embodiment, this invention relates to a heterophase polyolefin composition comprising:
- a) 30 to 99.7 wt % (preferably 35 to 95 wt %, preferably 40 to 90 wt %, preferably 45 to 85 wt %) of one or more ICP(s),
- b) 0.1 to 20 wt % (preferably 0.5 to 15 wt %, preferably 1 to 10 wt %, preferably 1.5 to 5 wt %) of one or more NFP(s), and
- c) 0.2 to 50 wt % (preferably 0.5 to 40 wt %, preferably 1 to 30 wt %, preferably 5 to 20 wt %) of one or more filler(s), based upon the weight of the composition; and having
- i) a melt flow rate of 5 dg/min or more (preferably 10 dg/min or more, preferably 15 to 400 dg/min, preferably 20 to 300 dg/min, preferably 30 to 200 dg/min or more, preferably 35 to 100 dg/min),
- ii) a flexural modulus of 500 MPa or more (preferably 800 MPa or more, preferably 900 to 3500 MPa, preferably 1000 to 3000 MPa, preferably 1100 to 2500 MPa), and
- iii) a notched Charpy impact strength at −30° C. of 1 kJ/m$^2$ or more (preferably 2 kJ/m$^2$ or more, preferably 2.5 to 15 kJ/m$^2$, preferably 3 to 12 kJ/m$^2$), and/or a notched Izod impact strength at −18° C. of 50 J/m or more (preferably 60 J/m or more, preferably 70 to 500 J/m, preferably 80 to 400 J/m, preferably 90 to 300 J/m, preferably 100 to 200 J/m);

where the combination of ICP(s) comprises at least 50 wt % (preferably at least 55 wt %, preferably at least 60 wt %, preferably at least 65 wt %) propylene and at least 10 wt % (preferably at least 15 wt %, preferably at least 20 wt %, preferably at least 25 wt %) ethylene, based on the total weight of the ICP(s).

In another embodiment, this invention relates to a heterophase polyolefin composition comprising:
- a) 20 to 98.7 wt % (preferably 30 to 85 wt %, preferably 35 to 90 wt %, preferably 40 to 85 wt %) of one or more ICP(s),
- b) 1 to 40 wt % (preferably 5 to 35 wt %, preferably 10 to 30 wt %, preferably 15 to 25 wt %) of one or more ethylene copolymer(s),
- c) 0.1 to 20 wt % (preferably 0.5 to 15 wt %, preferably 1 to 10 wt %, preferably 1.5 to 5 wt %) of one or more NFP, and
- d) 0.2 to 50 wt % (preferably 0.5 to 40 wt %, preferably 1 to 30 wt %, preferably 5 to 20 wt %) of one or more filler, based upon the weight of the composition; and having
- i) a melt flow rate of 5 dg/min or more (preferably 10 dg/min or more, preferably 15 to 400 dg/min, preferably 20 to 300 dg/min, preferably 30 to 200 dg/min or more, preferably 35 to 100 dg/min),
- ii) a flexural modulus of 500 MPa or more (preferably 800 MPa or more, preferably 900 to 3500 MPa, preferably 1000 to 3000 MPa, preferably 1100 to 2500 MPa), and
- iii) a notched Charpy impact strength at −30° C. of 1 kJ/m$^2$ or more (preferably 2 kJ/m$^2$ or more, preferably 2.5 to 15 kJ/m$^2$, preferably 3 to 12 kJ/m$^2$), and/or a notched Izod impact strength at −18° C. of 50 J/m or more (preferably 60 J/m or more, preferably 70 to 500 J/m, preferably 80 to 400 J/m, preferably 90 to 300 J/m, preferably 100 to 200 J/m);

where the combination of ICP(s) and ethylene copolymer(s) comprises at least 50 wt % (preferably at least 55 wt %, preferably at least 60 wt %, preferably at least 65 wt %) propylene and at least 10 wt % (preferably at least 15 wt %, preferably at least 20 wt %, preferably at least 25 wt %) ethylene, based on the total weight of the ICP(s) and ethylene polymer(s).

In another embodiment, this invention relates to a heterophase polyolefin composition comprising:
- a) 20 to 98.7 wt % (preferably 30 to 85 wt %, preferably 35 to 90 wt %, preferably 40 to 85 wt %) of one or more ICP(s),
- b) 1 to 40 wt % (preferably 5 to 35 wt %, preferably 10 to 30 wt %, preferably 15 to 25 wt %) of one or more EP Rubber(s),
- c) 0.1 to 20 wt % (preferably 0.5 to 15 wt %, preferably 1 to 10 wt %, preferably 1.5 to 5 wt %) of one or more NFP, and
- d) 0.2 to 50 wt % (preferably 0.5 to 40 wt %, preferably 1 to 30 wt %, preferably 5 to 20 wt %) of one or more filler, based upon the weight of the composition; and having
- i) a melt flow rate of 5 dg/min or more (preferably 10 dg/min or more, preferably 15 to 400 dg/min, preferably 20 to 300 dg/min, preferably 30 to 200 dg/min or more, preferably 35 to 100 dg/min),
- ii) a flexural modulus of 500 MPa or more (preferably 800 MPa or more, preferably 900 to 3500 MPa, preferably 1000 to 3000 MPa, preferably 1100 to 2500 MPa), and
- iii) a notched Charpy impact strength at −30° C. of 1 kJ/m$^2$ or more (preferably 2 kJ/m$^2$ or more, preferably 2.5 to 15 kJ/m$^2$, preferably 3 to 12 kJ/m$^2$), and/or a notched Izod impact strength at −18° C. of 50 J/m or more (preferably 60 J/m or more, preferably 70 to 500 J/m, preferably 80 to 400 J/m, preferably 90 to 300 J/m, preferably 100 to 200 J/m);

where the combination of ICP(s) and EP Rubber(s) comprises at least 50 wt % (preferably at least 55 wt %, preferably at least 60 wt %, preferably at least 65 wt %) propylene and at least 10 wt % (preferably at least 15 wt %, preferably at least 20 wt %, preferably at least 25 wt %) ethylene, based on the total weight of the in-situ ICP(s) and EP Rubber(s).

In another embodiment, this invention relates to a heterophase polyolefin composition comprising:
- a) 20 to 89.7 wt % (preferably 30 to 85 wt %, preferably 35 to 90 wt %, preferably 40 to 85 wt %) of one or more propylene polymer(s),
- b) 10 to 50 wt % (preferably 15 to 45 wt %, preferably 20 to 40 wt %, preferably 25 to 35 wt %) of one or more ethylene copolymer(s),
- c) 0.1 to 20 wt % (preferably 0.5 to 15 wt %, preferably 1 to 10 wt %, preferably 1.5 to 5 wt %) of one or more NFP, and
- d) 0.2 to 50 wt % (preferably 0.5 to 40 wt %, preferably 1 to 30 wt %, preferably 5 to 20 wt %) of one or more filler, based upon the weight of the composition; and having
- i) a melt flow rate of 5 dg/min or more (preferably 10 dg/min or more, preferably 15 to 400 dg/min, preferably 20 to 300 dg/min, preferably 30 to 200 dg/min or more, preferably 35 to 100 dg/min), ii) a flexural modulus of 500 MPa or more (preferably 800 MPa or more, preferably 900 to 3500 MPa, preferably 1000 to 3000 MPa, preferably 1100 to 2500 MPa), and iii) a notched Charpy impact strength at −30° C. of 1 kJ/m$^2$ or more (preferably 2 kJ/m$^2$ or more, preferably 2.5 to 15 kJ/m$^2$, preferably 3 to 12 kJ/m$^2$), and/or a notched Izod impact strength at −18° C. of 50 J/m or more (preferably 60 J/m or more, preferably 70 to 500 J/m, preferably 80 to 400 J/m, preferably 90 to 300 J/m, preferably 100 to 200 J/m);

where the combination of propylene polymer(s) and ethylene copolymer(s) comprises at least 50 wt % (preferably at least 55 wt %, preferably at least 60 wt %, preferably at least 65 wt %) propylene and at least 10 wt % (preferably at least 15 wt %, preferably at least 20 wt %, preferably at least 25 wt %) ethylene, based on the total weight of the propylene polymer(s) and ethylene polymer(s).

In another embodiment, this invention relates to a hetero-phase polyolefin composition comprising:

a) 20 to 89.7 wt % (preferably 30 to 85 wt %, preferably 35 to 90 wt %, preferably 40 to 85 wt %) of one or more propylene polymer(s), b) 10 to 50 wt % (preferably 15 to 45 wt %, preferably 20 to 40 wt %, preferably 25 to 35 wt %) of one or more EP Rubber(s), c) 0.1 to 20 wt % (preferably 0.5 to 15 wt %, preferably 1 to 10 wt %, preferably 1.5 to 5 wt %) of one or more NFP, and d) 0.2 to 50 wt % (preferably 0.5 to 40 wt %, preferably 1 to 30 wt %, preferably 5 to 20 wt %) of one or more filler, based upon the weight of the composition; and having i) a melt flow rate of 5 dg/min or more (preferably 10 dg/min or more, preferably 15 to 400 dg/min, preferably 20 to 300 dg/min, preferably 30 to 200 dg/min or more, preferably 35 to 100 dg/min), ii) a flexural modulus of 500 MPa or more (preferably 800 MPa or more, preferably 900 to 3500 MPa, preferably 1000 to 3000 MPa, preferably 1100 to 2500 MPa), and iii) a notched Charpy impact strength at −30° C. of 1 kJ/m$^2$ or more (preferably 2 kJ/m$^2$ or more, preferably 2.5 to 15 kJ/m$^2$, preferably 3 to 12 kJ/m$^2$), and/or a notched Izod impact strength at −18° C. of 50 J/m or more (preferably 60 J/m or more, preferably 70 to 500 J/m, preferably 80 to 400 J/m, preferably 90 to 300 J/m, preferably 100 to 200 J/m);

where the combination of propylene polymer(s) and EP Rubber(s) comprises at least 50 wt % (preferably at least 55 wt %, preferably at least 60 wt %, preferably at least 65 wt %) propylene and at least 10 wt % (preferably at least 15 wt %, preferably at least 20 wt %, preferably at least 25 wt %) ethylene, based on the total weight of the propylene polymer(s) and EP Rubber(s).

In another embodiment, this invention relates to a hetero-phase polyolefin composition comprising:

a) 20 to 89.7 wt % (preferably 30 to 85 wt %, preferably 35 to 90 wt %, preferably 40 to 85 wt %) of one or more propylene polymer(s), b) 10 to 50 wt % (preferably 15 to 45 wt %, preferably 20 to 40 wt %, preferably 25 to 35 wt %) of one or more ethylene copolymer(s) and one or more EP Rubber(s), c) 0.1 to 20 wt % (preferably 0.5 to 15 wt %, preferably 1 to 10 wt %, preferably 1.5 to 5 wt %) of one or more NFP, and d) 0.2 to 50 wt % (preferably 0.5 to 40 wt %, preferably 1 to 30 wt %, preferably 5 to 20 wt %) of one or more filler, based upon the weight of the composition; and having i) a melt flow rate of 5 dg/min or more (preferably 10 dg/min or more, preferably 15 to 400 dg/min, preferably 20 to 300 dg/min, preferably 30 to 200 dg/min or more, preferably 35 to 100 dg/min), ii) a flexural modulus of 500 MPa or more (preferably 800 MPa or more, preferably 900 to 3500 MPa, preferably 1000 to 3000 MPa, preferably 1100 to 2500 MPa), and iii) a notched Charpy impact strength at −30° C. of 1 kJ/m$^2$ or more (preferably 2 kJ/m$^2$ or more, preferably 2.5 to 15 kJ/m$^2$, preferably 3 to 12 kJ/m$^2$), and/or a notched Izod impact strength at −18° C. of 50 J/m or more (preferably 60 J/m or more, preferably 70 to 500 J/m, preferably 80 to 400 J/m, preferably 90 to 300 J/m, preferably 100 to 200 J/m);

where the combination of propylene polymer(s) and ethylene copolymer(s) and EP Rubber(s) comprises at least 50 wt % (preferably at least 55 wt %, preferably at least 60 wt %, preferably at least 65 wt %) propylene and at least 10 wt % (preferably at least 15 wt %, preferably at least 20 wt %, preferably at least 25 wt %) ethylene, based on the total weight of the propylene polymer(s) and ethylene polymer(s) and EP Rubber(s).

In any of the above embodiments that comprise one or more ICP(s), preferably at least one of the ICP(s) is an in-situ ICP; more preferably all the ICP(s) are in-situ ICP(s). Alternately, the combination of ICP(s) comprises two in-situ ICPs; alternately, the composition comprises only one in-situ ICP.

In any of the above embodiments that comprise one or more propylene polymers(s): Preferably the propylene polymer of the combination of propylene polymer(s) has a melting point of at least 110° C. (preferably at least 120° C., preferably at least 130° C., preferably at least 140° C., preferably at least 150° C., preferably at least 160° C., preferably at least 165° C.).

In any of the above embodiments that comprise one or more ethylene copolymer(s): Preferably the ethylene copolymer or the combination of ethylene copolymer(s) has a density of less than 0.90 g/cm$^3$ (preferably less than 0.89 g/cm$^3$, preferably less than 0.88 g/cm$^3$, preferably less than 0.87 g/cm$^3$).

In any of the above embodiments that comprise one or more EP Rubber(s): Preferably the EP Rubber or the combination of EP Rubber(s) has density of less than 0.87 g/cm$^3$ (preferably less than 0.86 g/cm$^3$).

In any of the above embodiments, preferably the NFP has a kinematic viscosity at 100° C. of 4 cSt or more (preferably 6 cSt or more, preferably 8 cSt or more, preferably 10 cSt or more), a viscosity index of 100 or more (preferably 110 or more, preferably 120 or more, preferably 130 or more), a pour point of −15° C. or less (preferably −20° C. or less, preferably −25° C. or less, preferably −30° C. or less), a flash point of 200° C. or more (preferably 220° C. or more, preferably 240° C. or more, preferably 260° C. or more), and a specific gravity of 0.88 or less (preferably 0.87 or less, preferably 0.86 or less).

In any of the above embodiments, preferably the filler is an inorganic mineral filler with a median particle diameter of less than 50 microns.

In a preferred embodiment, any hetero-phase polyolefin composition of the present invention has:

a) melt flow rate (MFR) of 10 to 500 dg/min (preferably 15 to 200 dg/min, preferably 20 to 100 dg/min, preferably 25-80 dg/min), and b) flexural modulus of 900 to 3500 MPa (preferably 1000 to 3000 MPa, preferably 1100 to 2800 MPa);

and one or both of the following properties:
- c) notched Charpy impact strength at −30° C. of 1.5 to 15 kJ/m² (preferably 2 to 12 kJ/m², preferably 2.5 to 10 kJ/m²), and/or
- d) notched Izod impact strength at −18° C. of 60 to 500 J/m (preferably 70 to 400 J/m, preferably 80 to 350 J/m, preferably 90 to 300 J/m, preferably 100 to 250 J/m);

and optionally one or more of the following properties:
- e) notched Charpy impact strength at 23° C. of 20 kJ/m² or more (preferably 30 kJ/m² or more, preferably 40 kJ/m² or more), and/or
- f) notched Izod impact strength at 23° C. of 100 J/m or more (preferably 150 J/m or more, preferably 200 J/m or more, preferably a "no break"), and/or
- g) ductile failure in a multi-axial impact strength test at 23° C. (preferably ductile failure at 0° C., preferably ductile failure at −30° C.), and/or
- h) heat distortion temperature (HDT) of 60° C. or more (preferably 70° C. or more, preferably 80° C. or more, preferably 90° C. or more), and/or
- i) a tensile strength of 10 MPa or more (preferably 12 MPa or more, preferably 14 MPa or more, preferably, 16 MPa or more, preferably 18 MPa or more), and/or
- j) shrinkage upon injection molding of 0.1 to 5% (preferably 0.15 to 3.5%, preferably 0.2 to 2.5%), and/or
- k) a fogging number (as measured by SAE J1756) of 70 or more (preferably 80 or more, preferably 90 or more, preferably 95 or more).

In another embodiment, the hetero-phase polyolefin composition in the absence of any optional additives has a fogging number (SAE J1756) of 80 or more (preferably 90 or more, preferably 95 or more, preferably 98 or more).

Changes in Properties of the Blend with Addition of NFP

Preferred compositions of the present invention can be characterized in that the glass transition temperature ($T_g$) of at least one polymer component in the composition is depressed by at least 2° C. (preferably at least 4° C., preferably at least 6° C., preferably at least 8° C., preferably at least 8° C., preferably at least 10° C.) for every 1 wt % of NFP present in the composition, while the peak melting temperature of the highest melting component remains within 5° C. (preferably within 4° C., preferably within 3° C., preferably within 2° C.) of its value for the same composition absent the NFP.

Preferred compositions of the present invention can be characterized in that the glass transition temperature ($T_g$) of at least one component in the composition is depressed at least 2° C. (preferably at least 4° C., preferably at least 6° C., preferably at least 8° C., preferably at least 10° C., preferably at least 12° C., preferably at least 15° C., preferably at least 20° C.) relative to its value for the same composition absent the NFP, while the peak melting temperature of the highest melting component remains within 5° C. (preferably within 4° C., preferably within 3° C., preferably within 2° C.) of its value for the same composition absent the NFP.

Preferred compositions of the present invention can be characterized in that the weight loss of the composition containing the NFP is less than 3% (preferably less than 2%, preferably less than 1%) when permanence of the NFP is determined as described in the Experimental Methods section. Weight loss here refers to the reduction in weight in excess of that measured for the same composition without the NFP under the same test conditions.

Preferred compositions of the present invention can be characterized in that the melt flow rate (MFR) of the composition increases by at least 2% (preferably at least 4%, preferably at least 6%, preferably at least 8%, preferably at least 10%, preferably at least 12%, preferably at least 15%, preferably at least 20%) for every 1 wt % of NFP present in the composition as compared to the same composition absent the NFP.

In another embodiment, the hetero-phase polyolefin composition exhibits reduced flow marks, either in severity (visibility rating) or tendency (onset distance from gate) as compared to the same hetero-phase polyolefin composition without NFP (i.e., where the ratio of the remaining component weight fractions is the unchanged). Preferably, the compositions of this invention have a flow mark visibility rating of 3 or less (preferably 2 or less, preferably 1 or less, preferably 0). Preferably, the distance from the gate to the first visible flow mark is 5 in or more (preferably 7 in or more, preferably 9 in or more, preferably 11 in or more, preferably 13 in or more). Preferably, no flow marks are detected. Flow marks are evaluated following the protocol outlined in the Experimental Methods section.

In another embodiment, the hetero-phase polyolefin composition exhibits an equal or better scratch resistance rating as compared the same hetero-phase polyolefin composition without NFP (i.e., where the ratio of the remaining component weight fractions is the unchanged). Preferably, the compositions of this invention have a scratch resistance rating of 3 N or more (preferably 5 N or more, preferably 7 N or more, preferably 10 N or more, preferably 12 N or more). The scratch resistance rating is determined following the protocol outlined in the Experimental Methods section.

Polyolefins

The hetero-phase polyolefin compositions of the present invention include one or more matrix phase component(s), comprised of polypropylene impact copolymer (ICP) and/or propylene homopolymer or copolymer, as well as one or more dispersed phase component(s), comprised of ethylene copolymer and/or EP Rubber. The classes of materials described herein that are useful for the matrix phase can be utilized alone or admixed to obtain desired properties. The classes of materials described herein that are useful for the dispersed phase can be utilized alone or admixed to obtain desired properties. Any polymeric component useful in the present invention may be described by any number of, or any combination of, parameters described herein.

Polypropylene Impact Copolymer (ICP)

The ICP comprises a polypropylene component (A) of hPP or RCP, and a rubber component (B) of propylene copolymer. The morphology is such that the matrix phase is comprised primarily of (A) while the dispersed phase is comprised primarily of (B). Preferred ICPs useful in this invention include those having one or more of the following properties:
1) total propylene content of at least 75 wt % (preferably at least 80 wt %, preferably at least 85 wt %, preferably at least 90 wt %, preferably at least 95 wt %) based on the weight of the ICP; and/or
2) total comonomer content of 1 to 35 wt % (preferably 2 to 30 wt %, preferably 3 to 25 wt %, preferably 5 to 20 wt %) based on the weight of the ICP; and/or
3) rubber content of 5 to 40 wt % (preferably 6 to 35 wt %, preferably 7 to 30 wt %, preferably 8 to 30 wt %) based upon the weight of the ICP; and/or
4) propylene content of the rubber component of 25 to 80 wt % (preferably 30 to 75 wt %, preferably 35 to 70 wt %, preferably at least 40 wt %) based on the weight of the rubber component; and/or
5) ratio of the intrinsic viscosity (IV) of the rubber component to the IV of the polypropylene component of 0.5 to 15 (preferably 0.75 to 12, preferably 1 to 8); and/or 6) propylene meso diads in the polypropylene component of 90% or more (preferably 92% or more, preferably 94% or more, preferably 96% or more); and/or
7) $M_w$ of 20 to 2,000 kg/mol (preferably 50 to 1,000 kg/mol, preferably 90 to 500 kg/mol); and/or
8) melt flow rate (MFR) of 1 to 300 dg/min (preferably 5 to 150 dg/min, preferably 10 to 100 dg/min, preferably 15 to 80 dg/min, preferably 20 to 60 dg/min); and/or
9) melting point ($T_m$, second heat, peak) of 100° C. or more (preferably 110° C. or more, preferably 120° C. or more, preferably 130° C. or more, preferably 140° C. or more, preferably 150° C. or more, preferably 155° C. or more, preferably 160° C. or more); and/or
10) heat of fusion ($H_f$, second heat) of 60 J/g or more (preferably 70 J/g or more, preferably 80 J/g or more, preferably 90 J/g or more, preferably 95 J/g or more, preferably 100 J/g or more); and/or
11) glass transition temperature ($T_g$) of the rubber component of −30° C. or less (preferably −40° C. or less, preferably −50° C. or less); and/or
12) glass transition temperature ($T_g$) of the polypropylene component of −10° C. or more (preferably −5° C. or more, preferably 0° C. or more); and/or
13) flexural modulus of 300 to 3000 MPa (preferably 500 to 2500 MPa, preferably 700 to 2000 MPa, preferably 900 to 1500 MPa); and/or
14) notched Izod impact strength at 23° C. of 2.5 J/m or more (preferably 5 J/m or more, preferably 7.5 J/m or more, preferably 10 J/m or more, preferably 15 J/m or more, preferably 20 J/m or more, preferably 25 J/m or more, preferably 50 J/m or more); and/or
15) Gardner impact strength at −30° C. of 2 to 100 J (preferably 3 to 80 J, preferably 4 to 60 J); and/or
16) heat deflection temperature (HDT) of 80° C. or more (preferably 85° C. or more, preferably 90° C. or more, preferably 95° C. or more).

Comonomers used in conjunction with propylene to make an ICP are chosen from ethylene and $C_4$ to $C_8$ 1-olefins, preferably from ethylene and 1-butene. In a preferred embodiment, the comonomer is ethylene and is present in the ICP at 1 to 50 wt % (preferably 2 to 40 wt %, preferably 3 to 30 wt %, preferably 5 to 20 wt %) based on the weight of the ICP. In another preferred embodiment, the rubber component of the ICP comprises 20 to 75 wt % (preferably 25 to 70 wt %, preferably 30 to 65 wt %, preferably less than 60 wt %) ethylene, and the balance propylene, based on the weight of the rubber component. More than one comonomer may also be employed, preferable selected from ethylene and $C_4$ to $C_8$ 1-olefins, such as ethylene and butene-1 or ethylene and hexene-1, such that the rubber component comprises a propylene terpolymer.

In-situ ICPs are particularly preferred. For in-situ ICPs, the polypropylene (A) and rubber (B) components may be made using any appropriate polymerization process, including gas-phase, solution, slurry, and high-pressure polymerization processes. Preferably, (A) is made in a solution or slurry process, and (B) is made in a gas-phase process. More preferably, the in-situ ICP is made using a slurry reactor to produce an hPP (A) component, and a gas-phase reactor to produce an EP Rubber (B) component. The in-situ ICP polymerization processes may employ any appropriate polymerization catalyst or combination of catalysts, including Ziegler-Natta and/or single-site (e.g., metallocene) polymerization catalysts, which may be supported (for use in heterogeneous catalysis processes) or not (for use in homogeneous catalysis processes). Preferably, (A) and (B) are made using a common supported Ziegler-Natta or single-site catalyst.

In another embodiment, the rubber component comprises a propylene copolymer with a weight-average molecular weight ($M_w$) of at least 50 kg/mol (preferably 100 kg/mol, preferably 150 kg/mol, preferably 200 kg/mol); a molecular weight distribution ($M_w/M_n$) of less than 3.5 (preferably less than 3.0, preferably 1.8 to 2.5); and a CDBI of greater than 60% (preferably greater than 65%, preferably greater than 70%, preferably greater than 75%, preferably greater than 80%, preferably greater than 85%). CDBI is a measure of the composition distribution of monomer within the polymer chains. It is measured as described in WO 93/03093, with the modification that any fractions having a weight-average molecular weight ($M_w$) below 20 kg/mol are ignored in the calculation.

In-situ ICPs useful in the present invention are commercially available from many manufacturers, including ExxonMobil Chemical, Borealis, Dow Chemical (including INSPIRE™ grades), Sunoco Chemical, and Total Petrochemicals. Suitable examples include:

ExxonMobil Chemical In-Situ ICPs

| Grade | MFR (dg/min) | Flexural Modulus (MPa) |
|---|---|---|
| AXO3B | 35 | 1270 |
| PP7032 | 4-5 | 1100-1345 |
| PP7033 | 5-8 | 1000-1250 |
| PP7035 | 35 | 1100 |
| PP7414 | 20 | 1034 |
| PP7575 | 54 | 1100 |
| PP7684 | 20 | 1290 |
| PP8013 | 8 | 900 |
| PP8244 | 15 | 940 |

Dow Chemical In-Situ ICPs

| Grade | MFR (dg/min) | Flexural Modulus (MPa) |
|---|---|---|
| 7C06 | 1.5 | 1280 |
| 7C12 | 22 | 1230 |
| 7C50 | 8 | 960 |
| C104 | 1.2 | 1240 |
| C700 | 35 | 1520 |
| C702 | 18 | 1035 |
| C759 | 21 | 1380 |
| C783 | 3.8 | 1340 |
| Inspire D114 | 0.5 | 1260 |

Sunoco Chemical In-Situ ICPs

| Grade | MFR (dg/min) | Flexural Modulus (MPa) |
|---|---|---|
| KN-501 | 8 | 1170 |
| MV-011 | 35 | 1170 |
| MV-501 | 38 | 1310 |
| TI4005 | 0.5 | 1340 |
| TI4015 | 1.6 | 1240 |
| TI4040 | 4 | 1410 |
| TI4130 | 13 | 1100 |
| TI4230 | 21 | 1070 |
| TI4350 | 35 | 1380 |
| TI4500 | 50 | 1170 |
| TI4700 | 70 | 1310 |
| TI4900 | 115 | 1450 |

Suitable ICPs are also commercially available from Basell Polyolefins, including "Advanced Polyolefins" grades made using their CATALLOY™ polymerization process, some of which are commercially available under the ADFLEX™ tradename. Basell also sells ICPs under the HIFAX™ and PROFAX™ tradenames. Examples include:
Basell Polyolefins In-Situ ICPs

| Grade | MFR (dg/min) | Flexural Modulus (MPa) |
|---|---|---|
| Adflex C200 | 6 | 230 |
| Adflex Q300 | 0.6 | 330 |
| Hifax CA12 | 0.9 | 350 |
| Profax SA933 | 1.4 | 970 |
| Profax SB642 | 22 | 690 |
| Profax SB891 | 35 | 1380 |
| Profax SB912 | 6 | 1450 |
| Profax SC204 | 3.8 | 1590 |
| Profax SD242 | 35 | 1450 |
| Profax SG702 | 18 | 1100 |
| Profax SG722 | 25 | 1030 |
| Profax SG802N | 35 | 1100 |
| Profax SV258 | 1.2 | 1240 |
| Profax SV955 | 35 | 1450 |
| Profax 7823 | 0.45 | 1100 |
| Profax 8623 | 1.5 | 970 |
| Profax 8523 | 4 | 970 |

Useful in-situ-impact copolymers may be prepared by the process described in U.S. Pat. Nos. 4,379,759; 6,342,566; and 6,384,142. A general description of in-situ ICPs can be found in POLYPROPYLENE HANDBOOK, E. P. Moore, Ed. (Hanser-Verlag, 1996).

Propylene Polymers (Homopolymers and Copolymers)

Preferred propylene polymers (homopolymers and copolymers) useful in this invention include those having one or more of the following properties:
1) propylene content of at least 85 wt % (preferably at least 90 wt %, preferably at least 95 wt %, preferably at least 97 wt %, preferably 100 wt %); and/or
2) $M_w$ of 30 to 2,000 kg/mol (preferably 50 to 1,000 kg/mol, preferably 90 to 500 kg/mol); and/or
3) $M_w/M_n$ of 1 to 40 (preferably 1.4 to 20, preferably 1.6 to 10, preferably 1.8 to 3.5, preferably 1.8 to 2.5); and/or
4) branching index (g') of 0.2 to 2.0 (preferably 0.5 to 1.5, preferably 0.7 to 1.3, preferably 0.9 to 1.1); and/or
5) melt flow rate (MFR) of 1 to 300 dg/min (preferably 5 to 150 dg/min, preferably 10 to 100 dg/min, preferably 20 to 60 dg/min); and/or
6) melting point ($T_m$, peak second melt) of at least 100° C. (preferably at least 110° C., preferably at least 120° C., preferably at least 130° C., preferably at least 140° C., preferably at least 150° C., preferably at least 160° C., preferably at least 165° C.); and/or
7) crystallization temperature ($T_c$, peak) of at least 70° C. (preferably at least 90° C., preferably at least 110° C., preferably at least 130° C.); and/or
8) heat of fusion ($H_f$) of 40 to 160 J/g (preferably 50 to 140 J/g, preferably 60 to 120 J/g, preferably 80 to 100 J/g); and/or
9) crystallinity of 5 to 80% (preferably 10 to 75%, preferably 20 to 70%, preferably 30 to 65%, preferably 40 to 60%); and/or
10) propylene meso diads of 90% or more (preferably 92% or more, preferably 94% or more, preferably 96% or more); and/or
11) heat deflection temperature (HDT) of 45 to 140° C. (preferably 60 to 135° C., preferably 75 to 125° C.); and/or
12) Gardner impact strength at 23° C. of 30 to 1300 J (preferably 40 to 800 J, preferably 50 to 600 J); and/or
13) flexural modulus of 300 to 3000 MPa (preferably 600 to 2500 MPa, preferably 800 to 2000 MPa, preferably 1000 to 1500 MPa).

In a preferred embodiment, the propylene polymer is selected from polypropylene homopolymer, polypropylene copolymers, and blends thereof. The homopolymer may be atactic polypropylene, isotactic polypropylene, highly isotactic polypropylene, syndiotactic polypropylene, and blends thereof. The copolymer can be a random copolymer, a statistical copolymer, a block copolymer, and blends thereof.

The method of making the polypropylene is not critical, as it can be made by slurry, solution, gas-phase, high-pressure, or other suitable processes, through the use of catalyst systems appropriate for the polymerization of polyolefins, such as Ziegler-Natta-type catalysts, metallocene-type catalysts, other appropriate catalyst systems or combinations thereof. In a preferred embodiment the propylene polymers are made by the catalysts, activators and processes described in U.S. Pat. Nos. 6,342,566, 6,384,142, WO 03/040201, WO 97/19991 and U.S. Pat. No. 5,741,563. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al., *Selectivity in Propene Polymerization with Metallocene Catalysts*, 100 CHEM. REV. 1253-1345 (2000); and I, II METALLOCENE-BASED POLYOLEFINS (Wiley & Sons 2000).

Polypropylene homopolymers or copolymers useful in the present invention may have some level of isotacticity or syndiotacticity. In one embodiment, the polypropylene is isotactic polypropylene, and in another embodiment, the polypropylene is highly isotactic polypropylene. In a desirable embodiment, the polypropylene is a polypropylene homopolymer having at least 85% (preferably at least 90%) isotactic pentads. In another desirable embodiment, the polypropylene is a polypropylene homopolymer having at least 85% (preferably at least 90%) syndiotactic pentads.

In a particularly preferred embodiment, the propylene polymers useful herein are produced by a metallocene catalyst system, and have a $M_w/M_n$ of 1.5 to 3 (preferably 1.8 to 2.5) and a CDBI of 80 wt % or more (preferably 90 wt % or more).

In another embodiment the propylene polymer is a random copolymer, also known as an "RCP," comprising propylene and up to 20 mole % of ethylene or a $C_4$ to $C_{20}$ olefin, preferably up to 20 mole % ethylene, preferably from 1 to 10 mole % ethylene.

Propylene polymers that are useful in this invention include hPP and RCP grades commercially available from many manufacturers, including ExxonMobil Chemical (including hPP grades sold under the ACHIEVE™ tradename), Basell Polyolefins, Borealis, Dow Chemical, Sunoco Chemical, and Total Petrochemicals.

Ethylene Copolymers

Preferred ethylene copolymers useful in this invention include those having one or more of the following properties:
1) ethylene content of 60 to 90 wt % (preferably 65 to 85 wt %, preferably 65 to 80 wt %, preferably 65 to 75 wt %); and/or
2) ethylene content of 80 to 96 mol % (preferably 82 to 92 mol %, preferably 82 to 88 mol %, preferably 84 to 86 mol %); and/or
3) propylene content of 10 to 20 wt %; and/or
4) butene-1 content of 15 wt % or more (preferably 20 wt % or more, preferably 25 wt % or more); and/or
5) hexene-1 content of 20 wt % or more (preferably 25 wt % or more, preferably 30 wt % or more); and/or
6) octene-1 content of 25 wt % or more (preferably 30 wt % or more, preferably 35 wt % or more); and/or
7) density of 0.91 g/cm³ or less (preferably 0.90 g/cm³ or less, preferably 0.89 g/cm³ or less, preferably 0.88 g/cm³ or less, preferably 0.87 g/cm³ or less, preferably 0.85 g/cm³ or more, preferably 0.855 g/cm³ or more, preferably 0.86 g/cm³ or more, preferably 0.85 to 0.91 g/cm³, preferably 0.85 to 0.90 g/cm³, preferably 0.85 to 0.89 g/cm³, preferably 0.85 to 0.88 g/cm³, preferably 0.855 to 0.88 g/cm³, preferably 0.855 to 0.87 g/cm³, preferably 0.86 to 0.87 g/cm³); and/or 8) heat of fusion ($H_f$) of 90 J/g or less (preferably 70 J/g or less, preferably 50 J/g or less, preferably 30 J/g or less, preferably 10 to 70 J/g, preferably 10 to 50 J/g, preferably 10 to 30 J/g); and/or 9) crystallinity of 40% or less (preferably 30% or less, preferably 20% or less, preferably at least 5%, preferably 5 to 30%, preferably 5 to 20%); and/or 10) melting point ($T_m$, peak first melt) of 100° C. or less (preferably 90° C. or less, preferably 80° C. or less, preferably 70° C. or less, preferably 60° C. or less, preferably 50° C. or less); and/or 11) crystallization temperature ($T_c$, peak) of 90° C. or less (preferably 80° C. or less, preferably 70° C. or less, preferably 60° C. or less, preferably 50° C. or less, preferably 40° C. or less); and/or 12) glass transition temperature ($T_g$) of −20° C. or less (preferably −30° C. or less, preferably −40° C. or less); and/or 13) $M_w$ of 30 to 2,000 kg/mol (preferably 50 to 1,000 kg/mol, preferably 90 to 500 kg/mol); and/or 14) $M_w/M_n$ of 1 to 40 (preferably 1.4 to 20, preferably 1.6 to 10, preferably 1.8 to 3.5, preferably 1.8 to 2.5); and/or 15) branching index (g') of 0.9 or greater (preferably 0.95 or greater, preferably 0.99 or greater); and/or 16) melt index (MI) of 0.1 to 100 dg/min (preferably 0.3 to 60 dg/min, preferably 0.5 to 40 dg/min, preferably 0.7 to 20 dg/min); and/or 17) CDBI of at least 60 wt % (preferably at least 70 wt %, preferably at least 80 wt %, preferably at least 90 wt %, preferably at least 95 wt %).

In preferred embodiment, the ethylene copolymer is an ethylene-based plastomer with a density of 0.86 to 0.91 g/cm³ (preferably 0.86 to 0.90 g/cm³, preferably 0.86 to 0.89 g/cm³, preferably 0.86 to 0.88 g/cm³, preferably 0.86 to 0.87 g/cm³). Preferred plastomers comprise less than 85 wt % (preferably less than 75 wt %) ethylene and up to 50 wt % (preferably 20 to 40 wt %) of one or more olefin comonomers selected from propylene and $C_4$-$C_{20}$ olefins (preferably 1-butene, 1-hexene, and/or 1-octene).

In another preferred embodiment, the ethylene copolymer is an ethylene elastomer with a density of less than 0.86 g/cm³, comprised of ethylene and at least 30 wt % of one or more $C_4$-$C_{20}$ olefin comonomers (preferably 1-butene, 1-hexane, and/or 1-octene).

In any embodiment, the ethylene copolymer can be a random copolymer, a statistical copolymer, a block copolymer, and blends thereof.

The method of making the ethylene copolymer is not critical, as it can be made by slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems or combinations thereof.

In a particularly preferred embodiment, the ethylene copolymers useful herein are produced using a metallocene catalyst system, i.e., a mono- or bis-cyclopentadienyl transition metal catalysts in combination with an activator of alumoxane and/or a non-coordinating anion in solution, slurry, high-pressure, or gas-phase. The catalyst and activator may be supported or unsupported and the cyclopentadienyl rings by may substituted or unsubstituted. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; 5,507,475; EPA 426 637; EPA 573 403; EPA 520 732; EPA 495 375; EPA 500 944; EPA 570 982; WO91/09882; WO94/03506; and U.S. Pat. No. 5,055,438. More generally, preferred plastomers are produced using a single-site catalyst, whether a metallocene catalyst or not, and have a $M_w/M_n$ of 1.5 to 3 (preferably 1.8 to 2.5) and a CDBI of 70% or more (preferably 80% or more, preferably 90% or more).

Plastomers that are useful in this invention include those available from ExxonMobil Chemical (sold under the EXACT™ tradename), Dow Chemical (sold under the AFFINITY™, ENGAGE™, and FLEXOMER™ tradenames), and Mitsui Chemicals (sold under the TAFMER™ tradename). Examples include:

ExxonMobil Chemical EXACT™ Plastomers

| Grade | Comonomer | Density (g/cm³) | Melt-Index (dg/min) | DSC Melting Peak (° C., 10° C./min) |
|---|---|---|---|---|
| 3024 | butene | 0.905 | 4.5 | 98 |
| 3035 | butene | 0.900 | 3.5 | 88 |
| 3128 | butene | 0.900 | 1.2 | 92 |
| 4006 | butene | 0.880 | 10 | 60 |
| 4011 | butene | 0.888 | 2.2 | 70 |
| 4033 | butene | 0.880 | 0.8 | 60 |
| 4049 | butene | 0.873 | 4.5 | 55 |
| 3040 | hexene | 0.900 | 16.5 | 96 |
| 3131 | hexene | 0.900 | 3.5 | 95 |
| 3132 | hexene | 0.900 | 1.2 | 96 |
| 3139 | hexene | 0.900 | 7.5 | 95 |
| 4056 | hexene | 0.883 | 2.2 | 72 |
| 4151 | hexene | 0.895 | 2.2 | 89 |
| 0201 | octene | 0.902 | 1.1 | 95 |
| 0203 | octene | 0.902 | 3.0 | 95 |
| 0210 | octene | 0.902 | 10 | 96 |
| 0230 | octene | 0.902 | 30 | 95 |
| 5061 | octene | 0.868 | 0.5 | 53 |
| 5062 | octene | 0.860 | 0.5 | 43 |
| 5101 | octene | 0.902 | 1.1 | 98 |
| 5171 | octene | 0.870 | 1.0 | 55 |
| 5181 | octene | 0.882 | 1.1 | 73 |
| 5361 | octene | 0.860 | 3.0 | 36 |
| 5371 | octene | 0.870 | 5.0 | 64 |
| 8201 | octene | 0.882 | 1.1 | 67 |
| 8203 | octene | 0.882 | 3.0 | 73 |
| 8210 | octene | 0.882 | 10 | 67 |
| 8230 | octene | 0.882 | 30 | 77 |

EP Rubbers

Preferred EP Rubbers useful in this invention include those having one or more of the following properties:

1) ethylene content of 25 to 80 wt % (preferably 30 to 75 wt %, preferably 35 to 70 wt %, preferably 40 to 65 wt %); and/or 2) diene content of 15 wt % or less (preferably 12 wt % or less, preferably 9 wt % or less, preferably 6 wt % or less, preferably 3 wt % or less, preferably 0 wt %); and/or 3) density of 0.87 g/cm³ or less (preferably 0.865 g/cm³ or less, preferably 0.86 g/cm³ or less, preferably 0.855 g/cm³ or less); and/or 4) heat of fusion ($H_f$), if detected, of less than 20 J/g (preferably less than 15 J/g, preferably less than 10 J/g, preferably less than 5 J/g, preferably a heat of fusion is indiscernible); and/or 5) ethylene or propylene crystallinity, if measurable, of less than 10 wt % (preferably less than 7.5 wt %, preferably less than 5 wt %, preferably less than 2.5 wt %, preferably crystallinity is undetected); and/or
6) melting point ($T_m$, peak first melt), if detected, of 60° C. or less (preferably 50° C. or less, preferably 40° C. or less, preferably 35° C. or less); and/or
7) glass transition temperature ($T_g$) of −30° C. or less (preferably −40° C. or less, preferably −50° C. or less, preferably −60° C. or less); and/or
8) $M_w$ of 50 to 3,000 kg/mol (preferably 100 to 2,000 kg/mol, preferably 200 to 1,000 kg/mol); and/or
9) $M_w/M_n$ of 1.5 to 40 (preferably 1.6 to 30, preferably 1.7 to 20, preferably 1.8 to 10, preferably 1.8 to 5, preferably 1.8 to 3, preferably 1.8 to 2.5); and/or
10) Mooney viscosity, ML(1+4) @ 125° C., of 10 to 100 (preferably 15 to 90, preferably 20 to 85).

Particularly preferred EP Rubbers for use herein contain no diene (i.e., an ethylene-propylene copolymers). If diene is present (i.e., an ethylene-propylene-diene terpolymer), preferably the diene is a norbornene-derived diene such as ethylidene norbornene (ENB) or vinylidene norbornene (VNB). Diene content is measured by ASTM D 6047.

The method of making the EP Rubber is not critical, as it can be made by slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems or combinations thereof.

In a particularly preferred embodiment, the EP Rubbers useful herein are produced using a vanadium-based catalyst system in a solution or slurry process. In another embodiment, the EP Rubbers useful herein are produced using a metallocene-based catalyst system in a solution or slurry process. In yet another embodiment, the EP Rubbers useful herein are produced using any single-sited catalyst system in a solution or slurry process. Preferably, the EP Rubbers made by a vanadium, metallocene, or other single-sited catalyst system has a molecular weight distribution ($M_w/M_n$) of 1.8 to 2.5.

EP Rubbers that are useful in this invention include those available from ExxonMobil Chemical (sold under the Vistalon™ tradename), including:
ExxonMobil Chemical Vistalon™ EP Rubbers

| Grade | Mooney Viscosity (ML1 + 4, 125° C.) | Ethylene (wt %) | Diene (wt %) | Molecular Weight Distribution |
|---|---|---|---|---|
| 404 | 28 | 45 | — | very broad |
| 504 | 25 | 60 | — | broad |
| 606 | 65 | 54 | — | broad |
| 703 | 21 | 73 | — | narrow |
| 706 | 42 | 65 | — | bimodal |
| 707 | 23 | 72 | — | very broad |
| 722 | 16 | 72 | — | narrow |
| 785 | 30 | 49 | — | narrow |
| 805 | 33 | 78 | — | narrow |
| 878 | 51 | 60 | — | narrow |
| MDV 91-9 | 18 | 59 | — | narrow |
| 1703P | 25 | 77 | 0.9 VNB | very broad |
| 2727 | 44 | 57 | 2.0 ENB | broad |
| 3708 | 52 | 70 | 3.4 ENB | broad |
| 2504 | 25 | 58 | 4.7 ENB | broad |
| 2727 | 44 | 56 | 2.0 ENB | broad |
| 4600 | 90 | 60 | 4.5 ENB | bimodal |
| 4709 | 78 | 75 | 4.4 ENB | narrow |
| 5504 | 25 | 45 | 4.7 ENB | medium |
| 5601 | 72 | 68 | 5.0 ENB | tailored |
| 6505 | 53 | 57 | 9.2 ENB | broad |
| 7000 | 59 | 73 | 5.0 ENB | narrow |
| 7001 | 60 | 73 | 5.0 ENB | tailored |
| 7500 | 82 | 56 | 5.7 ENB | bimodal |
| 7800(P) | 20 | 79 | 6.0 ENB | bimodal |
| 8600 | 81 | 58 | 8.9 ENB | bimodal |
| 8609 | 83 | 68 | 8.0 ENB | bimodal |
| 8800 | 15 | 73 | 10.0 ENB | bimodal |
| 9500 | 72 | 60 | 11.0 ENB | bimodal |

Non-Functionalized Plasticizer (NFP)

The hetero-phase polyolefin compositions of the present invention include at least one non-functionalized plasticizer ("NFP"). The classes of materials described herein that are useful as non-functionalized plasticizers can be utilized alone or admixed other NFPs described herein to obtain desired properties. Any NFP useful in the present invention may also be described by any number of, or any combination of, parameters described herein.

An NFP is defined to be a hydrocarbon liquid compound comprising carbon and hydrogen, having functional groups selected from hydroxide, aryls, substituted aryls, halogens, alkoxys, carboxylates, esters, carbon unsaturation, acrylates, oxygen, nitrogen, and carboxyl present to an unappreciable extent. By "unappreciable extent", it is meant that these groups and compounds comprising these groups are not deliberately added to the NFP, and if present at all for any reason, are present at less than 5 wt %. Preferably the these groups and compounds are present at less than 4 wt %, preferably less than 3 wt %, preferably less than 2 wt %, preferably less than 1 wt %, preferably less than 0.7 wt %, preferably less than 0.5 wt %, preferably less than 0.3 wt %, preferably less than 0.1 wt %, preferably less than 0.05 wt %, preferably less than 0.01 wt %, preferably less than 0.001 wt %), based upon the weight of the NFP.

In one embodiment, aromatic moieties (including compounds whose molecules have the ring structure characteristic of benzene, naphthalene, phenanthrene, anthracene, etc.) are substantially absent from the NFP. In another embodiment, naphthenic moieties (including compounds whose molecules have a saturated ring structure such as would be produced by hydrogenating benzene, naphthalene, phenanthrene, anthracene, etc.) are substantially absent from the NFP.

In another embodiment, the NFP is a hydrocarbon that contains olefinic unsaturation to an unappreciable extent. By "unappreciable extent of olefinic unsaturation" it is meant that the carbons involved in olefinic bonds account for less than 10% (preferably less than 8%, preferably less than 6%, preferably less than 4%, preferably less than 2%, preferably less than 1%, preferably less than 0.7%, preferably less than 0.5%, preferably less than 0.3%, preferably less than 0.1%, preferably less than 0.05%, preferably less than 0.01%, preferably less than 0.001%) of the total number of carbons. In some embodiments, the percent of carbons of the NFP involved in olefinic bonds is between 0.001 and 10% of the total number of carbon atoms in the NFP (preferably between 0.01 and 5%, preferably between 0.1 and 2%, preferably less than 1%).

In another embodiment, the NFP comprises $C_6$ to $C_{200}$ paraffins, and $C_8$ to $C_{100}$ paraffins in another embodiment. In another embodiment, the NFP consists essentially of $C_6$ to $C_{200}$ paraffins, or essentially of $C_8$ to $C_{100}$ paraffins in another embodiment. In yet another embodiment, the NFP comprises $C_{20}$ to $C_{1500}$ paraffins, preferably $C_{25}$ to $C_{500}$ paraffins, preferably $C_{25}$ to $C_{500}$ paraffins, preferably $C_{30}$ to $C_{500}$ paraffins, preferably $C_{40}$ to $C_{500}$ paraffins, preferably $C_{40}$ to $C_{250}$ paraffins, preferably $C_{30}$ to $C_{150}$ paraffins, preferably $C_{20}$ to $C_{100}$ paraffins. In a preferred embodiment, the NFP comprises oligomers of $C_5$ to $C_{24}$ olefins.

Particularly preferred NFPs include a) isoparaffins, b) PAOs, c) Group III Mineral Oils, d) high purity hydrocarbon fluids derived from a so-called Gas-To-Liquids processes, and e) mineral oils; with a viscosity index greater than 100 (preferably greater than 120), pour point less than −15° C. (preferably less than −20° C.), specific gravity less than 0.86 (preferably less than 0.855), and flash point greater than 200° C. (preferably greater than 230° C.).

Isoparaffins

In one embodiment of the present invention, the NFP is an isoparaffin-rich hydrocarbon liquid with a pour point of −50° C. or less (preferably −60° C. or less) and a specific gravity of 0.84 or less (preferably 0.83 or less). By "isoparaffin-rich" is meant that the NFP comprises at least 50 wt % (preferably at least 60 wt %, preferably at least 70 wt %, preferably at least 80 wt %, preferably at least 90 wt %, preferably 100 wt %) of $C_6$ to $C_{150}$ (preferably $C_6$ to $C_{100}$, preferably $C_6$ to $C_{25}$, preferably $C_8$ to $C_{20}$) isoparaffins. Preferably the paraffin chains possess $C_1$ to $C_{10}$ alkyl branching along at least a portion of each paraffin chain, where any combination of regio and stereo placement of the alkyl branches may be involved. Isoparaffin liquids may also include a minor amount of (less than 50 wt %, preferably less than 30 wt %, preferably less than 10 wt %) of cycloparaffins with isoparaffinic branched side chains. Isoparaffins may include any combination of regio and stereo placement of the alkyl branches.

In one embodiment, the number-average molecular weight of the isoparaffin-rich fluid is in the range of 100 to 1000 (preferably 120 to 500, preferably 150 to 300) g/mol. In another embodiment, the isoparaffin-rich NFP has a kinematic viscosity at 40° C. of 1 to 15 cSt (preferably 2 to 10 cSt). In another embodiment, the isoparaffin-rich NFP has a kinematic viscosity at 25° C. of 1 to 30 cSt (preferably 2 to 25 cSt, preferably 3 to 20 cSt, preferably 5 to 15 cSt) and a glass transition temperature ($T_g$) that cannot be determined by ASTM E 1356 or if it can be determined then it is less than 0° C. (preferably less than −10° C., preferably less than −20° C., preferably less than −30° C.).

In another embodiment the isoparaffin-rich NFP has one or more of the following properties:
1. a pour point of −40° C. or less (preferably −50° C. or less, preferably −60° C. or less); and/or
2. a glass transition temperature ($T_g$) determined by ASTM E 1356 of less than −20° C. (preferably less than −30° C., preferably less than −50° C.), or a $T_g$ that can not be determined by ASTM E 1356; and/or
3. a kinematic viscosity at 25° C. of from 1 to 30 cSt; and/or
4. a number average molecular weight ($M_n$) between 2,000 and 100 g/mol (preferably between 1500 and 150 g/mol, preferably between 1000 and 200 g/mol); and/or
5. a flash point (ASTM D 56 or D 93) of 50 to 200° C.; and/or
6. a specific gravity (15.6/15.6° C.) of less than 0.85 (preferably less than 0.84, preferably less than 0.83, preferably from 0.65 to 0.85, preferably from 0.70 to 0.84, preferably from 0.75 to 0.83, preferably from 0.800 to 0.840); and/or
7. a density of from 0.70 to 0.85 g/cm³; and/or
8. a distillation range having a difference between the upper and lower temperatures of 40° C. or less (preferably 30° C. or less, preferably 20° C. or less, preferably 10° C. or less, preferably between 6 and 40° C.); and/or
9. a final boiling point of from 115 to 500° C. (preferably from 200 to 450° C., preferably from 250 to 400° C.).

Suitable isoparaffin-rich hydrocarbon liquids are described in, for example U.S. Pat. Nos. 3,818,105, 3,439,088 and 6,197,285, and are commercially available under the tradename ISOPAR™ (ExxonMobil Chemical), some of which are summarized in the table below. Other suitable isoparaffin-rich hydrocarbon liquids are commercial available under the trade names SHELLSOL™ (Royal Dutch/Shell), SOLTROL™ (Chevron Phillips) and SASOL™ (Sasol Limited). The percentage of carbons in chain-type paraffinic structures ($C_P$) in such liquids is close to 100% (95% or more).

ISOPAR™ Series Isoparaffins

| Grade | KV @ 25° C. (cSt) | pour point (° C.) | specific gravity | flash point (° C.) |
|---|---|---|---|---|
| H | 1.8 | −63 | 0.76 | 53 |
| K | 1.9 | −60 | 0.76 | 55 |
| L | 2.0 | −57 | 0.77 | 62 |
| M | 3.8 | −57 | 0.79 | 92 |
| V | 14.8 | −63 | 0.82 | 130 |

In another embodiment, the isoparaffin-rich NFP is a mixture of branched and normal paraffins having 6 to 50 (preferably 8 to 40, preferably 10 to 30) carbon atoms in the molecule. The isoparaffin composition has a ratio of branch paraffin to n-paraffin of 1:1 to 100:1 (preferably 1:1 to 10:1). The distribution of branches in the isoparaffins of the mixture is such that at least 50% (preferably at least 70%) are methyl branches, with less than 50% (preferably less than 30%) of branches with carbon number greater than 1 (for example, ethyl, propyl, butyl or the like). The isoparaffinic mixture boils within a range of from 100 to 350° C. (preferably from 110 to 320° C.) and with a narrow boiling range (preferably 35° C. or less). These branch paraffin/n-paraffin blends are described in, for example, U.S. Pat. No. 5,906,727.

Polyalphaolefins

In another embodiment of the present invention, the NFP comprises a polyalphaolefin (PAO) liquid with a pour point of −10° C. or less and a kinematic viscosity at 100° C. of 3 cSt or more. In general, a PAO liquid comprises hydrocarbon oligomers manufactured by catalytic oligomerization of alpha-olefins, preferably linear alpha-olefins. A PAO may be characterized by any type of tacticity, including isotactic or syndiotactic and/or atactic, and by any degree of tacticity, including isotactic-rich or syndiotactic-rich or fully atactic. PAO liquids are described in, for example, U.S. Pat. Nos. 3,149,178; 4,827,064; 4,827,073; 5,171,908; and 5,783,531 and in SYNTHETIC LUBRICANTS AND HIGH-PERFORMANCE FUNCTIONAL FLUIDS, Leslie R. Rudnick & Ronald L. Shubkin, eds. (Marcel Dekker, 1999), p. 3-52. A PAO is not a polymer.

PAO liquids may be conveniently prepared by the oligomerization of an α-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+$TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts).

In one embodiment, the PAO comprises $C_{15}$ to $C_{1500}$ (preferably $C_{20}$ to $C_{1000}$, preferably $C_{30}$ to $C_{800}$, preferably $C_{35}$ to $C_{400}$, most preferably $C_{40}$ to $C_{250}$) oligomers of alpha-olefins.

These oligomers are dimers, trimers, tetramers, pentamers, etc. In another embodiment, the PAO comprises $C_3$ to $C_{24}$ (preferably $C_5$ to $C_{18}$, preferably $C_6$ to $C_{14}$, even preferably $C_8$ to $C_{12}$, most preferably $C_{10}$) branched or linear alpha-olefins, provided that $C_3$ and $C_4$ alpha-olefins are present at 10 wt % or less. In another embodiment, the PAO comprises $C_3$ to $C_{24}$ (preferably $C_5$ to $C_8$, preferably $C_6$ to $C_{14}$, most preferably $C_8$ to $C_{12}$) linear alpha-olefins (LAOs), provided that $C_3$ and $C_4$ LAOs are present at 10 wt % or less. Suitable olefins include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred.

In one embodiment, a single LAO is used to prepare the oligomers. In this case, a preferred embodiment involves the oligomerization of 1-decene, and the PAO is a mixture of oligomers (including, for example, dimers, trimers, tetramers, pentamers, and higher) of 1-decene. In another embodiment, the PAO comprises oligomers of two or more $C_3$ to $C_{18}$ LAOs (preferably $C_5$ to $C_{18}$ LAOs), to make 'bipolymer' or 'terpolymer' or higher-order copolymer combinations, provided that $C_3$ and $C_4$ LAOs are present at 10 wt % or less. In this case, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene 'terpolymer'.

In another embodiment, the PAO comprises oligomers of a single alpha-olefin species having a carbon number of 5 to 24 (preferably 6 to 18, preferably 8 to 12, most preferably 10). In another embodiment, the NFP comprises oligomers of mixed alpha-olefins (i.e., involving two or more alpha-olefin species), each alpha-olefin having a carbon number of 3 to 24 (preferably 5 to 24, preferably 6 to 18, most preferably 8 to 12), provided that alpha-olefins having a carbon number of 3 or 4 are present at 10 wt % or less. In a particularly preferred embodiment, the PAO comprises oligomers of mixed alpha-olefins (i.e., involving two or more alpha-olefin species) where the weighted average carbon number for the alpha-olefin mixture is 6 to 14 (preferably 8 to 12, preferably 9 to 11).

In another embodiment, the PAO comprises oligomers of one or more α-olefin with repeat unit formulas of

where R is a $C_3$ to $C_{18}$ saturated hydrocarbon branch. Preferably, R is constant for all oligomers. In another embodiment, there is a range of R substituents covering carbon numbers from 3 to 18. Preferably, R is linear, i.e., R is $(CH_2)_z CH_3$, where z is 2 to 17 (preferably 3 to 11, preferably 4 to 9).

Optionally, R may contain one methyl or ethyl branch, i.e.,

R is $(CH_2)_m[CH(CH_3)](CH_2)_n CH_3$ or $(CH_2)_x[CH(CH_2CH_3)](CH_2)_y CH_3$, where (m+n) is 1 to 15 (preferably 1 to 9, preferably 3 to 7) and (x+y) is 1 to 14 (preferably 1 to 8, preferably 2 to 6). Preferably m>n. Preferably m is 0 to 15 (preferably 2 to 15, preferably 3 to 12, preferably 4 to 9) and n is 0 to 10 (preferably 1 to 8, preferably 1 to 6, preferably 1 to 4). Preferably x>y. Preferably x is 0 to 14 (preferably 1 to 14, preferably 2 to 11, preferably 3 to 8) and y is 0 to 10 (preferably 1 to 8, preferably 1 to 6, preferably 1 to 4.) Preferably, the repeat units are arranged in a head-to-tail fashion with minimal heat-to-head connections.

The PAO may be atactic, isotactic, or syndiotactic. In one embodiment, the PAO has essentially the same population of meso [m] and racemic [r] dyads (preferably neither [m] nor [r] greater than 60%, preferably neither greater than 55%) as measured by $^{13}$C-NMR, making it atactic. In another embodiment, the PAO has more than 60% (preferably more than 70%, preferably more than 80%, preferably more than 90%) meso dyads [m]. In another embodiment, the PAO has more than 60% (preferably more than 70%, preferably more than 80%, preferably more than 90%) racemic dyads [r]. In one embodiment, [m]/[r] determined by $^{13}$C-NMR is between 0.9 and 1.1 in one embodiment, [m]/[r] is greater than 1 in another embodiment, and [m]/[r] is less than 1 in yet another embodiment.

Preferred PAOs have a "branching ratio" as defined in U.S. Pat. No. 4,827,064 and measured according to the method described therein, of 0.20 or less (preferably 0.19 or less, preferably 0.18 or less, preferably 0.17 or less, preferably 0.15 or less, preferably 0.12 or less, preferably 0.10 or less).

In one embodiment of the present invention, the PAO has a number average molecular weight of from 100 to 20,000 g/mol (preferably 300 to 15,000 g/mol, preferably 400 to 10,000 g/mol, preferably 500 to 5,000 g/mol, preferably 600 to 3,000 g/mol, preferably 600 to 1,500 g/mol).

In a preferred embodiment, the PAO has a kinematic viscosity at 100° C. of 3 cSt or more (preferably 5 cSt or more, preferably 6 cSt or more, preferably 8 cSt or more, preferably 10 cSt or more, preferably 20 cSt or more, preferably 30 cSt or more, preferably 40 cSt or more, preferably 100 or more, preferably 150 cSt or more). In another embodiment, the PAO has a kinematic viscosity at 100° C. of 300 cSt or less (preferably 100 cSt or less). In another embodiment, the PAO has a kinematic viscosity at 100° C. of 3 to 3,000 cSt (preferably 4 to 1,000 cSt, preferably 6 to 300 cSt, preferably 8 to 150 cSt, preferably 8 to 100 cSt, preferably 8 to 40 cSt). In another embodiment, the PAO has a kinematic viscosity at 100° C. of 10 to 1000 cSt (preferably 10 to 300 cSt, preferably 10 to 100 cSt). In yet another embodiment, the PAO has a kinematic viscosity at 100° C. of about 4 to 8 cSt. In yet another embodiment, the PAO has a kinematic viscosity at 100° C. of 1 to 3 cSt.

In another preferred embodiment, the PAO has a Viscosity Index of 120 or more (preferably 130 or more, preferably 140 or more, preferably 150 or more, preferably 170 or more, preferably 190 or more, preferably 200 or more, preferably 250 or more, preferably 300 or more). In another embodiment, the PAO or blend of PAOs has a viscosity Index of 120 to 350 (preferably 130 to 250).

In yet another preferred embodiment, the PAO has a pour point of −10° C. or less (preferably −20° C. or less, preferably −25° C. or less, preferably −30° C. or less, preferably −35° C. or less, preferably −40° C. or less, preferably −50° C. or less). In another embodiment, the PAO or blend of PAOs has a pour point of −15 to −70° C. (preferably −25 to −60° C.).

In yet another preferred embodiment, the PAO has a glass transition temperature ($T_g$) of −40° C. or less (preferably −50° C. or less, preferably −60° C. or less, preferably −70° C. or less, preferably −80° C. or less). In another embodiment, the PAO or blend of PAOs has a $T_g$ of −50 to −120° C. (preferably −60 to −100° C., preferably −70 to −90° C.).

In yet another preferred embodiment, the PAO has a flash point of 200° C. or more (preferably 210° C. or more, preferably 220° C. or more, preferably 230° C. or more), preferably between 240° C. and 290° C.

In yet another preferred embodiment, the PAO has a specific gravity (15.6/15.6° C.) of 0.86 or less (preferably 0.855 or less, preferably 0.85 or less, preferably 0.84 or less).

Particularly preferred PAOs are those having A) a flash point of 200° C. or more (preferably 210° C. or more, preferably 220° C. or more, preferably 230° C. or more); and B) a pour point less than −20° C. (preferably less than −25° C., preferably less than −30° C., preferably less than −35°, preferably less than −40° C.) and/or a kinematic viscosity at 100° C. of 10 cSt or more (preferably 35 cSt or more, preferably 40 cSt or more, preferably 50 cSt or more).

Further preferred PAOs have a kinematic viscosity at 100° C. of at least 3 cSt (preferably at least 6 cSt, preferably at least 8 cSt, most preferably at least 10 cSt); a viscosity index of at least 120 (preferably at least 130, preferably at least 140, most preferably at least 150); a pour point of −10° C. or less (preferably −20° C. or less, preferably −30° C. or less, most preferably −40° C. or less); and a specific gravity (15.6/15.6° C.) of 0.86 or less (preferably 0.855 or less, preferably 0.85 or less, most preferably 0.84 or less).

The PAO may be comprised of one or more distinct PAO components. In one embodiment, the NFP is a blend of one or more PAOs with different compositions (e.g., different α-olefin(s) were used to make the oligomers) and/or different physical properties (e.g., kinematic viscosity, pour point, viscosity index, and/or glass transition temperature).

Desirable PAOs are available as SpectraSyn™ and SpectraSyn Ultra™ from ExxonMobil Chemical in Houston, Tex. (previously sold under the SHF and SuperSyn™ tradenames by ExxonMobil Chemical Company), some of which are summarized in the table below. Other useful PAOs include Synfluid™ available from ChevronPhillips Chemical Company (Pasedena, Tex.), Durasyn™ available from Innovene (Chicago, Ill.), Nexbase™ available from Neste Oil (Keilaniemi, Finland), and Synton™ available from Chemtura Corporation (Middlebury, Conn.). The percentage of carbons in chain-type paraffinic structures ($C_P$) is close to 100% (typically greater than 98% or even 99%) for PAOs.

SpectraSyn™ Series Polyalphaolefins

| Grade ID | KV @ 100° C., cSt | KV @ 40° C., cSt | VI | Pour Point, ° C. | Specific gravity | Flash Point, ° C. |
|---|---|---|---|---|---|---|
| 4 | 4 | 19 | 126 | −66 | 0.820 | 220 |
| Plus 4 | 4 | 17 | 122 | −60 | 0.820 | 228 |
| 6 | 6 | 31 | 138 | −57 | 0.827 | 246 |
| Plus 6 | 6 | 30 | 140 | −54 | 0.827 | 246 |
| 8 | 8 | 48 | 139 | −48 | 0.833 | 260 |
| 10 | 10 | 66 | 137 | −48 | 0.835 | 266 |
| 40 | 39 | 396 | 147 | −36 | 0.850 | 281 |
| 100 | 100 | 1240 | 170 | −30 | 0.853 | 283 |
| Ultra 150 | 150 | 1,500 | 218 | −33 | 0.850 | >265 |
| Ultra 300 | 300 | 3,100 | 241 | −27 | 0.852 | >265 |
| Ultra 1000 | 1,000 | 10,000 | 307 | −18 | 0.855 | >265 |

This invention also relates to hetero-phase polyolefin compositions comprising one or more polyolefins, preferably polypropylene, and one or more non-functionalized plasticizers where the non-functionalized plasticizer comprises a polyalphaolefin comprising oligomers of $C_5$ to $C_{18}$ olefins (preferably $C_6$ to $C_{14}$, preferably $C_8$ to $C_{12}$, preferably $C_{10}$); having a kinematic viscosity at 100° C. of 5 cSt or more (preferably 8 cSt or more, preferably 10 cSt or more); a viscosity index of 120 or more (preferably 130 or more); and a pour point of −10° C. or less (preferably −20° C. or less, preferably −30° C. or less).

This invention also relates to polyolefin compositions comprising a polypropylene-based TPO and one or more non-functionalized plasticizers where the non-functionalized plasticizer comprises oligomers of linear olefins having 5 to 18 carbon atoms (preferably 6 to 14 carbon atoms, preferably 8 to 12 carbon atoms, preferably 10 carbon atoms); a kinematic viscosity at 100° C. of 5 to 300 cSt (preferably 8 to 150 cSt, preferably 10 to 100 cSt); a viscosity index of 120 or more (preferably 130 or more, preferably 140 or more); and a pour point of −20° C. or less (preferably −30° C. or less, preferably −40° C. or less).

Polybutenes

In some embodiments of the present invention, the NFP comprises oligomers of $C_4$ olefins (including 1-butene, 2-butene, isobutylene, and butadiene, and mixtures thereof) and up to 10 wt % other olefins, often referred to as a "polybutenes" liquid when the oligomers comprise primarily isobutylene and 1-butene. As used herein, the term "polybutenes" also includes homopolymer oligomers of isobutylene or 1-butene, copolymer oligomers of a $C_4$ raffinate stream, and copolymer oligomers of $C_4$ olefins with ethylene and/or propylene and/or $C_5$ olefins. Such liquids are commonly used as additives for polyolefins; e.g. to introduce tack or as a processing aid. The ratio of $C_4$ olefin isomers can vary by manufacturer and by grade, and the material may or may not be hydrogenated after synthesis. Polybutenes are described in, for example, SYNTHETIC LUBRICANTS AND HIGH-PERFORMANCE FUNCTIONAL FLUIDS (Leslie R. Rudnick & Ronald L. Shubkin, ed., Marcel Dekker 1999), p. 357-392.

Preferred polybutenes include those in which isobutylene derived units comprise 40 to 100 wt % (preferably 40 to 99 wt %, preferably 40 to 96 wt %) of the polymer; and/or the 1-butene derived units comprise 0 to 40 wt % (preferably 2 to 40 wt %) of the copolymer; and/or the 2-butene derived units comprise 0 to 40 wt % (preferably 0 to 30 wt %, preferably 2 to 20 wt %) of the polymer.

Suitable polybutenes may have a kinematic viscosity at 100° C. of 3 to 50,000 cSt (more commonly 5 to 3000 cSt), a pour point of −60 to 10° C. (more commonly −40 to 0° C.), and a number-average molecular weight of 300 to 10,000 g/mol (more commonly 500 to 2,000 g/mol). Note that, at the same kinematic viscosity or molecular weight, a polybutenes liquid has a higher specific gravity and lower flash point than a PAO liquid.

Desirable polybutenes liquids are commercially available from a variety of sources including Innovene (Indopol™ grades) and Infineum (C-Series grades). When the $C_4$ olefin is exclusively isobutylene, the material is referred to as "polyisobutylene" or PIB. Commercial sources of PIB include Texas Petrochemical (TPC Enhanced PIB grades). When the $C_4$ olefin is exclusively 1-butene, the material is referred to as "poly-n-butene" or PNB.

Properties of some polybutenes liquids made from $C_4$ olefin(s) are summarized in the table below. In general, grades with a flash point of 200° C. or more also have a pour point greater than −10° C. and/or a VI less than 120. The percentage of carbons in chain-type paraffinic structures ($C_P$) is close to 100% (typically greater than 98% or even 99%) for polybutenes.

Commercial Examples of Oligomers of $C_4$ Olefin(s)

| Grade | KV @ 100° C., cSt | VI | Pour Point, ° C. | Specific gravity | Flash Point, ° C. |
|---|---|---|---|---|---|
| TPC 137 (PIB) | 6 | 132 | −51 | 0.843 | 120 |
| TPC 1105 (PIB) | 220 | 145 | −6 | 0.893 | 200 |
| TPC 1160 (PIB) | 660 | 190 | +3 | 0.903 | 230 |

-continued

| Grade | KV @ 100° C., cSt | VI | Pour Point, ° C. | Specific gravity | Flash Point, ° C. |
|---|---|---|---|---|---|
| Innovene Indopol H-25 | 52 | 87 | −23 | 0.869 | ~150 |
| Innovene Indopol H-50 | 108 | 90 | −13 | 0.884 | ~190 |
| Innovene Indopol H-100 | 218 | 121 | −7 | 0.893 | ~210 |
| Infineum C9945 | 11 | 74* | −34 | 0.854 | 170 |
| Infineum C9907 | 78 | 103* | −15 | 0.878 | 204 |
| Infineum C9995 | 230 | 131* | −7 | 0.888 | 212 |
| Infineum C9913 | 630 | 174* | +10 | 0.888 | 240 |

*Estimated based on the kinematic viscosity at 100° C. and 38° C.

In a preferred embodiment of the present invention, the NFP is not an oligomer of $C_4$ olefins (i.e., 1-butene, 2-butene, isobutylene, butadiene, and mixtures thereof), including polybutenes and/or PIB and/or PNB. In another embodiment, the NFP contains less than 90 wt % (preferably less than 80 wt %, preferably less than 70 wt %, preferably less than 60 wt %, preferably less than 50 wt %, preferably less than 40 wt %, preferably less than 30 wt %, preferably less than 20 wt %, preferably less than 10 wt %, preferably less than 5 wt %, preferably less than 2 wt %, preferably less than 1 wt %, preferably 0 wt %) of $C_4$ olefins, in particular 1-butene and isobutylene.

In yet another embodiment, when an NFP is present, oligomers of $C_4$ olefins (i.e., 1-butene, 2-butene, isobutylene, butadiene, and mixtures thereof) may also be present in the composition. In a preferred embodiment, the composition comprises less than 50 wt % (preferably less than 40%, preferably less than 30 wt %, preferably less than 20 wt %, preferably less than 10 wt %, preferably less than 5 wt %, preferably less than 1 wt %, preferably 0 wt %) of oligomers of $C_4$ olefins, including polybutenes and/or PIB and/or PNB.

High Purity Hydrocarbon Fluids

In another embodiment, the NFP is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures. Preferably, the mixture of paraffins comprises a wax isomerate lubricant basestock or oil, which includes:

1. hydroisomerized natural and refined waxes, such as slack waxes, deoiled waxes, normal alpha-olefin waxes, microcrystalline waxes, and waxy stocks derived from gas oils, fuels hydrocracker bottoms, hydrocarbon raffinates, hydrocracked hydrocarbons, lubricating oils, mineral oils, polyalphaolefins, or other linear or branched hydrocarbon compounds with carbon number of about 20 or more; and
2. hydroisomerized synthetic waxes, such as Fischer-Tropsch waxes (i.e., the high boiling point residues of Fischer-Tropsch synthesis, including waxy hydrocarbons); or mixtures thereof. Most preferred are lubricant basestocks or oils derived from hydrocarbons synthesized in a Fischer-Tropsch process as part of an overall Gas-to-Liquids (GTL) process.

In one embodiment, the mixture of paraffins has two or more of the following properties:

1. a naphthenic content of less than 40 wt % (preferably less than 30 wt %, preferably less than 20 wt %, preferably less than 15 wt %, preferably less than 10 wt %, preferably less than 5 wt %, preferably less than 2 wt %, preferably less than 1 wt %) based on the total weight of the hydrocarbon mixture; and/or
2. a normal paraffins content of less than 5 wt % (preferably less than 4 wt %, preferably less than 3 wt %, preferably less than 1 wt %) based on the total weight of the hydrocarbon mixture; and/or
3. an aromatic content of 1 wt % or less (preferably 0.5 wt % or less); and/or
4. a saturates level of 90 wt % or higher (preferably 95 wt % or higher, preferably 98 wt % or higher, preferably 99 wt % or higher); and/or
5. the percentage of carbons in chain-type paraffinic structures ($C_P$) of 80% or more (preferably 90% or more, preferably 95% or more, preferably 98% or more); and/or
6. a branched paraffin:normal paraffin ratio greater than about 10:1 (preferably greater than 20:1, preferably greater than 50:1, preferably greater than 100:1, preferably greater than 500:1, preferably greater than 1000:1); and/or
7. sidechains with 4 or more carbons making up less than 10% of all sidechains (preferably less than 5%, preferably less than 1%); and/or
8. sidechains with 1 or 2 carbons making up at least 50% of all sidechains (preferably at least 60%, preferably at least 70%, preferably at least 80%, preferably at least 90%, preferably at least 95%, preferably at least 98%); and/or
9. a sulfur content of 300 ppm or less (preferably 100 ppm or less, preferably 50 ppm or less, preferably 10 ppm or less) where ppm is on a weight basis; and/or
10. a nitrogen content of 300 ppm or less (preferably 100 ppm or less, preferably 50 ppm or less, preferably 10 ppm or less) where ppm is on a weight basis; and/or
11. a number-average molecular weight of 300 to 1800 g/mol (preferably 400 to 1500 g/mol, preferably 500 to 1200 g/mol, preferably 600 to 900 g/mol); and/or
12. a kinematic viscosity at 40° C. of 10 cSt or more (preferably 25 cSt or more, preferably between about 50 and 400 cSt); and/or
13. a kinematic viscosity at 100° C. ranging from 2 to 50 cSt (preferably 3 to 30 cSt, preferably 5 to 25 cSt, preferably 6 to 20 cSt, preferably 8 to 16 cSt); and/or
14. a viscosity index (VI) of 80 or greater (preferably 100 or greater, preferably 120 or greater, preferably 130 or greater, preferably 140 or greater, preferably 150 or greater, preferably 160 or greater, preferably 180 or greater); and/or
15. a pour point of −5° C. or lower (preferably −10° C. or lower, preferably −15° C. or lower, preferably −20° C. or lower, preferably −25° C. or lower, preferably −30° C. or lower); and/or
16. a flash point of 200° C. or more (preferably 220° C. or more, preferably 240° C. or more, preferably 260° C. or more); and/or
17. a specific gravity (15.6° C./15.6° C.) of 0.86 or less (preferably 0.85 or less, preferably 0.84 or less); and/or
18. an aniline point of 120° C. or more; and/or
19. a bromine number of 1 or less.

In a preferred embodiment, the mixture of paraffins comprises a GTL basestock or oil. GTL basestocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks, such as: hydrogen, carbon dioxide, carbon monoxide, water, methane, ethane, ethylene, acetylene, propane, propylene, propyne, butane, butylenes, and butynes. Preferably, the feedstock is "syngas" (synthesis gas, essentially CO and $H_2$) derived from a suitable source, such as natural gas and/or coal. GTL basestocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL basestocks and oils may further comprise other hydroisomerized basestocks and base oils. Particularly preferred GTL basestocks or oils are those comprising mostly hydroisomerized F-T waxes and/or other liquid hydrocarbons obtained by a F-T synthesis process.

The synthesis of hydrocarbons, including waxy hydrocarbons, by F-T may involve any suitable process known in the art, including those involving a slurry, a fixed-bed, or a fluidized-bed of catalyst particles in a hydrocarbon liquid. The catalyst may be an amorphous catalyst, for example based on a Group VIII metal such as Fe, Ni, Co, Ru, and Re on a suitable inorganic support material, or a crystalline catalyst, for example a zeolitic catalyst. The process of making a lubricant basestock or oil from a waxy stock is characterized as a hydrodewaxing process. A hydrotreating step, while typically not required for F-T waxes, can be performed prior to hydrodewaxing if desired. Some F-T waxes may benefit from removal of oxygenates while others may benefit from oxygenates treatment prior to hydrodewaxing. The hydrodewaxing process is typically conducted over a catalyst or combination of catalysts at high temperatures and pressures in the presence of hydrogen. The catalyst may be an amorphous catalyst, for example based on Co, Mo, W, etc. on a suitable oxide support material, or a crystalline catalyst, for example a zeolitic catalyst such as ZSM-23 and ZSM-48 and others disclosed in U.S. Pat. No. 4,906,350, often used in conjunction with a Group VIII metal such as Pd or Pt. This process may be followed by a solvent and/or catalytic dewaxing step to lower the pour point of the hydroisomerate. Solvent dewaxing involves the physical fractionation of waxy components from the hydroisomerate. Catalytic dewaxing converts a portion of the hydroisomerate to lower boiling hydrocarbons; it often involves a shape-selective molecular sieve, such as a zeolite or silicoaluminophosphate material, in combination with a catalytic metal component, such as Pt, in a fixed-bed, fluidized-bed, or slurry type process at high temperatures and pressures in the presence of hydrogen.

Useful catalysts, processes, and compositions for GTL basestocks and oils, Fischer-Tropsch hydrocarbon derived basestocks and oils, and wax isomerate hydroisomerized basestocks and oils are described in, for example, U.S. Pat. Nos. 2,817,693; 4,542,122; 5,545,674; 4,568,663; 4,621,072; 4,663,305; 4,897,178; 4,900,407; 4,921,594; 4,923,588; 4,937,399; 4,975,177; 5,059,299; 5,158,671; 5,182,248; 5,200,382; 5,290,426; 5,516,740; 5,580,442; 5,885,438; 5,935,416; 5,935,417; 5,965,475; 5,976,351; 5,977,425; 6,025,305; 6,080,301; 6,090,989; 6,096,940; 6,103,099; 6,165,949; 6,190,532; 6,332,974; 6,375,830; 6,383,366; 6,475,960; 6,620,312; and 6,676,827; European Patents EP 324528, EP 532116, EP 532118, EP 537815, EP 583836, EP 666894, EP 668342, EP 776959; WPO patent applications WO 97/31693, WO 99/20720, WO 99/45085, WO 02/64710, WO 02/64711, WO 02/70627, WO 02/70629, WO 03/33320; and British Patents 1350257; 1390359; 1429494; and 1440230. Particularly favorable processes are described in European Patent Applications EP 464546 and EP 464547. Processes using Fischer-Tropsch wax feeds are described in U.S. Pat. Nos. 4,594,172; 4,943,672; 6,046,940; 6,103,099; 6,332,974; 6,375,830; and 6,475,960.

Desirable GTL-derived fluids are expected to become broadly available from several sources, including Chevron, ConocoPhillips, ExxonMobil, Sasol, SasolChevron, Shell, Statoil, and Syntroleum.

This invention also relates to plasticized polyolefin compositions comprising one or more polyolefins and one or more non-functionalized plasticizers, where one or more NFP is a high purity hydrocarbon fluid derived from a GTL process comprising a mixture of paraffins of carbon number ranging from about $C_{20}$ to $C_{100}$, a molar ratio of isoparaffins: n-paraffins greater than about 50:1, the percentage of carbons in paraffinic structures ($C_P$) of 98% or more, a pour point ranging from about −20 to −60° C., and a kinematic viscosity at 100° C. ranging from about 6 to 20 cSt.

As used herein, the following terms have the indicated meanings: "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of 0° C. or above, and consisting predominantly of paraffinic molecules, most of which are normal paraffins; "slack wax" is the wax recovered from petroleum oils such as by solvent dewaxing, and may be further hydrotreated to remove heteroatoms.

Group III Mineral Oils

In another embodiment, the NFP comprises a Group III Mineral Oil. Preferably the NFP has a saturates levels of 90% or more (preferably 92% or more, preferably 94% or more, preferably 95% or more, preferably 98% or more); a sulfur content of less than 0.03% (preferably between 0.001 and 0.01%); and a VI of 120 or more (preferably 130 or more, preferably 140 or more). Preferably the Group III Mineral Oil has a kinematic viscosity at 100° C. of 3 to 50, preferably 4 to 40 cSt, preferably 6 to 30 cSt, preferably 8 to 20; and/or a number average molecular weight of 300 to 5,000 g/mol, preferably 400 to 2,000 g/mol, preferably 500 to 1,000 g/mol. Preferably the Group III Mineral Oil has a pour point of −10° C. or less, a flash point of 200° C. or more, and a specific gravity (15.6° C./15.6° C.) of 0.86 or less.

Preferably, the Group III Mineral Oil is a Group III basestock. Desirable Group III basestocks are commercially available from a number of sources and include those described in the table below. The percentage of carbons in chain-type paraffinic structures ($C_P$) in such liquids is greater than 80%.

Commercially Available Group III Basestocks

|  | KV @ 100° C., cSt | VI | Pour Point, ° C. | Specific gravity | Flash Point, ° C. |
|---|---|---|---|---|---|
| UCBO 4R[1] | 4.1 | 127 | −18 | 0.826 | 216 |
| UCBO 7R[1] | 7.0 | 135 | −18 | 0.839 | 250 |
| Nexbase 3043[2] | 4.3 | 124 | −18 | 0.831 | 224 |
| Nexbase 3050[2] | 5.1 | 126 | −15 | 0.835 | 240 |
| Nexbase 3060[2] | 6.0 | 128 | −15 | 0.838 | 240 |
| Nexbase 3080[2] | 8.0 | 128 | −15 | 0.843 | 260 |
| Yubase YU-4[3] | 4.2 | 122 | −15 | 0.843 | 230 |
| Yubase YU-6[3] | 6.5 | 131 | −15 | 0.842 | 240 |
| Yubase YU-8[3] | 7.6 | 128 | −12 | 0.850 | 260 |
| Ultra-S 4[4] | 4.3 | 123 | −20 | 0.836 | 220 |
| Ultra-S 6[4] | 5.6 | 128 | −20 | 0.839 | 234 |
| Ultra-S 8[4] | 7.2 | 127 | −15 | 0.847 | 256 |
| VHVI 4[5] | 4.6 | 128 | −21 | 0.826 |  |
| VHVI 8[5] | 8.0 | 127 | −12 | 0.850 | 248 |
| Visom 4[6] | 4.0 |  |  |  | 210 |
| Visom 6[6] | 6.6 | 148 | −18 | 0.836 | 250 |

[1]Available from ChevronTexaco (USA).
[2]Available from Neste Oil (Finland).
[3]Available from SK Corp (South Korea).
[4]Available from ConocoPhillips (USA)/S-Oil (South Korea).
[5]Available from PetroCanada (Canada).
[6]Available from ExxonMobil (USA).

Exceptional Paraffinic Process Oils

In another embodiment, the NFP is an Exceptional Paraffinic Process Oil, which is a paraffinic process oil with A) a viscosity index less than 120 (preferably 90 to 119), and
B) a $C_P$ of 65% or more (preferably 68% or more, preferably 70% or more, preferably 75% or more, preferably 80% or more), and
C) a $C_A$ of 1% or less (preferably 0.5% or less, preferably 0%), and
D) a kinematic viscosity at 40° C. of 80 cSt or more (preferably 90 cSt or more, preferably 100 cSt or more, preferably 120 cSt or more, preferably 150 cSt or more, preferably 200 cSt or more, preferably 250 cSt or more, preferably 300 cSt or more), and
E) a pour point of −15° C. or less (preferably −18° C. or less, preferably −20° C. or less, preferably −25° C. or less, preferably −30° C. or less, preferably −35° C. or less).

Examples of commercially available paraffinic process oils are described in the tables below; each has a viscosity index less than 120, so none are Group III Mineral Oils. Furthermore, all have less than 80% carbons in paraffinic chain-like structures ($C_P$<80%), meaning they also all have more than 20% carbons in aromatic and/or naphthenic ring-like structures ($C_A+C_N$). Conventional Paraffinic Process Oils, as shown in the first table, are low viscosity and/or have relatively high pour points. The Exceptional Paraffinic Process Oils in the second table are examples from a very select subcategory of paraffinic process oils that have a kinematic viscosity at 40° C. of 80 cSt or more (indicating the potential for high permanence) and a pour point of −15° C. or less (indicating the potential for high plasticization efficiency).

Commercial Examples of Conventional Paraffinic Process Oils

|  | KV @ 40° C. cSt | KV @ 100° C. cSt | VI | Pour Point ° C. | Specific gravity | Flash Point ° C. | $C_P$ % |
|---|---|---|---|---|---|---|---|
| Drakeol 34[1] | 76 | 9 | 99 | −12 | 0.872 | 254 | 68 |
| Paralux 1001R[2] | 20 | 4 | 99 | −17 | 0.849 | 212 | 68 |
| Paralux 2401R[2] | 43 | 6 | 101 | −12 | 0.866 | 234 | 66 |
| Sunpar 120[3] | 41 | 6 | 106 | −15 | 0.872 | 228 | 68 |
| Sunpar 150[3] | 94 | 11 | 97 | −12 | 0.881 | 245 | 65 |
| Sunpar 2280[3] | 475 | 31 | 95 | −9 | 0.899 | 305 | 67 |
| Plastol 135[4] | 24 | 5 | 104 | −9 | 0.865 | 210 | 67 |
| Plastol 537[4] | 103 | 11 | 97 | −3 | 0.880 | 240 | 66 |
| Plastol 2105[4] | 380 | 30 | 110 | −15 | 0.885 | 270 |  |
| Flexon 843[4] | 30 | 5 | 91 | −12 | 0.869 | 218 | 65 |
| Flexon 865[4] | 106 | 11 | 93 | −3 | 0.879 | 252 | 69 |
| Flexon 815[4] | 457 | 32 | 101 | −9 | 0.895 | 310 | 67 |
| Shellflex 210[5] | 19 | 4 | 95 | −18 | 0.860 | 216 | 66 |
| Shellflex 330[5] | 70 | 9 | 95 | −10 | 0.875 | 256 | 68 |
| Shellflex 810[5] | 501 | 33 | 95 | −9 | 0.896 | 324 | 69 |
| Diana PW32[6] | 31 | 5 | 104 | −18 | 0.862 | 226 | 67 |

[1]Available from Penreco (USA).
[2]Available from Chevron (USA).
[3]Available from Sunoco (USA).
[4]Available from ExxonMobil (USA).
[5]Available from Royal Dutch Shell (UK/Netherlands).
[6]Available from Idemitsu (Japan).

Commercial Examples of Exceptional Paraffinic Process Oils

|  | KV @ 40° C. cSt | KV @ 100° C. cSt | VI | Pour Point ° C. | Specific gravity | Flash Point ° C. | $C_P$ % |
|---|---|---|---|---|---|---|---|
| Paralux 6001R[1] | 118 | 12 | 102 | −21 | 0.875 | 274 | 70 |
| Diana PW90[2] | 90 | 11 | 105 | −22 | 0.872 | 262 | 71 |
| Diana PW380[2] | 376 | 26 | 106 | −19 | 0.877 | 293 | 73 |

[1]Available from Chevron (USA).
[2]Available from Idemitsu (Japan).

Preferably, the NFP is not a naphthenic mineral oil (also called a naphthenic process oil or a naphthenic extender oil), nor is it an aromatic mineral oil (also called an aromatic process oil or an aromatic extender oil). More preferably, naphthenic and aromatic mineral oils are substantially absent from the compositions of the present invention. In certain embodiments, paraffinic mineral oils with a kinematic viscosity at 40° C. of less than 80 cSt and a pour point of greater than −15° C. are substantially absent from the compositions of the present invention.

General Characteristics of Useful NFPs

In preferred embodiments, the NFP has a kinematic viscosity at 100° C. ($KV_{100}$) of 3 cSt or more, preferably 4 cSt or more, preferably 5 cSt or more, preferably 6 cSt or more, preferably 8 cSt or more, preferably 10 cSt or more, preferably 20 cSt or more, preferably 40 cSt or more, preferably 6 to 5000 cSt, preferably 8 to 3000 cSt, preferably 10 to 1000 cSt, preferably 12 to 500 cSt, preferably 15 to 400 cSt, preferably 20 to 350 cSt, preferably 35 to 300 cSt, preferably 40 to 200 cSt, preferably 8 to 300 cSt, preferably 6 to 150 cSt, preferably 10 to 100 cSt, preferably less than 50 cSt, wherein a desirable range may be any combination of any lower $KV_{100}$ limit with any upper $KV_{100}$ limit described herein.

In preferred embodiments, the NFP has a pour point of −10° C. or less, preferably −20° C. or less, preferably −30° C. or less, preferably −40° C. or less, preferably −45° C. or less, preferably −50° C. or less, preferably −10 to −100° C., preferably −15 to −80° C., preferably −15 to −75° C., preferably −20 to −70° C., preferably −25 to −65° C., preferably greater than −120° C., wherein a desirable range may be any combination of any lower pour point limit with any upper pour point limit described herein. In another embodiment, the NFP has a pour point of less than −30° C. when the kinematic viscosity at 40° C. is from 20 to 600 cSt (preferably 30 to 400 cSt, preferably 40 to 300 cSt). Most mineral oils, which typically include aromatic moieties and other functional groups, have a pour point of from 10 to −20° C. in the same kinematic viscosity range.

In a preferred embodiment, the NFP has a glass transition temperature ($T_g$) of −40° C. or less, preferably −50° C. or less, preferably −60° C. or less, preferably −70° C. or less, preferably −80° C. or less, preferably −45 to −120° C., preferably −65 to −90° C., wherein a desirable range may be any combination of any lower $T_g$ limit with any upper $T_g$ limit described herein.

In preferred embodiments, the NFP has a Viscosity Index (VI) of 100 or more, preferably 110 or more, preferably 120 or more, preferably 130 or more, preferably 115 to 350, preferably 135 to 300, preferably 140 to 250, preferably 150 to 200, preferably 125 to 180, wherein a desirable range may be any combination of any lower VI limit with any upper VI limit described herein.

In preferred embodiments, the NFP has a flash point of 200° C. or greater, preferably 210° or greater, preferably 230°

C. or greater, preferably 200 to 350° C., preferably 210 to 300° C., preferably 215 to 290° C., preferably 220 to 280° C., preferably 240 to 280° C., wherein a desirable range may be any combination of any lower flash point limit with any upper flash point limit described herein.

In preferred embodiments, the NFP has a specific gravity of 0.86 or less, preferably 0.855 or less, preferably 0.84 or less, preferably 0.78 to 0.86, preferably 0.79 to 0.855, preferably 0.80 to 0.85, preferably 0.81 to 0.845, preferably 0.82 to 0.84, wherein a desirable range may be any combination of any lower specific gravity limit with any upper specific gravity limit described herein.

In preferred embodiments, the NFP has a number-average molecular weight ($M_n$) of 250 g/mol or more, preferably 300 g/mol or more, preferably 500 g/mol or more, preferably 300 to 21,000 g/mol, preferably 300 to 10,000 g/mol, preferably 400 to 5,000 g/mol, preferably 500 to 3,000 g/mol, preferably 10 kg/mol or less, preferably 5 kg/mol or less, preferably 3 kg/mol or less, preferably 2 kg/mol or less, preferably 1 kg/mol or less, wherein a desirable range may be any combination of any lower $M_n$ limit with any upper $M_n$ limit described herein.

In preferred embodiments, the NFP has a low degree of color, such as typically identified as "water white", "prime white", "standard white", or "bright and clear," preferably an APHA color of 100 or less (preferably 80 or less, preferably 60 or less, preferably 40 or less, preferably 20 or less).

In other embodiments, any NFP may have an initial boiling point of from 300 to 600° C. (preferably 350 to 500° C., preferably greater than 400° C.).

Any of the NFPs for use in the present invention may be described by any embodiment described herein, or any combination of the embodiments described herein. For example, in one embodiment, the NFP is a $C_6$ to $C_{200}$ paraffin having a pour point of less than −25° C. Alternately, the NFP comprises an aliphatic hydrocarbon having a kinematic viscosity of from 0.1 to 1000 cSt at 100° C. Alternately, the NFP is selected from isoparaffins and PAOs and blends thereof having from 8 to 25 carbon atoms.

In another embodiment, the NFP of the present invention comprises $C_{25}$ to $C_{1500}$ paraffins, and $C_{30}$ to $C_{500}$ paraffins in another embodiment, and has a flash point of 200° C. or more and a pour point of −10° C. or less and a viscosity index of 120 or more. Alternately the NFP comprises $C_{25}$ to $C_{1500}$ paraffins, preferably $C_{30}$ to $C_{500}$ paraffins, and has a flash point of 200° C. or more and a pour point of −20° C. or less. Alternately the NFP comprises $C_{25}$ to $C_{1500}$ paraffins, preferably $C_{30}$ to $C_{500}$ paraffins, and has a flash point of 200° C. or more and a kinematic viscosity at 100° C. of 35 cSt or more. In another embodiment, the NFP consists essentially of $C_{35}$ to $C_{300}$ paraffins, preferably the NFP consists essentially of $C_{40}$ to $C_{250}$ paraffins, and has a flash point of 200° C. or more and a pour point of −10° C. or less and a viscosity index of 120 or more. Alternately the NFP consists essentially of $C_{35}$ to $C_{300}$ paraffins, preferably $C_{40}$ to $C_{250}$ paraffins, and has a flash point of 200° C. or more and a pour point of −20° C. or less. Alternately the NFP consists essentially of $C_{35}$ to $C_{300}$ paraffins, preferably $C_{40}$ to $C_{250}$ paraffins, and has a flash point of 200° C. or more and a kinematic viscosity at 100° C. of 35 cSt or more. Alternately the NFP has a flash point of 200° C. or more and a pour point of −20° C. or less. Alternately the NFP has a flash point of 200° C. or more and a kinematic viscosity at 100° C. of 35 cSt or more.

In a preferred embodiment, any NFP described herein has a flash point of 200° C. or more (preferably 210° C. or more) and a pour point of −20° C. or less (preferably −25° C. or less, preferably −30° C. or less, preferably −35° C. or less, preferably −45° C. or less, preferably −50° C. or less).

In another preferred embodiment, the NFP has a flash point of 220° C. or more (preferably 230° C. or more) and a pour point of −10° C. or less (preferably −25° C. or less, preferably −30° C. or less, preferably −35° C. or less, preferably −45° C. or less, preferably −50° C. or less).

In another preferred embodiment, the NFP has a kinematic viscosity at 100° C. of 35 cSt or more (preferably 40 cSt or more, preferably 50 cSt or more, preferably 60 cSt or more) and a specific gravity (15.6/15.6° C.) of 0.87 or less (preferably 0.865 or less, preferably 0.86 or less, preferably 0.855 or less) and a flash point of 200° C. or more (preferably 230° C. or more).

In another preferred embodiment, the NFP has a) a flash point of 200° C. or more; b) a specific gravity of 0.86 or less; and c1) a pour point of −10° C. or less and a viscosity index of 120 or more, or c2) a pour point of −20° C. or less, or c3) a kinematic viscosity at 100° C. of 35 cSt or more.

In another preferred embodiment, the NFP has a) a specific gravity (15.6/15.6° C.) of 0.85 or less (preferably between 0.80 and 0.85); and b1) a kinematic viscosity at 100° C. of 3 cSt or more (preferably 4 or more, preferably 5 cSt or more, preferably 8 cSt or more, preferably 10 cSt or more, preferably 15 cSt or more, preferably 20 cSt or more) and/or b2) a number-average molecular weight ($M_n$) of at least 280 g/mol.

In another preferred embodiment, the NFP has a) a specific gravity (15.6/15.6° C.) of 0.86 or less (preferably between 0.81 and 0.855, preferably between 0.82 and 0.85); and b1) a kinematic viscosity at 100° C. of 5 cSt or more (preferably 6 or more, preferably 8 cSt or more, preferably 10 cSt or more, preferably 12 cSt or more, preferably 15 cSt or more, preferably 20 cSt or more) and/or b2) a number-average molecular weight ($M_n$) of at least 420 g/mol (preferably at least 450 g/mol, preferably at least 480 g/mol, preferably at least 500 g/mol).

In another preferred embodiment, the NFP has a) a specific gravity (15.6/15.6° C.) of 0.87 or less (preferably between 0.82 and 0.87); and b1) a kinematic viscosity at 100° C. of 10 cSt or more (preferably 12 cSt or more, preferably 15 cSt or more, preferably 20 cSt or more, preferably 30 cSt or more, preferably 40 cSt or more) and/or b2) a number-average molecular weight ($M_n$) of at least 700 g/mol (preferably at least 800 g/mol, preferably at least 900 g/mol, preferably at least 1000 g/mol).

In another preferred embodiment, the NFP has a) a specific gravity (15.6/15.6° C.) of 0.88 or less (preferably 0.87 or less, preferably between 0.82 and 0.87); and b1) a kinematic viscosity at 100° C. of 15 cSt or more (preferably 20 cSt or more, preferably 25 cSt or more, preferably 30 cSt or more, preferably 40 cSt or more) and/or b2) a number-average molecular weight ($M_n$) of at least 840 g/mol (preferably at least 900 g/mol).

In another preferred embodiment the NFP has a kinematic viscosity at 100° C. of 3 to 3000 cSt (preferably 6 to 300 cSt, preferably 8 to 100 cSt); and a number average molecular weight ($M_n$) of 300 to 21,000 g/mol (preferably 500 to 5,000 g/mol, preferably 600 to 3,000 g/mol).

In another preferred embodiment the NFP has a kinematic viscosity at 100° C. of 3 to 500 cSt (preferably 6 to 200 cSt, preferably 8 to 100 cSt, preferably 8 to 25 cSt); and a number average molecular weight ($M_n$) of 300 to 10,000 g/mol (preferably 400 to 5,000 g/mol, preferably 500 to 2,500 g/mol, preferably 300 to 1,200 g/mol).

In another preferred embodiment the NFP has a kinematic viscosity at 100° C. of 3 to 100 cSt (preferably 4 to 50 cSt, preferably 6 to 25 cSt, preferably 6 to 15 cSt); and a number average molecular weight ($M_n$) of 300 to 3,000 g/mol (preferably 350 to 2,000 g/mol, preferably 400 to 1,000 g/mol, preferably 300 to 800 g/mol).

In another preferred embodiment, the NFP has a pour point of −25° C. or less (preferably between −30° C. and −90° C.), and a kinematic viscosity in the range of from 20 to 5000 cSt at 40° C. In another preferred embodiment, the NFP has a pour point of −25° C. or less and a Mn of 400 g/mol or greater. Most mineral oils, which typically include functional groups, have a pour point of from 10° C. to −25° C. at the same viscosity and molecular weight ranges.

In another preferred embodiment the NFP has kinematic viscosity at 100° C. of 3 cSt or greater (preferably 6 cSt or greater, preferably 8 cSt or greater) and one or more of the following properties:
1. a pour point of −10° C. or less (preferably −20° C. or less, preferably −30° C. or less, preferably −40° C. or less); and/or,
2. a Viscosity Index of 120 or greater; and/or,
3. a low degree of color, such as typically identified as "water white", "prime white", "standard white", or "bright and clear," preferably an APHA color of 100 or less, preferably 80 or less, preferably 60 or less, preferably 40 or less, preferably 20 or less (preferably 15 or less); and/or
4. a flash point of 200° C. or more (preferably 220° C. or more, preferably 240° C. or more); and/or
5. a specific gravity (15.6° C.) of less than 0.86.

Most mineral oils at the same viscosity range have a pour point greater than −20° C. or an APHA color of greater than 20 or a specific gravity (15.6° C.) of 0.86 or more.

In another preferred embodiment, the NFP has a Viscosity Index of 120 or more and one or more of the following properties:
1. a pour point of −10° C. or less (preferably −20° C. or less, preferably −30° C. or less, preferably −40° C. or less); and/or,
2. a kinematic viscosity at 100° C. of 3 cSt or greater (preferably 6 cSt or greater, preferably 8 cSt or greater, preferably 10 cSt or greater); and/or,
3. a low degree of color, such as typically identified as "water white", "prime white", "standard white", or "bright and clear," preferably an APHA color of 100 or less (preferably 80 or less, preferably 60 or less, preferably 40 or less, preferably 20 or less, preferably 15 or less); and/or
4. a flash point of 200° C. or more (preferably 220° C. or more, preferably 240° C. or more); and/or
5. a specific gravity (15.6° C.) of less than 0.86.

Most mineral oils have a Viscosity Index of less than 120.

In another preferred embodiment, the NFP has a pour point of −20° C. or less, preferably −30° C. or less, and one or more of the following properties:
1. a kinematic viscosity at 100° C. of 3 cSt or greater (preferably 6 cSt or greater, preferably 8 cSt or greater, preferably 10 cSt or more); and/or,
2. a Viscosity Index of 120 or greater (preferably 130 or greater); and/or,
3. a low degree of color, such as typically identified as "water white", "prime white", "standard white", or "bright and clear," preferably APHA color of 100 or less (preferably 80 or less, preferably 60 or less, preferably 40 or less, preferably 20 or less, preferably 15 or less); and/or
4. a flash point of 200° C. or more (preferably 220° C. or more, preferably 240° C. or more); and/or
5. a specific gravity (15.6° C.) of less than 0.86.

Most mineral oils have a kinematic viscosity at 100° C. of less than 6 cSt, or an APHA color of greater than 20, or a flash point less than 200° C. when their pour point is less than −20° C.

In another preferred embodiment the NFP has a glass transition temperature ($T_g$) that cannot be determined by ASTM E 1356 or, if it can be determined, then the $T_g$ according to ASTM E 1356 is less than −20° C. (preferably less than −30° C., preferably less than −40° C.), and has one or more of the following properties:
1. a pour point of −10° C. or less (preferably −15° C. or less, preferably −25° C. or less, preferably −35° C. or less, preferably −45° C. or less); and/or
2. a weight average molecular weight ($M_w$) between 30,000 and 400 g/mol (preferably between 15,000 and 500 g/mol, preferably between 5,000 and 600 g/mol); and/or
3. a number average molecular weight ($M_n$) between 10,000 and 400 g/mol (preferably between 5,000 and 500 g/mol, preferably between 2,000 and 600 g/mol); and/or
4. a flash point of 200° C. or greater; and/or
5. a specific gravity (15.6/15.6° C.) of less than 0.88 (preferably less than 0.86, preferably less than 0.84, preferably from 0.80 to 0.88, preferably from 0.82 to 0.86); and/or
6. an initial boiling point greater than 300° C. (preferably greater than 350° C., preferably greater than 400° C.); and/or
7. a final boiling point of from 300° C. to 800° C. (preferably from 400° C. to 700° C., preferably greater than 500° C.).

In certain particularly preferred embodiments, the NFP has a specific gravity of 0.86 or less (preferably 0.855 or less, preferably 0.85 or less), and one or more of the following:
a) a VI of 120 or more (preferably 135 or more, preferably 140 or more), and/or
b) a flash point of 200° C. or more (preferably 220° C. or more, preferably 240° C. or more).

In certain particularly preferred embodiments, the NFP has a pour point of −10° C. or less (preferably −15° C. or less, preferably −20° C. or less, preferably −25° C. or less), a VI of 120 or more (preferably 135 or more, preferably 140 or more), and optionally a flash point of 200° C. or more (preferably 220° C. or more, preferably 240° C. or more).

In certain particularly preferred embodiments, the NFP has a pour point of −20° C. or less (preferably −25° C. or less, preferably −30° C. or less, preferably −40° C. or less) and one or more of the following:
a) a flash point of 200° C. or more (preferably 220° C. or more, preferably 240° C. or more), and/or
b) a VI of 120 or more (preferably 135 or more, preferably 140 or more), and/or
c) a KV100 of 4 cSt or more (preferably 6 cSt or more, preferably 8 cSt or more, preferably 10 cSt or more), and/or
d) a specific gravity of 0.86 or less (preferably 0.855 or less, preferably 0.85 or less).

In certain particularly preferred embodiments, the NFP has a KV100 of 4 cSt or more (preferably 5 cSt or more, preferably 6 cSt or more, preferably 8 cSt or more, preferably 10 cSt or more), a specific gravity of 0.86 or less (preferably 0.855 or less, preferably 0.85 cSt or less), and a flash point of 200° C. or more (preferably 220° C. or more, preferably 240° C. or more).

In a preferred embodiment, the NFP has a flash point of 200° C. or more (preferably 220° C. or more, preferably 240° C. or more), a pour point of −10° C. or less (preferably −15° C. or less, preferably −20° C. or less, preferably −25° C. or less), a specific gravity of 0.86 or less (preferably 0.855 or less, preferably 0.85 or less), a KV100 of 4 cSt or more (preferably 5 cSt or more, preferably 6 cSt or more, preferably 8 cSt or more, preferably 10 cSt or more), and optionally a VI of 100 or more (preferably 120 or more, preferably 135 or more).

In a preferred embodiment, the NFP has a KV100 of 35 cSt or more (preferably 40 or more) and a specific gravity of 0.86 or less (preferably 0.855 or less), and optionally one or more of the following:
a) a flash point of 200° C. or more (preferably 220° C. or more, preferably 240° C. or more), and/or
b) a pour point of −10° C. or less (preferably −15° C. or less, preferably −20° C. or less, preferably −25° C. or less).

In a preferred embodiment, the NFP has a flash point of 200° C. or more (preferably 210° C. or more, preferably 220° C. or more), a pour point of −10° C. or less (preferably −20° C. or less, preferably −30° C. or less), and a KV100 of 6 cSt or more (preferably 8 cSt or more, preferably 10 cSt or more, preferably 15 cSt or more).

In a preferred embodiment, the NFP has a pour point of −40° C. or less (preferably −50° C. or less) and a specific gravity of 0.84 or less (preferably 0.83 or less).

In a preferred embodiment, the percentage of carbons in chain-type paraffins ($C_P$) for any NFP is at least 80% (preferably at least 85%, preferably at least 90%, even preferably at least 95%, even preferably at least 98%, most preferably at least 99%).

Preferred NFPs of this invention are characterized in that, when blended with the polyolefin(s) to form a plasticized composition, the NFP is miscible with the polyolefin(s) as indicated by no change in the number of tan-delta peaks in the Dynamic Mechanical Analysis trace (DMA Tan-Delta vs temperature) as compared to the same composition without the NFP added. Lack of miscibility is indicated by an increase in the number of tan-delta peaks in DMA trace over those in the composition absent the NFP.

Fillers

The hetero-phase polyolefin compositions of the present invention include at least one filler. The classes of materials described herein that are useful as fillers can be utilized alone or admixed to obtain desired properties. In any of the embodiments, filler may be present at 0.1 to 50 wt % (preferably 1 to 40 wt %, preferably 2 to 30 wt %, preferably 5 to 20 wt %) based on the weight of the total composition. Filler content is equated with the wt % ash content as determined by the ISO 3451-1 (A) test method.

Desirable fillers include but not limited to: mineral aggregates (natural or synthetic), fibers, carbon black, graphite, wollastonite, natural and synthetic clays including nanoclays and organoclays, sand, glass beads, and the like, and any other porous or nonporous fillers and supports known in the art.

In preferred embodiments the filler has a median particle diameter of 0.1-100 microns (preferably 0.5-50 microns, preferably 1 to 20 microns). In other preferred embodiments the filler has a filler shape that is needle-like or plate-like, with an aspect ratio greater than 1.2 (preferably greater than 2, preferably greater than 3, preferably greater than 5, preferably greater than 10, preferably from 2 to 20, preferably from 3-10), where the aspect ratio is the ratio of the longest dimension to the shortest dimension of the particles, on average, and is typically reported by filler manufacturers. In other embodiments the filler has an aspect ratio of essentially 1 (0.9 to 1.1); i.e., it is not needle-like or plate-like but is essentially spherical. In another embodiment, the filler is pulverized. Useful fillers have a specific surface area of 10 to 300 m$^2$/cm$^3$.

In one embodiment of the present invention, the NFP or some portion of the NFP is blended with a filler, desirably a porous filler. The NFP and filler may be blended by, for example, a tumbler or other wet blending apparatus, for a time suitable to form a homogenous composition of NFP and filler, desirably from 1 minute to 5 hours. In another embodiment, a filler may be pre-contacted or pre-absorbed with the NFP or some portion of the NFP prior to contacting the filler with the polyolefin. In another embodiment, the filler, polyolefin, and NFP are contacted simultaneously (or in the same blending apparatus).

Mineral Aggregates

Preferred natural or synthetic mineral fillers include talc, mica, wollastonite, titanium dioxide, silicon carbide, silica, silicon dioxide and other oxides of silica (precipitated or not), calcium silicate, calcium and barium sulfates, calcium carbonate (calcite), lead carbonate, magnesium silicate, magnesium oxysulfates, antimony oxide, zinc white, lithopone, zircon, corundum, spinel, apatite, Barytes powder, magnesiter, dolomite, zinc borate, hydrotalcite compounds of the ions Mg, Ca, or Zn with Al, Cr or Fe and $CO_3$ and/or $HPO_4$ (hydrated or not), quartz powder, hydrochloric magnesium carbonate, alumina, chrome, phosphorous and brominated flame retardants, antimony trioxide, silicone, other metal oxides, other metal carbonates, other metal hydroxides, and blends thereof.

Fibers

Preferred fibers include glass fibers (long or short), carbon fibers, and natural and synthetic polymer fibers including polyethylene terephthalate (PET) fibers and rayon fibers.

Clays

Preferred clays include nanoclays or organoclays to produce a nanocomposite. These clays may comprise one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides. The organoclay may be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and/or florine mica. In another embodiment the filler is a nano-clay with mean particle diameter of less than 1 micron.

Additives

Additives such as antioxidants and stabilizers (including UV stabilizers and other UV absorbers, such as chain-breaking antioxidants), nucleating agents, slip agents, block, antiblock, pigments, dyes, color masterbatches, waxes, processing aids (including pine or coal tars or resins and asphalts), neutralizers (such as hydro talcite), adjuvants, oils, lubricants, low molecular weight resins, surfactants, acid scavengers, anticorrosion agents, cavitating agents, blowing agents, quenchers, antistatic agents, cure or cross linking agents or systems (such as elemental sulfur, organo-sulfur compounds, and organic peroxides), fire retardants, coupling agents (such as silane), and combinations thereof may also be present in the polyolefin compositions described herein. Typical additives used in polypropylene and polypropylene blends are described in POLYPROPYLENE HANDBOOK 2$^{ND}$ ED., N. Pasquini, ed. (Hanser Publishers, 2005). The additives may be present in the typically effective amounts well known in the art, preferably at 0.001 to 50 wt % (preferably 0.01 to 20 wt %, preferably 0.1 to 10 wt %, preferably 0.1 to 1 wt %), based upon the weight of the composition. Pigments, dyes, and other colorants may be present from 0.01 to 10 wt % (preferably 0.1 to 6 wt %).

Antioxidants and Stabilizers

Particularly useful antioxidants and stabilizers such as organic phosphites, hindered amines (including high and low molecular weight hindered amine light stabilizers, or "HALS"), and phenolic antioxidants may be present in the thermoplastic polyolefin compositions of the invention from 0.001 to 2 wt % (preferably from 0.01 to 0.8 wt %, preferably from 0.02 to 0.5 wt %). Non-limiting examples of organic phosphites that are suitable are tris(2,4-di-tert-butylphenyl) phosphite (IRGAFOS 168) and di(2,4-di-tert-butylphenyl) pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114). Preferred antioxidants include phenolic antioxidants, such as Irganox 1010, Irganox, 1076 both available from Ciba-Geigy.

In another embodiment, the polymer concentrate may comprise one or more phenolic antioxidants. Preferred examples of phenolic antioxidants include substituted phenols such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])] propionate, and pentaerythrityl-tetrakis-[3-(3,5-di-t-butyl-4-hydroxyphenyl)] propionate.

Slip Agent

The polyolefin compositions of the present invention may include a slip agent. Preferably, the slip agent is preferably a fast bloom slip agent, and can be a hydrocarbon having one or more functional groups selected from hydroxide, aryls and substituted aryls, halogens, alkoxys, carboxylates, esters, carbon unsaturation, acrylates, oxygen, nitrogen, carboxyl, sulfate and phosphate. In one embodiment the slip agent is an ionic compound. Ionic slip agents include salt derivatives of aromatic or aliphatic hydrocarbon oils, notably metal salts of fatty acids, including metal salts of carboxylic, sulfuric, and phosphoric aliphatic saturated or unsaturated acid having a chain length of 7 to 26 carbon atoms, preferably 10 to 22 carbon atoms. Suitable fatty acids include the monocarboxylic acids lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, and the like, and the corresponding sulfuric and phosphoric acids. Suitable metals include Li, Na, Mg, Ca, Sr, Ba, Zn, Cd, Al, Sn, Pb and so forth. Suitable salts include magnesium stearate, calcium stearate, sodium stearate, zinc stearate, calcium oleate, zinc oleate, magnesium oleate, and so on, as well as the corresponding metal higher alkyl sulfates and metal esters of higher alkyl phosphoric acids.

In another embodiment, fatty acid metal salts are substantially absent from the polyolefin compositions of the present invention.

In one embodiment the slip agent is a non-ionic functionalized compound. Suitable functionalized compounds include: (a) esters, amides, alcohols and acids of oils including aromatic or aliphatic hydrocarbon oils, for example, mineral oils, naphthenic oils, paraffinic oils; natural oils such as castor, corn, cottonseed, olive, rapeseed, soybean, sunflower, other vegetable and animal oils, and so on. Representative functionalized derivatives of these oils include, for example, polyol esters of monocarboxylic acids such as glycerol monostearate, pentaerythritol monooleate, and the like, saturated and unsaturated fatty acid amides or ethylenebis(amides), such as oleamide, erucamide, linoleamide, and mixtures thereof, glycols, polyether polyols like Carbowax, and adipic acid, sebacic acid, and the like; (b) waxes, such as carnauba wax, microcrystalline wax, polyolefin waxes, e.g. polyethylene waxes; (c) fluoro-containing polymers such as polytetrafluoroethylene, fluorine oils, fluorine waxes and so forth; and (d) silicon compounds such as silanes and silicone polymers, including silicone oils, polydimethylsiloxane, amino-modified polydimethylsiloxane, and so on.

The fatty amides useful in the present invention are represented by the formula: $R^1C(O)NHR^2$ where $R^1$ is a saturated or unsaturated alkyl group having of from 7 to 26 carbon atoms, preferably 10 to 22 carbon atoms, and $R^2$ is independently hydrogen or a saturated or unsaturated alkyl group having from 7 to 26 carbon atoms, preferably 10 to 22 carbon atoms. Compounds according to this structure include for example, palmitamide, stearamide, arachidamide, behenamide, oleamide, erucamide, linoleamide, stearyl stearamide, palmityl palmitamide, stearyl arachidamide and mixtures thereof.

The ethylenebis(amides) useful in the present invention are represented by the formula: $RC(O)NHCH_2CH_2NHC(O)R$ where each R is independently is a saturated or unsaturated alkyl group having of from 7 to 26 carbon atoms, preferably 10 to 22 carbon atoms. Compounds according to this structure include for example, stearamidoethylstearamide, stearamidoethylpalmitamide, palmitamido-ethylstearamide, ethylenebisstearamide, ethylenebisoleamide, stearylerucamide, erucamidoethylerucamide, oleamidoethyloleamide, erucamidoethyloleamide, oleamidoethylerucamide, stearamidoethylerucamide, erucamidoethylpalmitamide, palmitamidoethyloleamide and mixtures thereof.

Commercially available examples of fatty amides include Ampacet 10061 which comprises 5% of a 50:50 mixture of the primary amides of erucic and stearic acids in polyethylene; Elvax 3170 which comprises a similar blend of the amides of erucic and stearic acids in a blend of 18% vinyl acetate resin and 82% polyethylene. These slip agents are available from DuPont. Slip agents also are available from Croda Universal, including Crodamide OR (an oleamide), Crodamide SR (a stearamide), Crodamide ER (an erucamide), and Crodamide BR (a behenamide); and from Crompton, including Kemamide S (a stearamide), Kemamide B (a behenamide), Kemamide 0 (an oleamide), Kemamide E (an erucamide), and Kemamide (an N,N'-ethylenebissteramide). Other commercially available slip agents include Erucamid ER erucamide.

Generally preferred concentrations of the slip agent are in the range of from about 0.001% to about 0.5% by weight of the composition, preferably of from about 0.01% to about 0.4% by weight and most preferably of from about 0.1 parts to about 0.3% by weight based on the weight of the composition.

Nucleating Agent

The polyolefin composition described herein may also include the addition of at least one nucleating agent. Typically, nucleating agents increase the rate of crystallization (isothermal and/or non-isothermal) of the polyolefin. A special class of nucleating agents known as clarifying agents typically reduces the size of crystallites, thereby improving the transparency and clarity of articles made from the polyolefin.

Suitable nucleating agents for use herein are disclosed in *Plastics Additive Handbook*, 5th Ed.; H. Zweifel, Ed.; Hanser-Gardner Publications, (2001); Chapter 18, p. 949-972. Suitable nucleating agents for use herein are also disclosed by H. N. Beck in *Heterogeneous Nucleating Agents for Polypropylene Crystallization*, J. APPLIED POLY. SCI. Vol. 11, p. 673-685 (1967) and in Heterogeneous Nucleation Studies on Polypropylene, J. POLY. SCI.: POLY. LETTERS, Vol. 21, p. 347-351 (1983). Useful nucleating agents can be either homogeneous nucleating agents (i.e., melt-soluble, meaning dissolved into the polyolefin) and heterogeneous nucleating agents (i.e., melt-insoluble, meaning suspended or dispersed in the polyolefin). Typical nucleating agents promote at least one crystal polymorph for the polyolefin. For example, when the polyolefin is isotactic polypropylene (iPP), known crystal forms include the so-called alpha, beta, and gamma polymorphs; useful nucleating agents therefore include those that promote alpha crystals in iPP, those that promote beta crystals in iPP, and those that promote gamma crystals in iPP. Suitable nucleating agents also include those that promote crystallization in syndiotactic polypropylene (sPP).

Suitable nucleating agents preferably improve one or more performance parameters of the polyolefin, such as increased clarity, reduced haze, increased stiffness, increased impact toughness, increased heat deflection temperature; and/or processing parameters, such as reduced cycle time or increased line speed. Suitable nucleating agents can be organic, inorganic, or polymeric, and may include combinations of one or more nucleating agent.

The following list is intended to be illustrative of suitable choices of nucleating agents for inclusion in the instant formulations. Suitable nucleating agents include fillers such as silica, kaolin, carbon black, and talc; metal salts including sodium salts, lithium salts, potassium salts, phosphonic acid salts, carboxylate salts, and aromatic carboxylic-acid salts (including norbornene carboxylic-acid salts); metal phosphates (including sodium phosphates), phosphate esters, and phosphate ester salts; metal salts of suberic acid (including the calcium salt); metal salts of hexahydrophthalic acid; salts of disproportionated rosin esters; sorbitol derivatives, including dibenzylidene sorbitol and derivatives, sorbitol acetal and derivatives, and sorbitol di-acetal and derivatives; quinacridone dyes; carboxamide derivatives, including naphthalene carboxamide derivatives; benzenetrisamide derivatives, including 1,3,5-benzenetrisamides described in Blomenhofer, et al, *Macromolecules* 38, 3688-3695 (2005); trimesic acid derivatives; and polymeric nucleating agents such as poly(3-methyl-1-butene), poly(dimethylstyrene), poly(ethylene terephthalate), polyamides (nylons), and polycarbonates.

Specific examples of suitable nucleating agents are sodium benzoate and sodium naphthenoate, sodium 2,2'-methylenebis(4,6-di-tert-butylphenyl) phosphate, aluminum 2,2'-methylenebis(4,6-di-tert-butylphenyl) phosphate, di(p-tolylidene) sorbitol, dibenzylidene sorbitol, di(p-methylbenzylidene) sorbitol, di(p-ethylbenzylidene) sorbitol, bis(3,4-dimethylbenzylidene) sorbitol, and N',N'-dicyclohexyl-2,6-naphthalenedicarboxamide. Other suitable nucleating agents are disclosed in U.S. Pat. Nos. 4,016,118; 4,371,645; 5,049,605; 6,235,823; US 2004/0132884; WO 02/046300; WO 03/102069; EP 776933.

Additional specific examples of suitable nucleating agents include: those available from Milliken Chemical under the "Millad" and "Hyperform" tradenames, including
- Millad 3905 [DBS, or 1,3:2,4-dibenzylidenesorbitol],
- Millad 3940 [MDBS, or 1,3:2,4-bis-(p-methylbenzylidene)sorbitol],
- Millad 3988 [DMDBS, or 1,3:2,4-bis(3,4-dimethylbenzylidene)sorbitol], and
- HPN-68 [2.2.1-heptane-bicyclodicarboxylic acid];

those available from Ciba Specialty Chemicals under the "Irgaclear" and "Irgastab" tradenames, including
- Irgaclear D [DBS, or 1,3:2,4-dibenzylidenesorbitol] and
- Irgaclear DM [MDBS, or 1,3:2,4-bis-(p-methylbenzylidene)sorbitol];

those available from Asahi Denka Kogyo and Amfine under the "ADKstab" and "NA" tradenames, including:
- NA-11 [2,2'-methylenebis(4,6-di-tertbutylphenol) phosphate salt] and
- NA-21 [2,2'-methylenebis(4,6-di-tertbutylphenol) phosphate aluminum complex];

those available from Mitsui Chemicals under the "NC" tradename, including
- NC-4 [EDBS, or 1,3:2,4-bis-(p-ethylbenzylidene)sorbitol];

those available from New Japan Chemical under the "NJSTAR", "NU", "Gel All", and "Geniset" tradenames, including
- NU 100 [N,N'-dicyclohexyl-2,6-naphathalene dicarboxamide],
- NJSTAR [N,N'-dicyclohexyl-2,6-naphathalene diczroxamide],
- Gel All D [DBS, or 1,3:2,4-dibenzylidenesorbitol], and
- Gel All MD [MDBS, or 1,3:2,4-bis-(p-methylbenzylidene) sorbitol];

those available from EC Chemical (Japan) under the "EC" tradename, including
- EC-1 [(1,3:2,4) dimethyldibenylidene sorbitol] and
- EC-4 [a sorbitol].

Particularly preferred nucleating agents include dibenzylidene sorbitol derivatives, phosphate ester derivatives, and benzenetrisamide derivatives. Particularly preferred nucleating agents include 1,3:2,4-bis(3,4-dimethylbenzylidene)sorbitol (available as Millad 3988 from Milliken Chemical; Spartanburg, S.C.), 2.2.1-heptane-bicyclodicarboxylic acid (available as HPN-68 from Milliken Chemical; Spartanburg, S.C.), 1,3:2,4-bis-(p-methylbenzylidene)sorbitol (available as Irgaclear DM from Ciba Specialty Chemicals; Basel, Switzerland), 2,2'-methylenebis(4,6-di-tertbutylphenol) phosphate salt (available as NA-11 from Amfine Chemical; Upper Saddle River, N.J.), and sodium benzoate (available from Ciba Specialty Chemicals; Basel, Switzerland).

The appearance and mechanical properties of the compositions of the present invention can be controlled to some extent by the type of nucleating agent used. The nucleating agent(s) are typically present in the composition of this invention at 0.01 to 1 wt % (100 to 10,000 ppm), preferably 0.02 to 0.5 wt % (200 to 5,000 ppm), preferably 0.03 to 0.3 wt % (300 to 3,000 ppm), preferably 0.05 to 0.25 wt % (500 to 2,500 ppm), based upon the weight of the composition (where ppm is parts-per-million by weight).

Crosslinking Agents

In another embodiment, the polyolefin composition may further comprise a crosslinking agent. Preferred crosslinking agents include those having functional groups that can react with functional groups present on the polyolefin, including alcohols, multiols, amines, diamines and/or triamines. Particular examples of crosslinking agents useful in this invention include polyamines such as ethylene-diamine, diethylene-triamine, hexamethylene-diamine, diethylaniinopropyl-amine, and menthane-diamine.

Oils

In some embodiments, conventional mineral oils may be present in the composition of this invention, such as paraffinic or naphthenic mineral oils, white oils, technical white oils, bright stocks, Group I or Group II basestocks, vegetable oils, or the like. In other embodiments, functionalized oils other than amide slip agents are substantially absent from the polyolefin composition.

In preferred embodiments, naphthenic and aromatic mineral oils are substantially absent from the compositions of the present invention, preferably present at 0 wt %. In another embodiment, aromatic moieties and carbon-carbon unsaturation are substantially absent from the non-functionalized plasticizers used in the present invention. Aromatic moieties include a compound whose molecules have the ring structure characteristic of benzene, naphthalene, phenanthrene, anthracene, etc.

Tackifiers

In another embodiment, tackifiers may be blended with the polyolefin composition of this invention. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the polar groups are substantially absent from the tackifier, or preferably polar groups are not present.) In some embodiments the tackifier has a softening point (Ring and Ball, ASTM E 28) of 80 to 140° C., preferably 100 to 130° C.

Tackifiers, if present, are typically present at about 1 to about 50 wt % (preferably 2 to 40 wt %, preferably 5 to 20 wt %), based upon the weight of the composition. Preferably however, tackifier is not present, or is present at less than 10 wt % (preferably less than 5 wt %, preferably at less than 1 wt %).

Conventional Plasticizers

In one embodiment of compositions of the present invention, conventional plasticizers such as are commonly used for poly(vinyl chloride) are substantially absent, preferably present at 0 wt %. In particular, plasticizers such as phthalates, adipates, trimellitate esters, polyesters, and other functionalized plasticizers as disclosed in, for example, U.S. Pat. Nos. 3,318,835; 4,409,345; WO 02/31044 A1; and PLASTICS ADDITIVES 499-504 (Geoffrey Pritchard, ed., Chapman & Hall 1998) are substantially absent.

Waxes

Preferred waxes suitable for use in the compositions of this invention include: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ear wax, ceresin wax, petroleum wax, paraffin wax, polyethylene wax, chemically modified hydrocarbon wax, substituted amide wax, and combinations and derivatives thereof. In some embodiments, the polar and non-polar waxes may be used together in the same composition. In a preferred embodiment, compositions of this invention comprise no waxes.

Polymers

In some embodiments the polyolefin composition of this invention may be blended with up to 25 wt % (preferably up to 20 wt %, preferably up to 15 wt %, preferably up to 10 wt %, preferably up to 5 wt %), based upon the weight of the composition, of one or more additional polymeric additives. Suitable polymers include:

PM1) Polyethylenes, including (but not limited to):
Copolymers of ethylene and one or more polar monomers, preferably selected from vinyl acetate, methyl acrylate, n-butyl acrylate, acrylic acid, and vinyl alcohol (i.e., EVA, EMA, EnBA, EAA, and EVOH); ethylene homopolymers and copolymers synthesized using a high-pressure free radical process, including LDPE; copolymers of ethylene and $C_3$ to $C_{40}$ olefins (preferably propylene and/or butene) with a density of greater than 0.91 g/cm$^3$ to less than 0.94 g/cm$^3$), including LLDPE; and high density PE (0.94 to 0.98 g/cm$^3$).

PM2) Polybutene-1 and copolymers of polybutene-1 with ethylene and/or propylene.

PM3) Non-EP Rubber Elastomers, including (but not limited to):
Polyisobutylene, butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (both cis and trans).

PM4) Low-crystallinity propylene/olefin copolymers, preferably random copolymers, comprising
i) at least 70 wt % propylene, and
ii) 5 to 30 wt % (preferably 5 to 20 wt %) of comonomer selected from ethylene and $C_4$ to $C_{12}$ olefins (preferably selected from ethylene, butene, and hexene; preferably ethylene);
preferably made using a metallocene-type catalyst; and having one or more of the following properties:
a) $M_w$ of 20 to 5,000 kg/mol (preferably 30 to 2,000 kg/mol, preferably 40 to 1,000 kg/mol, preferably 50 to 500 kg/mol, preferably 60 to 400 kg/mol); and/or
b) molecular weight distribution index ($M_w/M_n$) of 1.5 to 10 (preferably 1.7 to 5, preferably 1.8 to 3); and/or
c) branching index (g') of 0.9 or greater (preferably 0.95 or greater, preferably 0.99 or greater); and/or
d) density of 0.85 to about 0.90 g/cm$^3$ (preferably 0.855 to 0.89 g/cm$^3$, preferably 0.86 to about 0.88 g/cm$^3$); and/or
e) melt flow rate (MFR) of at least 0.2 dg/min (preferably 1-500 dg/min, preferably 2-300 dg/min); and/or
f) heat of fusion ($H_f$) of 0.5 J/g or more (preferably 1 J/g or more, preferably 2.5 J/g or more, preferably 5 J/g or more) but less than or equal to 75 J/g (preferably less than or equal to 50 J/g, preferably less than or equal to 35 J/g, preferably less than or equal to 25 J/g); and/or
g) DSC-determined crystallinity of from 1 to 30 wt % (preferably 2 to 25 wt %, preferably 2 to 20 wt %, preferably 3 to 15 wt %); and/or
h) a single broad melting transition with a peak melting point of 25 to about 105° C. (preferably 25 to 85° C., preferably 30 to 70° C., preferably 30 to 60° C.), where the highest peak considered the melting point; and i) crystallization temperature ($T_c$) of 90° C. or less (preferably 60° C. or less); and/or j) greater than 80% of the propylene residues (exclusive of any other monomer such as ethylene) arranged as 1,2 insertions with the same stereochemical orientation of the pendant methyl groups, either meso or racemic, as determined by $^{13}$C-NMR; and/or k) $^{13}$C-NMR-determined propylene tacticity index of more than 1; and/or l) $^{13}$C-NMR-determined mm triad tacticity index of 75% or greater (preferably 80% or greater, preferably 82% or greater, preferably 85% or greater, preferably 90% or greater).

Useful low-crystallinity propylene/olefin copolymers are available from ExxonMobil Chemical; suitable examples include Vistamaxx™ 6100, Vistamaxx™ 6200 and Vistamaxx™ 3000. Other useful low-crystallinity propylene/olefin copolymers are described in WO 03/040095, WO 03/040201, WO 03/040233, and WO 03/040442, all to Dow Chemical, which disclose propylene-ethylene copolymers made with non-metallocene catalyst compounds. Still other useful low-crystallinity propylene/olefin copolymers are described in U.S. Pat. No. 5,504,172 to Mitsui Petrochemical. Preferred low-crystallinity propylene/olefin copolymers are described in US 2002/0004575 to ExxonMobil Chemical.

PM5) Propylene oligomers suitable for adhesive applications, such as those described in WO 2004/046214, particular those at pages 8 to 23.

PM5) Olefin block copolymers, including those described in WO 2005/090425, WO 2005/090426, and WO 2005/090427.

PM6) Polyolefins that have been post-reactor functionalized with maleic anhydride (so-called maleated polyolefins), including maleated ethylene polymers, maleated EP Rubbers, and maleated propylene polymers. Preferably, the amount of free acid groups present in the maleated polyolefin is less than about 1000 ppm (preferably less than about 500 ppm, preferably less than about 100 ppm), and the amount of phosphite present in the maleated polyolefin is less than 100 ppm.

PM6) Styrenic Block Copolymers (SBCs), including (but not limited to): Unhydrogenated SBCs such as SI, SIS, SB, SBS, SIBS and the like, where S=styrene, I=isobutylene, and B=butadiene; and hydrogenated SBCs, such as SEBS, where EB=ethylene/butene.

PM7) Engineering Thermoplastics, including (but are not limited to):
Polycarbonates, such as poly(bisphenol-a carbonate); polyamide resins, such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon Jun. 66, 19610 (N6/66/610), nylon MXD6 (MXD6), nylon 6T (N6T), nylon 6/6T copolymer, nylon 66/PP copolymer, and nylon 66/PPS copolymer; polyester resins, such as polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer, and other aromatic polyesters; nitrile resins, such as polyacrylonitrile (PAN), polymethacrylonitrile, styrene-acrylonitrile copolymers (SAN), methacrylonitrile-styrene copolymers, and methacrylonitrile-styrene-butadiene copolymers; acrylate resins, such as polymethyl methacrylate and polyethylacrylate; polyvinyl acetate (PVAc); polyvinyl alcohol (PVA); chloride resins, such as polyvinylidene chloride (PVDC), and polyvinyl chloride (PVC); fluoride resins, such as polyvinylidene fluoride (PVDF), polyvinyl fluoride (PVF), polychlorofluoroethylene (PCFE), and polytetrafluoroethylene (PTFE); cellulose resins, such as cellulose acetate and cellulose acetate butyrate; polyimide resins, including aromatic polyimides; polysulfones; polyacetals; polylactones; polyketones, including aromatic polyketones; polyphenylene oxide; polyphenylene sulfide; styrene resins, including polystyrene, styrene-maleic anhydride copolymers, and acrylonitrile-butadiene-styrene resin.

In a preferred embodiment, compositions of this invention comprise no added polymeric additives, or if they are present the polymeric additives are present at 0.5 wt % or less.

In a particularly preferred embodiment, compositions of this invention comprise less than 10 wt % LLDPE having a density of 0.912 to 0.935 (preferably less than 5 wt %, preferably less than 1 wt %, preferably 0 wt %), based upon the weight of the composition.

Preparing the Polyolefin Composition

The polyolefin(s), NFP(s), filler(s), and optional additives components of the polyolefin composition of the present invention can be combined using any suitable means known in the polymer processing art. Those skilled in the art will be able to determine the appropriate procedure to balance the need for intimate mixing with the desire for process economy. For example, one or more polyolefin component can be in the form of pellets or reactor granules, which are combined with the NFP(s), filler(s), and optional additives by simple physical blending of constituent pellets and/or granules, since the forming of articles includes a (re)melting and mixing of the raw material(s). However, in some fabrication processes such as compression molding, little mixing of the raw material(s) occurs, and a pelletized melt blend would be preferred over simple physical blends of the constituent pellets and/or granules. In this case, the constituents are melt blended first, to provide a compounded product.

The polyolefin components may be in any physical form when blended with the NFP(s), filler(s), and optional additives. For example, they may be in the form of reactor granules (i.e., granules of polymer that are isolated from the polymerization reactor prior to any processing procedures), which typically have an average diameter of 50 μm to 5 mm, or in the form of pellets that are formed from melt extrusion of the reactor granules, which typically have an average diameter of from 1 to 10 mm.

The polyolefin(s), NFP(s), filler(s), and optional additives can be blended by any suitable means. For example, they may be blended in a tumbler, static mixer, batch mixer, extruder, or a combination thereof that is sufficient to achieve an adequate dispersion of the components. More particularly, the components may be blended by any suitable means to form the polyolefin composition of the present invention, which is then suitable for further processing into useful articles.

Preferably, the composition is prepared by combining the components in a melt-blending (compounding) step and subsequently pelletizing the blend, using either an underwater pelletizer or a strand-cut approach (i.e., a water batch and dry pelletizer); these pellets are then used in a process to fabricate articles. This approach may involve an on-line "finishing" extruder associated with a polymerization unit, or it may involve an off-line "compounding" extruder dedicated to melt blending. Alternatively, the composition may be prepared by combining the components during a process used to fabricate articles, without first making a pelletized version of the composition; here, NFP is added to other components in a production extruder, such as the extruder on an injection molding machine or on a continuous extrusion line, and thereafter directly processed into a film, sheet, fiber, profile, etc. In either case, production rates may be between 5 and 3000 kg/hr.

The blending may involve "dry blending" wherein the polyolefin(s) are combined with the NFP(s) without melting. For example, one method is to contact the components in a tumbler or bowl mixer, such as a high-speed Henschel mixer. The polyolefin(s) are preferably in the form of reactor granules (this works particularly well with ICPs and propylene polymers), but dry blending can also involve pellets. The dry blending step can then be followed, if desired, by melt blending in an extruder.

Another method of blending the components is to melt blend the polyolefin(s), either in pellet or granule form, with the NFP(s) and optionally with the filler(s) and/or additives in a batch mixer, such as a Banbury mixer.

Another method of blending the components is to melt blend the polyolefin(s), either in pellet or granule form, with the NFP(s) and optionally the filler(s) and/or additives in an extruder, such as a single-screw extruder or a twin-screw extruder. Extrusion technology for polyolefins and polyolefin blends is well known in the art, and is described in more detail in, for example, PLASTICS EXTRUSION TECHNOLOGY, F. Hensen, Ed. (Hanser, 1988), p. 26-37 and in POLYPROPYLENE HANDBOOK, E. P. Moore, Jr. Ed., (Hanser, 1996), p. 304-348. Extruder melt mixing is a preferred method of blending when a high NFP loading is desired, or when large quantities of the polyolefin composition are desired. Typical extruder characteristics associated with blending NFP into polyolefin(s) include: an operating temperature profile within the range of 120 to 280° C. (usually 160 to 240° C.); a melt temperature at least 10-50° C. above $T_m$ of the polyolefin having the highest $T_m$ (usually 140 to 220° C.); an operating speed of 50 to 1200 rpm; and a specific energy input of 0.01 to 100 kWh/kg. The extruder may be set up with or without screen pack(s) for filtration, and with or without a melt gear pump.

NFP may be directly injected into the polymer melt using a liquid injection device at some point along the barrel, as in the case of a twin-screw extruder, or through an opening in a hollow screw shaft, as in the case of a single-screw extruder. NFP is preferably added downstream from the polymer melt zone, but alternatively the NFP can be added at a point where the polymer(s) have not fully melted yet. For example, in a twin-screw extruder, NFP can be injected after the first barrel section (preferably after the first third of the barrel, more preferably in the last third of the barrel). Preferably, NFP is added downstream of filler addition. An NFP addition point may be on top of conveying elements of screw, or on top of liquid mixing elements of screw, or prior to kneading elements of screw, or prior to liquid mixing elements of the screw. The extruder may have more than one (preferably two or three) NFP addition points along the barrel or screw shaft. Optionally, the NFP can be added via the extruder fed throat.

Addition of NFP is preferably by controlled metering; e.g., using a loss-in-weight feeder or a calibrated flow-rate meter. Preferably NFP delivery is via a pump (such as a piston, gear, or diaphragm pump) capable of generating a delivery pressure of at least 5 bar (preferably at least 10 bar, preferably at least 20 bar, preferably at least 30 bar, preferably at least 40 bar). (1 bar=100 kPa).

Preferably, the extruder is a twin-screw extruder with a length to diameter ratio, L/D, of 20-80 (preferably 30-60, preferably 25-50, preferably 35-45) and/or a screw diameter of 20 to 200 mm. Preferably the screw design contains liquid mixing elements (gear-type elements) that create high surface renewal of the polymer, which promotes homogenization at high fluid concentrations. Such extruders are know in the art and are manufactured by Coperion Werner-Pfleiderer, Berstorff, Leistriz, and others.

The components may also be blended by a combination of methods, such as dry blending followed by melt blending in an extruder, or batch mixing of some components followed by melt blending with other components in an extruder. One or more components may also be blended using a double-cone blender, ribbon blender, or other suitable blender, or in a Farrel Continuous Mixer (FCM).

Blending may also involve a "masterbatch" approach, where the target NFP concentration is achieved by combining neat polyolefin(s) and optionally filler and/or additives with an appropriate amount of pre-blended masterbatch (i.e. a blend of polymer, NFP, and optionally filler and additives that has been previously prepared at a higher concentration of NFP than desired in the final blend). This is a common practice in polymer processing, typically used for addition of color, additives, and fillers to final compositions. Dispersion (or "letdown") of the masterbatch may take place as part of a processing step used to fabricate articles, such as in the extruder on an injection molding machine or on a continuous extrusion line, or during a separate compounding step.

The components may be blended in solution by any suitable means to form the polyolefin composition, by using one or more solvents that dissolve the polyolefin and NFP components to a significant extent. The blending may occur at any temperature or pressure where the NFP and the polyolefin remain in solution. Preferred conditions include blending at high temperatures, such as 20° C. or more above the melting point of the polymer. For example, iPP would typically be solution blended with the NFP at a temperature of 200° C. or more. Such solution blending would be particularly useful in processes where the polymer is made by a solution process and the NFP is added directly to the finishing train, rather than added to the dry polymer in another blending step altogether. It would also be particularly useful in processes where the polymer is made in a bulk or high pressure process where the polymer and the NFP were soluble in the monomer, where the NFP may be added directly to the finishing train. Similarly, a filler could be added to the finishing train.

Applications

The compositions of this invention may be used in any known application involving molding or extrusion, including consumer goods, industrial goods, construction materials, packaging materials, and automotive parts. Articles may be made or formed by any useful discrete molding or continuous extrusion means for forming and shaping polyolefins known in the art, including: compression molding, injection molding, co-injection molding, gas-assisted injection molding, blow molding, multi-layer blow molding, injection blow molding, stretch blow molding, extrusion blow molding, transfer molding; cast molding, rotational molding, foam molding, slush molding, transfer molding, wet lay-up or contact molding, cast molding, cold forming matched-die molding, thermoforming, vacuum forming, film blowing, film or sheet casting, sheet extrusion, profile extrusion or co-extrusion, fiber spinning, fiber spunbonding, fiber melt blowing, lamination, calendering, coating, pultrusion, protrusion, draw reduction, foaming, or other forms of processing such as described in, for example, PLASTICS PROCESSING (Radian Corporation, Noyes Data Corp. 1986), or combinations thereof. Use of certain processes, such as film casting and thermoforming, allows for the possibility of benefits from uniaxial or biaxial orientation of the inventive material.

Non-limiting examples of desirable articles of manufacture made from compositions of the invention include films, tapes, sheets, fibers, tubing, pipes, coatings, fabrics (woven and nonwoven), tarps, agricultural barriers, packaging (durable and disposable), household appliances (washing machines, refrigerators, blenders, air conditioners, etc.), furniture (indoor and outdoor, such as tables, chairs, benches, shelving, etc.), sporting equipment (skis, surfboards, skateboards, skates, boots, sleds, scooters, kayaks, paddles, etc.), solid wheels, stadium seating, amusement park rides, personal protective equipment (safety helmets, shin guards, etc.), emergency response equipment, cookware, utensils, trays, pallets, carts, tanks, tubs, pond liners, storage containers (crates, pails, jars, bottles, etc.), toys, child car seats and booster chairs, medical devices, sportswear, luggage, tool housings (for drills, saws, etc.), electronics housings (for televisions, computers, phones, hand-held devices, media players, stereos, radios, clocks, etc.), building construction materials (flooring, siding, roofing, counter tops, electrical housings and connectors, etc.), lighting, gardening equipment (handles on shovels, wheelbarrows, etc.), playground equipment, motor housings, pump housings, battery housings, instrument housings, switches, knobs, buttons, handles, pet supplies, laboratory supplies, personal hygiene devices (razors, brushes, hairdryers, etc.), cleaning supplies (brooms, dust pans, etc.), musical instrument cases, statues, trophies, artwork, costume jewelry, picture frames, eyeglass frames, plant pots, firearm components, and automotive components.

Further non-limiting examples of desirable articles of manufacture made from compositions of the invention useful in vehicles (such as cars, trucks, buses, boats, all terrain vehicles, personal water craft, golf carts, snowmobiles, motorcycles, mopeds, tractors, mowers, wagons, bicycles, airplanes, helicopters, trains, military machines, gondolas, and the like) include: bumpers and bumper fascias; exterior body panels, door panels, and grills; exterior trim, including body side moldings, side cladding and molding, end caps, hoods, deck lids, mirror housings, roof racks, wheel covers, wheel liners, wheel flares, fender liners, hub caps, running boards, step pads, sill plates, air dams, splash shields, mud guards, bed liners, and rocker panels; fuel tanks; interior trim, including steering column covers, consoles, door panels, pillars, supports, knobs, buttons, handles, and safety screens; instrument panels and dash boards; knee bolsters; passenger side airbag covers; headliners; glove boxes, trays, cup holders, compartments, and lids; seat components, including backs, supports, and safety belt securing devices; under-hood applications, including battery trays and fan shrouds; electrical housings; cable bearings; and structural components, including door carriers, truck bed separators, load floors, and trunk dividers.

Preferably, the article made from compositions of the invention has at least one overall dimension, such as length, greater than 30 cm (preferably greater than 60 cm, preferably greater than 90 cm, preferably greater than 120 cm). More preferably, said article is an automotive part. Most preferably, said article is fabricated by an injection molding process.

In alternate embodiments, this invention relates to:
1. A hetero-phase polyolefin composition comprising:
   a) 30 to 99.7 wt % of a polypropylene-based TPO comprising at least 50 wt % propylene and at least 10 wt % ethylene, and
   b) 0.1 to 20 wt % of one or more non-functionalized plasticizer(s), and
   c) 0.2 to 50 wt % of one or more filler(s);
   based upon the weight of the composition, and having:
   i) an MFR of 5 dg/min or more, and
   ii) a flexural modulus of 500 MPa or more, and
   iii) a notched Charpy impact strength at −30° C. of 1 kJ/m$^2$ or more or a notched Izod impact strength at −18° C. of 50 J/m or more.
2. The composition of paragraph 1 wherein the composition has an MFR of 10 dg/min or more.
3. The composition of paragraph 1 or 2 wherein the composition has an MFR of 15 to 400 dg/min.
4. The composition of any of paragraphs 1 to 3 wherein the composition has a flexural modulus of 800 MPa or more.
5. The composition of any of paragraphs 1 to 4 wherein the composition has a flexural modulus of 900 to 3500 MPa.
6. The composition of any of paragraphs 1 to 5 wherein the composition has a notched Charpy impact strength at −30° C. of 2 kJ/m$^2$ or more and a notched Izod impact strength at −18° C. of 50 J/m or more.
7. The composition of any of paragraphs 1 to 6 wherein the composition has a notched Charpy impact strength at −30° C. of 2.5 to 15 kJ/m$^2$ or more and a notched Izod impact strength at −18° C. of 50 J/m or more.
8. The composition of any of paragraphs 1 to 7 wherein the composition has a notched Charpy impact strength at −30° C. of 2 kJ/m$^2$ or more and a notched Izod impact strength at −18° C. of 60 J/m or more.
9. The composition of any of paragraphs 1 to 8 wherein the composition has a notched Charpy impact strength at −30° C. of 2 kJ/m$^2$ or more and a notched Izod impact strength at −18° C. of 70 to 500 J/m.
10. The composition of any of paragraphs 1 to 9 wherein the composition comprises 35 to 95 wt % of the polypropylene-based TPO.
11. The composition of any of paragraphs 1 to 10 wherein the composition comprises 40 to 90 wt % of the polypropylene-based TPO.
12. The composition of any of paragraphs 1 to 11 wherein the polypropylene-based TPO comprises at least 55 wt % propylene.
13. The composition of any of paragraphs 1 to 12 wherein the polypropylene-based TPO comprises at least 60 wt % propylene.
14. The composition of any of paragraphs 1 to 13 wherein the polypropylene-based TPO comprises at least 15 wt % ethylene.
15. The composition of any of paragraphs 1 to 14 wherein the polypropylene-based TPO comprises at least 20 wt % ethylene.
16. The composition of any of paragraphs 1 to 15 wherein the composition comprises 0.5 to 15 wt % of one or more non-functionalized plasticizer(s).
17. The composition of any of paragraphs 1 to 16 wherein the composition comprises 1 to 10 wt % of one or more non-functionalized plasticizer(s).
18. The composition of any of paragraphs 1 to 17 wherein the composition comprises 0.5 to 40 wt % of one or more filler(s).
19. The composition of any of paragraphs 1 to 18 wherein the composition comprises 1 to 30 wt % of one or more filler(s).
20. The composition of any of paragraphs 1 to 19 wherein the polypropylene-based TPO is a polypropylene impact copolymer.
21. The composition of any of paragraphs 1 to 20 wherein the polypropylene-based TPO comprises a homopolypropylene matrix.

22. The composition of any of paragraphs 1 to 21 wherein the polypropylene-based TPO comprises a propylene copolymer matrix.
23. The composition of any of paragraphs 1 to 22 wherein the polypropylene-based TPO comprises an isotactic polypropylene matrix.
24. The composition of any of paragraphs 1 to 23 wherein the polypropylene-based TPO comprises a matrix having a $T_m$ of 110° C. or more.
25. The composition of any of paragraphs 1 to 24 wherein the polypropylene-based TPO comprises a matrix having a $T_m$ of 120° C. or more.
26. The composition of any of paragraphs 1 to 25 wherein the polypropylene-based TPO comprises a matrix having a $T_m$ of 140° C. or more.
27. The composition of any of paragraphs 1 to 26 wherein the polypropylene-based TPO comprises a matrix having a $T_m$ of 160° C. or more.
28. The composition of any of paragraphs 1 to 27 wherein the polypropylene-based TPO comprises a dispersed phase having a $T_g$ of −20° C. or less.
29. The composition of any of paragraphs 1 to 28 wherein the polypropylene-based TPO comprises a dispersed phase having a $T_g$ of −30° C. or less.
30. The composition of any of paragraphs 1 to 29 wherein the polypropylene-based TPO comprises a dispersed phase having a $T_g$ of −40° C. or less.
31. The composition of any of paragraphs 1 to 30 wherein the polypropylene-based TPO comprises a dispersed phase having a $T_g$ of −50° C. or less.
32. The composition of any of paragraphs 1 to 31 wherein the polypropylene-based TPO is an impact copolymer having a $T_m$ of 120° C. or more and a $T_g$ of −30° C. or less.
33. The composition of any of paragraphs 1 to 32 wherein the polypropylene-based TPO is an impact copolymer having a matrix phase comprising polypropylene having a $T_m$ of 120° C. or more and a dispersed phase comprising propylene copolymer having a $T_g$ of −30° C. or less.
34. The composition of any of paragraphs 1 to 33 wherein the polypropylene-based TPO is an impact copolymer having a rubber content of 5 to 40 wt %, a melt flow rate of 5 to 150 dg/min, and a flexural modulus of 300 to 3000 MPa.
35. The composition of any of paragraphs 1 to 34 wherein the polypropylene-based TPO is an in-situ impact copolymer.
36. The composition of any of paragraphs 1 to 35 wherein the polypropylene-based TPO comprises two or more in-situ impact copolymers.
37. The composition of any of paragraphs 1 to 36 wherein the polypropylene-based TPO comprises two or more in-situ impact copolymers, where the combination of the impact copolymers comprises at least 50 wt % propylene and at least 10 wt % ethylene, based upon the weight of the impact copolymers.
38. The composition of any of paragraphs 1 to 37 where the composition further comprises 1 to 40 wt % of an ethylene copolymer.
39. The composition of any of paragraphs 1 to 38 wherein the polypropylene-based TPO is an impact copolymer present at 20 to 98.7 wt % and the composition further comprises 1 to 40 wt % of one or more ethylene copolymer(s).
40. The composition of any of paragraphs 1 to 39 wherein the polypropylene-based TPO is an in-situ impact copolymer present at 20 to 98.7 wt % and the composition further comprises 1 to 40 wt % of one or more ethylene copolymer(s) having a density of 0.90 g/cm$^3$ or less.
41. The composition of any of paragraphs 1 to 40 where the composition further comprises 5 to 35 wt % of a copolymer of ethylene and one or more of propylene, butene, hexene, or octene, and the copolymer has a density of 0.85 to 0.90 g/cm$^3$ and a melt index of 0.1 to 100 dg/min.
42. The composition of any of paragraphs 1 to 41 where the composition further comprises 5 to 35 wt % of a copolymer of ethylene and one or more of propylene, butene, hexene or octene, and the copolymer has a density of 0.85 to 0.88 g/cm$^3$ and a melt index of 0.3 to 60 dg/min.
43. The composition of any of paragraphs 1 to 42 wherein the polypropylene-based TPO is an impact copolymer and the composition further comprises one or more EP Rubber(s).
44. The composition of any of paragraphs 1 to 43 wherein the polypropylene-based TPO is an impact copolymer present at 20 to 98.8 wt % and the composition further comprises 1 to 40 wt % of one or more EP Rubber(s).
45. The composition of any of paragraphs 1 to 44 wherein the polypropylene-based TPO is an in-situ impact copolymer present at 20 to 98.8 wt % and the composition further comprises 1 to 40 wt % of one or more EP Rubber(s) having an ethylene content of 25 to 80 wt % and a Mooney viscosity (ML 1+4, 125° C.) of 10 to 100.
46. The composition of any of paragraphs 1 to 45 wherein the polypropylene-based TPO comprises at least one propylene polymer having a melting point of 110° C. and at least one ethylene copolymer having a density of less than 0.90 g/cm$^3$.
47. The composition of any of paragraphs 1 to 46 wherein the polypropylene-based TPO comprises at least one propylene polymer having a melting point of 110° C. and at least one EP Rubber having a density of less than 0.87 g/cm$^3$.
48. The composition of any of paragraphs 1 to 47 wherein the polypropylene-based TPO comprises at least one propylene polymer and at least one ethylene copolymer having a density of less than 0.90 g/cm$^3$ and at least one EP Rubber having a density of less than 0.87 g/cm$^3$.
49. The composition of any of paragraphs 1 to 48 wherein the composition has:
   a) a melt flow rate (MFR) of 10 to 500 dg/min, and
   b) a flexural modulus of 900 to 3500 MPa;
and the composition has one or both of the following properties:
   c) a notched Charpy impact strength at −30° C. of 1.5 to 15 kJ/m$^2$, and/or
   d) a notched Izod impact strength at −18° C. of 60 to 500 J/m.
50. The composition of any of paragraphs 1 to 49 wherein the composition has:
   a) a melt flow rate (MFR) of 10 to 500 dg/min, and
   b) a flexural modulus of 900 to 3500 MPa;
and the composition has one or both of the following properties:
   c) a notched Charpy impact strength at −30° C. of 1.5 to 15 kJ/m$^2$, and/or
   d) a notched Izod impact strength at −18° C. of 60 to 500 J/m;
and the composition has one or more of the following properties:
   e) a notched Charpy impact strength at 23° C. of 20 kJ/m$^2$ or more, and/or
   f) a notched Izod impact strength at 23° C. of 100 J/m or more, and/or
   g) a ductile failure in a multi-axial impact strength test at 23° C., and/or
   h) a heat distortion temperature (HDT) of 60° C. or more, and/or
   i) a tensile strength of 10 MPa or more, and/or
   j) shrinkage upon injection molding of 0.1 to 5%, and/or
   k) a fogging number of 70 or more.

51. The composition of any of paragraphs 1 to 49 wherein the composition has:
   a) a melt flow rate (MFR) of 10 to 500 dg/min, and
   b) a flexural modulus of 900 to 3500 MPa, and
   c) a notched Charpy impact strength at −30° C. of 1.5 to 15 kJ/m², and
   d) a notched Izod impact strength at −18° C. of 60 to 500 J/m, and
   e) a notched Charpy impact strength at 23° C. of 20 kJ/m² or more.
52. The composition of any of paragraphs 1 to 49 wherein the composition has:
   a) a melt flow rate (MFR) of 10 to 500 dg/min, and
   b) a flexural modulus of 900 to 3500 MPa, and
   c) a notched Charpy impact strength at −30° C. of 1.5 to 15 kJ/m², and
   d) a notched Izod impact strength at −18° C. of 60 to 500 J/m, and
   e) a notched Izod impact strength at 23° C. of 100 J/m or more.
53. The composition of any of paragraphs 1 to 49 wherein the composition has:
   a) a melt flow rate (MFR) of 10 to 500 dg/min, and
   b) a flexural modulus of 900 to 3500 MPa, and
   c) a notched Charpy impact strength at −30° C. of 1.5 to 15 kJ/m², and
   d) a notched Izod impact strength at −18° C. of 60 to 500 J/m, and
   e) a ductile failure in a multi-axial impact strength test at 23° C.
54. The composition of any of paragraphs 1 to 49 wherein the composition has:
   a) a melt flow rate (MFR) of 10 to 500 dg/min, and
   b) a flexural modulus of 900 to 3500 MPa, and
   c) a notched Charpy impact strength at −30° C. of 1.5 to 15 kJ/m², and
   d) a notched Izod impact strength at −18° C. of 60 to 500 J/m, and
   e) a heat distortion temperature (HDT) of 60° C. or more.
55. The composition of any of paragraphs 1 to 49 wherein the composition has:
   a) a melt flow rate (MFR) of 10 to 500 dg/min, and
   b) a flexural modulus of 900 to 3500 MPa, and
   c) a notched Charpy impact strength at −30° C. of 1.5 to 15 kJ/m², and
   d) a notched Izod impact strength at −18° C. of 60 to 500 J/m, and
   e) a tensile strength of 10 MPa or more.
56. The composition of any of paragraphs 1 to 49 wherein the composition has:
   a) a melt flow rate (MFR) of 10 to 500 dg/min, and
   b) a flexural modulus of 900 to 3500 MPa, and
   c) a notched Charpy impact strength at −30° C. of 1.5 to 15 kJ/m², and
   d) a notched Izod impact strength at −18° C. of 60 to 500 J/m, and
   e) shrinkage upon injection molding of 0.1 to 5%.
57. The composition of any of paragraphs 1 to 49 wherein the composition has:
   a) a melt flow rate (MFR) of 10 to 500 dg/min, and
   b) a flexural modulus of 900 to 3500 MPa, and
   c) a notched Charpy impact strength at −30° C. of 1.5 to 15 kJ/m², and
   d) a notched Izod impact strength at −18° C. of 60 to 500 J/m, and
   e) a fogging number of 70 or more.
58. The composition of any of paragraphs 1 to 57 wherein the glass transition temperature ($T_g$) of at least one polymer component in the composition is depressed by at least 2° C. for every 1 wt % of NFP present in the composition, while the peak melting temperature of the highest melting component remains within 5° C. of its value for the same composition absent the NFP.
59. The composition of any of paragraphs 1 to 58 wherein the melt flow rate (MFR) of the composition increases by at least 2% for every 1 wt % of NFP present in the composition as compared to the same composition absent the NFP.
60. The composition of any of paragraphs 1 to 59 wherein the NFP has a kinematic viscosity at 100° C. of 4 cSt or more.
61. The composition of any of paragraphs 1 to 60 wherein the NFP has a kinematic viscosity at 100° C. of 6 cSt or more.
62. The composition of any of paragraphs 1 to 61 wherein the NFP has a kinematic viscosity at 100° C. of 8 cSt or more.
63. The composition of any of paragraphs 1 to 62 wherein the NFP has a kinematic viscosity at 100° C. of 10 cSt or more.
64. The composition of any of paragraphs 1 to 63 wherein the NFP has a kinematic viscosity at 100° C. of 6 to 5000 cSt.
65. The composition of any of paragraphs 1 to 64 wherein the NFP has a kinematic viscosity at 100° C. of 8 to 3000 cSt.
66. The composition of any of paragraphs 1 to 65 wherein the NFP has a kinematic viscosity at 100° C. of 10 to 1000 cSt.
67. The composition of any of paragraphs 1 to 66 wherein the NFP has a pour point of −20° C. or less.
68. The composition of any of paragraphs 1 to 67 wherein the NFP has a pour point of −30° C. or less.
69. The composition of any of paragraphs 1 to 68 wherein the NFP has a pour point of −40° C. or less.
70. The composition of any of paragraphs 1 to 69 wherein the NFP has a pour point of −30° C. or less and a kinematic viscosity at 40° C. of 20 to 600 cSt.
71. The composition of any of paragraphs 1 to 70 wherein the NFP has a $T_g$ of −40° C. or less.
72. The composition of any of paragraphs 1 to 71 wherein the NFP has a viscosity index of 100 or more.
73. The composition of any of paragraphs 1 to 72 wherein the NFP has a viscosity index of 110 or more.
74. The composition of any of paragraphs 1 to 73 wherein the NFP has a viscosity index of 120 or more.
75. The composition of any of paragraphs 1 to 74 wherein the NFP has a viscosity index of 130 or more.
76. The composition of any of paragraphs 1 to 75 wherein the NFP has a viscosity index of 135 to 300.
77. The composition of any of paragraphs 1 to 76 wherein the NFP has a flash point of 200° C. or more.
78. The composition of any of paragraphs 1 to 77 wherein the NFP has a flash point of 210° C. or more.
79. The composition of any of paragraphs 1 to 78 wherein the NFP has a flash point of 230° C. or more.
80. The composition of any of paragraphs 1 to 79 wherein the NFP has a specific gravity of 0.86 or less.
81. The composition of any of paragraphs 1 to 80 wherein the NFP has a specific gravity of 0.855 or less.
82. The composition of any of paragraphs 1 to 81 wherein the NFP has a viscosity index of 120 or more, a flash point of 200° C. or more, and a pour point of −10° C. or less.
83. The composition of any of paragraphs 1 to 82 wherein the NFP has a kinematic viscosity at 100° C. of 35 cSt or more, a specific gravity of 0.87 or less, and a flash point of 200° C. or more.
84. The composition of any of paragraphs 1 to 83 wherein the NFP has a) a flash point of 200° C. or more; b) a specific gravity of 0.86 or less; and c1) a pour point of −10° C. or less and a viscosity index of 120 or more, or c2) a pour point of −20° C. or less, or c3) a kinematic viscosity at 100° C. of 35 cSt or more.

85. The composition of any of paragraphs 1 to 84 wherein the NFP has a) a specific gravity of 0.85 or less; and b1) a kinematic viscosity at 100° C. of 3 cSt or more, and/or b2) a number-average molecular weight ($M_n$) of at least 280 g/mol.

86. The composition of any of paragraphs 1 to 85 wherein the NFP has a) a specific gravity of 0.86 or less; and b1) a kinematic viscosity at 100° C. of 5 cSt or more, and/or b2) a number-average molecular weight ($M_n$) of at least 420 g/mol.

87. The composition of any of paragraphs 1 to 86 wherein the NFP has a) a specific gravity of 0.87 or less; and b1) a kinematic viscosity at 100° C. of 10 cSt or more, and/or b2) a number-average molecular weight ($M_n$) of at least 700 g/mol.

88. The composition of any of paragraphs 1 to 87 wherein the NFP has a kinematic viscosity at 100° C. of 3 to 100 cSt, and a number average molecular weight ($M_n$) of 300 to 3,000 g/mol.

89. The composition of any of paragraphs 1 to 88 wherein the non-functionalized plasticizer has a kinematic viscosity at 100° C. of 5 cSt or more, a viscosity index of 100 or more, a pour point of −20° C. or less, a specific gravity less than 0.86, and a flash point greater than 200° C.

90. The composition of any of paragraphs 1 to 89 wherein the non-functionalized plasticizer comprises at least 50 weight % of $C_6$ to $C_{150}$ isoparaffins.

91. The composition of any of paragraphs 1 to 90 wherein the non-functionalized plasticizer has a pour point of −40° C. or less and a specific gravity of less than 0.85.

92. The composition of any of paragraphs 1 to 91 wherein the non-functionalized plasticizer comprises oligomers of $C_5$ to $C_{18}$ alpha-olefins.

93. The composition of any of paragraphs 1 to 92 wherein the non-functionalized plasticizer comprises oligomers of $C_6$ to $C_{14}$ alpha-olefins.

94. The composition of any of paragraphs 1 to 93 wherein the non-functionalized plasticizer comprises oligomers of $C_8$ to $C_{12}$ alpha-olefins.

95. The composition of any of paragraphs 1 to 94 wherein the non-functionalized plasticizer comprises oligomers of decene.

96. The composition of any of paragraphs 1 to 95 wherein the non-functionalized plasticizer comprises oligomers of $C_3$ to $C_{24}$ linear alpha-olefins wherein $C_3$ and $C_4$ linear alpha-olefins are present at 10 wt % or less.

97. The composition of any of paragraphs 1 to 96 wherein the non-functionalized plasticizer comprises oligomers of two or more $C_3$ to $C_{18}$ linear alpha-olefins wherein $C_3$ and $C_4$ linear alpha-olefins are present at 10 wt % or less.

98. The composition of any of paragraphs 1 to 97 wherein the non-functionalized plasticizer comprises oligomers of $C_5$ to $C_{18}$ linear alpha-olefins and has a branching ratio of 0.20 or less.

99. The composition of any of paragraphs 1 to 95 wherein the non-functionalized plasticizer comprises $C_{15}$ to $C_{1500}$ oligomers of alpha-olefins and has a kinematic viscosity at 100° C. of 3 cSt or more.

100. The composition of any of paragraphs 1 to 95 wherein the non-functionalized plasticizer comprises $C_{20}$ to $C_{1000}$ oligomers of alpha-olefins and has a kinematic viscosity at 100° C. of 5 cSt or more.

101. The composition of any of paragraphs 1 to 95 wherein the non-functionalized plasticizer comprises $C_{15}$ to $C_{1500}$ oligomers of alpha-olefins and has a kinematic viscosity at 100° C. of 8 cSt or more, a viscosity index of 120 or more, and a specific gravity of 0.86 or less.

102. The composition of any of paragraphs 1 to 95 wherein the non-functionalized plasticizer comprises $C_{15}$ to $C_{1500}$ oligomers of alpha-olefins and has a kinematic viscosity of 10 cSt or more at 100° C. and a viscosity index of 120 or more, and a specific gravity of 0.86 or less.

103. The composition of any of paragraphs 1 to 95 wherein the non-functionalized plasticizer comprises oligomers of $C_5$ to $C_{18}$ linear alpha-olefins and has a kinematic viscosity of 8 cSt or more at 100° C., a viscosity index of 120 or more, and a pour point of −25° C. or less.

104. The composition of any of paragraphs 1 to 89 wherein the non-functionalized plasticizer comprises: 1) a copolymer of a $C_4$ olefins derived from a $C_4$ raffinate stream or 2) a poly(n-butene) or 3) a copolymer of at least isobutylene derived units, 1-butene derived units, and 2-butene derived units; and has a pour point of −20° C. or less and a kinematic viscosity at 100° C. of 6 to 150 cSt.

105. The composition of any of paragraphs 1 to 89 wherein the non-functionalized plasticizer comprises a mineral oil having a saturates levels of 90% or more, a sulfur content of less than 0.03%, and a VI of 120 or more.

106. The composition of any of paragraphs 1 to 89 wherein the non-functionalized plasticizer comprises a paraffinic process oil with
   A) a viscosity index of 90 to 119, and
   B) a $C_P$ of 65% or more, and
   C) a $C_A$ of 1% or less, and
   D) a kinematic viscosity at 40° C. of 80 cSt or more, and
   E) a pour point of −15° C. or less.

107. The composition of any of paragraphs 1 to 89 wherein the non-functionalized plasticizer is a hydrocarbon fluid derived from a Gas-To-Liquids process comprising hydroisomerized Fischer-Tropsch waxes and having a pour point of about −20 to −60° C. and a kinematic viscosity of about 6 to 20 cSt.

108. The composition of any of paragraphs 1 to 89 wherein the non-functionalized plasticizer comprises a mixture of paraffins has two or more of the following properties:
   1) a naphthenic content of less than 40 wt %, based on the total weight of the paraffin mixture; and/or
   2) a normal paraffins content of less than 5 wt %, based on the total weight of the paraffin mixture; and/or
   3) an aromatic content of 1 wt % or less, based on the total weight of the paraffin mixture; and/or
   4) a saturates level of 90 wt % or higher; and/or
   5) a percentage of carbons in chain-type paraffinic structures ($C_P$) of 80% or more; and/or
   6) a branched paraffin:normal paraffin ratio greater than about 10:1; and/or
   7) sidechains with 4 or more carbons making up less than 10% of all sidechains; and/or
   8) sidechains with 1 or 2 carbons making up at least 50% of all sidechains; and/or
   9) a sulfur content of 300 ppm or less (weight basis); and/or
   10) a nitrogen content of 300 ppm or less (weight basis); and/or
   11) a number-average molecular weight of 300 to 1800 g/mol; and/or
   12) a kinematic viscosity at 40° C. of 10 cSt or more; and/or
   13) a kinematic viscosity at 100° C. ranging from 2 to 50 cSt; and/or
   14) a viscosity index (VI) of 80 or greater; and/or
   15) a pour point of −5° C. or lower; and/or
   16) a flash point of 200° C. or more; and/or 17) a specific gravity of 0.86 or less; and/or
18) an aniline point of 120° C. or more; and/or
19) a bromine number of 1 or less.
109. The composition of any of paragraphs 1 to 108 wherein the filler is selected from the group consisting of mineral aggregates (natural or synthetic), fibers, carbon black, graphite, wollastonite, natural and synthetic clays including nanoclays and organoclays, sand, and glass beads.
110. The composition of any of paragraphs 1 to 109 wherein the filler has a median particle diameter of 0.1-100 microns.
111. The composition of any of paragraphs 1 to 110 wherein the filler has an aspect ratio greater than 1.2.
112. The composition of any of paragraphs 1 to 111 wherein the filler has a specific surface area of 10 to 300 m$^2$/cm$^3$.
113. The composition of any of paragraphs 1 to 112 wherein the filler is selected from the group consisting of talc, mica, wollastonite, titanium dioxide, silicon carbide, silica, silicon dioxide and other oxides of silica (precipitated or not), calcium silicate, calcium and barium sulfates, calcium carbonate (calcite), lead carbonate, magnesium silicate, magnesium oxysulfates, antimony oxide, zinc white, lithopone, zircon, corundum, spinel, apatite, Barytes powder, magnesiter, dolomite, zinc borate, hydrotalcite compounds of the ions Mg, Ca, or Zn with Al, Cr or Fe and CO$_3$ and/or HPO$_4$ (hydrated or not), quartz powder, hydrochloric magnesium carbonate, alumina, chrome, phosphorous and brominated flame retardants, antimony trioxide, silicone, and blends thereof.
114. The composition of any of paragraphs 1 to 112 wherein the filler is selected from the group consisting of glass fibers (long or short), carbon fibers, and natural and synthetic polymer fibers.
115. The composition of any of paragraphs 1 to 112 wherein the filler is selected from the group consisting of polyethylene terephthalate (PET) fibers and rayon fibers.
116. The composition of any of paragraphs 1 to 112 wherein the filler is selected from the group consisting of clays comprising one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.
117. The composition of any of paragraphs 1 to 112 wherein the filler is selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and florine mica.
118. The composition of any of paragraphs 1 to 112 wherein the filler is a nano-clay with mean particle diameter of less than 1 micron.
119. The composition of any of paragraphs 1 to 118 wherein the composition further comprises a slip agent, present at 0.001 to 0.5 wt % based upon the weight of the composition.
120. The composition of any of paragraphs 1 to 119 wherein the composition further comprises a slip agent selected from the group consisting of magnesium stearate, calcium stearate, sodium stearate, zinc stearate, calcium oleate, zinc oleate, magnesium oleate, castor oil, corn oil, cottonseed oil, olive oil, rapeseed oil, soybean oil, sunflower oil, glycerol monostearate, pentaerythritol monooleate, oleamide, erucamide, linoleamide, Carbowax, adipic acid, sebacic acid, carnauba wax, microcrystalline wax, polyolefin waxes, polytetrafluoroethylene, fluorine oils, fluorine waxes, silicone oils, polydimethylsiloxane, aminomodified polydimethylsiloxane, palmitamide, stearamide, arachidamide, behenamide, oleamide, erucamide, linoleamide, stearyl stearamide, palmityl palmitamide, stearyl arachidamide, stearamidoethylstearamide, stearamidoethylpalmitamide, palmitamido-ethylstearamide, ethylenebisstearamide, ethylenebisoleamide, stearylerucamide, erucamidoethylerucamide, oleamidoethyloleamide, erucamidoethyloleamide, oleamidoethylerucamide, stearamidoethylerucamide, erucamidoethylpalmitamide, palmitamidoethyloleamide, and N,N'-ethylenebisstearamide).
121. The composition of any of paragraphs 1 to 120 wherein the composition further comprises a tackifier, present at less than 10 wt % based upon the weight of the composition.
122. The composition of any of paragraphs 1 to 121 wherein the composition further comprises a nucleating agent, present at 0.01 to 1 wt % based upon the weight of the composition.
123. The composition of any of paragraphs 1 to 122 wherein the composition further comprises a nucleating agent selected from the group consisting of silica, kaolin, carbon black, and talc; sodium salts, lithium salts, potassium salts, phosphonic acid salts, carboxylate salts, and aromatic carboxylic-acid salts; sodium phosphates, phosphate esters, and phosphate ester salts, metal salts of suberic acid, metal salts of hexahydrophthalic acid; salts of disproportionated rosin esters; sorbitol, dibenzylidene sorbitol, sorbitol acetal, and sorbitol di-acetal; quinacridone dyes, naphthalene carboxamide; benzenetrisamide, 1,3,5-benzenetrisamide, trimesic acid, poly(3-methyl-1-butene), poly(dimethylstyrene), poly(ethylene terephthalate), polyamides (nylons), and polycarbonates.
124. The composition of any of paragraphs 1 to 122 wherein the composition further comprises a nucleating agent selected from the group consisting of sodium benzoate, sodium naphthenoate, sodium 2,2'-methylenebis(4,6-di-tert-butylphenyl) phosphate, aluminum 2,2'-methylenebis (4,6-di-tert-butylphenyl) phosphate, di(p-tolylidene) sorbitol, dibenzylidene sorbitol, di(p-methylbenzylidene) sorbitol, di(p-ethylbenzylidene) sorbitol, bis(3,4-dimethylbenzylidene) sorbitol, N',N'-dicyclohexyl-2,6-naphthalenedicarboxamide, 1,3:2,4-dibenzylidenesorbitol, 1,3:2,4-bis-(p-methylbenzylidene)sorbitol, 1,3:2,4-bis(3,4-dimethylbenzylidene)sorbitol, and 2.2.1-heptane-bicyclodicarboxylic acid, 2,2'-methylenebis(4,6-di-tertbutylphenol) phosphate salt, and 2,2'-methylenebis(4,6-di-tertbutylphenol) phosphate aluminum complex, 1,3:2,4-bis-(p-ethylbenzylidene)sorbitol; N,N'-dicyclohexyl-2,6-naphathalene dicarboxamide], N,N'-dicyclohexyl-2,6-naphathalene diczroxamide, 1,3:2,4-dibenzylidenesorbitol, 1,3:2,4-bis-(p-methylbenzylidene) sorbitol; (1,3:2,4) dimethyldibenylidene sorbitol, and sorbitol.
125. The composition of any of paragraphs 1 to 122 wherein the composition further comprises a nucleating agent selected from the group consisting of 1,3:2,4-bis(3,4-dimethylbenzylidene)sorbitol, 2.2.1-heptane-bicyclodicarboxylic acid, 1,3:2,4-bis-(p-methylbenzylidene)sorbitol, 2,2'-methylenebis(4,6-di-tertbutylphenol) phosphate salt, and sodium benzoate.

126. The composition of any of paragraphs 1 to 125 wherein naphthenic and aromatic mineral oils are substantially absent.
127. The composition of any of paragraphs 1 to 126 wherein paraffinic mineral oils with a kinematic viscosity at 40° C. of less than 80 cSt and a pour point of greater than −15° C. are substantially absent.
128. The composition of any of paragraphs 1 to 127 wherein the composition has a flow mark visibility rating of 3 or less and the distance from the gate to the first visible flow mark is 5 in or more
129. The composition of any of paragraphs 1 to 128 wherein the composition has a scratch resistance rating of 3 N or more.
130. The composition of any of paragraphs 1 to 128 wherein the non-functionalized plasticizer comprises a mixture of paraffins has two or more of the following properties:
  1) a naphthenic content of less than 40 wt %, based on the total weight of the paraffin mixture; and/or
  2) a normal paraffins content of less than 5 wt %, based on the total weight of the paraffin mixture; and/or
  3) an aromatic content of 1 wt % or less, based on the total weight of the paraffin mixture; and/or
  4) a saturates level of 90 wt % or higher; and/or
  5) a percentage of carbons in chain-type paraffinic structures ($C_P$) of 80% or more; and/or
  6) a branched paraffin:normal paraffin ratio greater than about 10:1; and/or
  7) sidechains with 4 or more carbons making up less than 10% of all sidechains; and/or
  8) sidechains with 1 or 2 carbons making up at least 50% of all sidechains; and/or
  9) a sulfur content of 300 ppm or less (weight basis); and/or
  10) a nitrogen content of 300 ppm or less (weight basis)
131. The composition of any of paragraphs 1 to 130 wherein the non-functionalized plasticizer comprises a mixture of paraffins has two or more of the following properties:
  1) a number-average molecular weight of 300 to 1800 g/mol; and/or
  2) a kinematic viscosity at 40° C. of 10 cSt or more; and/or
  3) a kinematic viscosity at 100° C. ranging from 2 to 50 cSt; and/or
  4) a viscosity index (VI) of 80 or greater; and/or
  5) a pour point of −5° C. or lower; and/or
  6) a flash point of 200° C. or more; and/or
  7) a specific gravity of 0.86 or less; and/or
  8) an aniline point of 120° C. or more; and/or
  9) a bromine number of 1 or less.
132. An article comprising the composition of any of paragraphs 1 to 131.
133. A molded automotive part comprising the composition of any of paragraphs 1 to 131.
134. The article of paragraph 132 where the article is selected from the group consisting of films, tapes, sheets, fibers, tubing, pipes, coatings, fabrics (woven and nonwoven), tarps, agricultural barriers, packaging (durable and disposable), household appliances, washing machines, refrigerators, blenders, air conditioners, furniture (indoor and outdoor), tables, chairs, benches, shelving, sporting equipment, skis, surfboards, skateboards, skates, boots, sleds, scooters, kayaks, paddles, solid wheels, stadium seating, amusement park rides, personal protective equipment, safety helmets, shin guards, emergency response equipment, cookware, utensils, trays, pallets, carts, tanks, tubs, pond liners, storage containers, crates, pails, jars, bottles, toys, child car seats and booster chairs, medical devices, sportswear, luggage, tool housings, electronics housings, building construction materials, flooring, siding, roofing, counter tops, electrical housings and connectors, lighting, gardening equipment, handles on shovels, handles on wheelbarrows, playground equipment, motor housings, pump housings, battery housings, instrument housings, switches, knobs, buttons, handles, pet supplies, laboratory supplies, personal hygiene devices, razors, brushes, hairdryers, cleaning supplies, brooms, dust pans, musical instrument cases, statues, trophies, artwork, costume jewelry, picture frames, eyeglass frames, plant pots, firearm components, and automotive components.
135. The article paragraph 132 where the article is selected from the group consisting of bumpers, bumper fascias; exterior body panels, door panels, grills, exterior trim, body side moldings, side cladding, side molding, end caps, hoods, deck lids, mirror housings, roof racks, wheel covers, wheel liners, wheel flares, fender liners, hub caps, running boards, step pads, sill plates, air dams, splash shields, mud guards, bed liners, and rocker panels; fuel tanks; interior trim, including steering column covers, consoles, door panels, pillars, supports, knobs, buttons, handles, safety screens, instrument panels, dash boards, knee bolsters; passenger side airbag covers, headliners, glove boxes, trays, cup holders, compartments, lids, seat components, backs, supports, safety belt securing devices, under-hood parts, battery trays, fan shrouds, electrical housings; cable bearings, structural components, door carriers, truck bed separators, load floors, and trunk dividers.
136. A vehicle comprising the composition of any of paragraphs 1 to 131 wherein the vehicle is selected from the group consisting of cars, trucks, buses, boats, all terrain vehicles, personal water craft, golf carts, snowmobiles, motorcycles, mopeds, tractors, mowers, wagons, bicycles, airplanes, helicopters, trains, military machines, and gondolas.
137. An article comprising the composition of any of paragraphs 1 to 131 wherein the article has at least one overall dimension greater than 30 cm.
138. An article comprising the composition of any of paragraphs 1 to 131 wherein the article has as a length greater than 30 cm.
139. An automotive part comprising the composition of any of paragraphs 1 to 131 wherein the article has as a length greater than 30 cm.
140. A process to prepare the composition of any of paragraphs 1 to 131 by combining the components in an extruder.
141. A process to prepare a molded part comprising heating the composition of any of paragraphs 1 to 131, then introducing the heated composition into a mold and thereafter cooling the composition and removing it from the mold.
142. A vehicle replacement part comprising the composition of any of paragraphs 1 to 131

Experimental Methods

Unless otherwise noted, physical and chemical properties described herein are measured using the following test methods:

Polyolefin Test Methods

| | |
|---|---|
| Melt Index (MI) | ASTM D 1238 (190° C./2.16 kg) |
| Melt Flow Rate (MFR) | ASTM D 1238 (230° C./2.16 kg) |
| Mooney Viscosity | ASTM D 1646 |
| Density | ASTM D 1505 |
| Glass Transition Temperature ($T_g$) | DMA (see below) |
| Melting Temperature ($T_m$) | DSC (see below) |

| | |
|---|---|
| Crystallization Temperature (T$_c$) | DSC (see below) |
| Heat of Fusion (H$_f$) | DSC (see below) |
| % Crystallinity | DSC (see below) |
| M$_n$, M$_w$, and M$_w$/M$_n$ | SEC (see below) |
| Branching Index (g') | SEC (see below) |
| Composition Distribution Breadth Index (CDBI) | See below |
| Intrinsic Viscosity | ASTM D 1601 (135° C. in decalin) |
| Injection Molding | ASTM D 4101 |
| Test Specimen Conditioning | ASTM D 618, Procedure A |
| Tensile Properties (e.g., Young's modulus, yield stress & strain, break stress & strain) | ASTM D 638 (Type I bar, 5 cm/min) |
| 1% Secant Flexural Modulus | ASTM D 790 (A, 1.3 mm/min) |
| Heat Deflection Temperature | ASTM D 648 (0.45 MPa) |
| Vicat Softening Temperature | ASTM D 1525 (200 g) |
| Gardner Impact Strength | ASTM D 5420 (GC) |
| Notched Izod Impact Strength | ASTM D 256 (Method A, or Method E if "reverse notch" noted) |
| Notched Charpy Impact Strength | ASTM D 6110 |
| Multi-Axial Impact Strength | ASTM D 3763 (15 MPH) |
| Shore (Durometer) Hardness | ASTM D 2240 (A or D, 15 sec delay) |
| Shrinkage upon injection molding | ISO 2577 |
| Flow Marks | See below |
| Scratch Resistance | See below |

Fluid Test Methods

| | |
|---|---|
| Kinematic Viscosity (KV) | ASTM D 445 |
| Viscosity Index (VI) | ASTM D 2270 |
| Pour Point | ASTM D 97 |
| Specific Gravity and Density | ASTM D 4052 (15.6/15.6° C.) |
| Flash Point | ASTM D 92 |
| M$_n$ | GC or GPC (see below) |
| Glass Transition Temperature (T$_g$) | ASTM D 1356 |
| Boiling/Distillation Range | ASTM D 1160 |
| Carbon Type Composition (C$_A$, C$_N$, and C$_P$) | ASTM D 2140 (see below) |
| Saturates Content | ASTM D 2007 |
| Sulfur Content | ASTM D 2622 |
| Nitrogen Content | ASTM D 4629 |
| Bromine Number | ASTM D 1159 (or ASTM D 2710 if so directed by ASTM D 1159) |
| Aniline Point | ASTM D 611 |
| Color | ASTM D 1209 (see below) |

Composition Test Methods

| | |
|---|---|
| Polypropylene tacticity | $^{13}$C-NMR (see below) |
| Olefin content in ethylene or propylene copolymers | $^{13}$C-NMR (see below) |
| Ethylene content of EP Rubbers | ASTM D 3900 |
| NFP content | See below |
| Permanence | See below |
| Filler content | ISO 3451-1 (A) |
| Hetero-phase morphology | Multiple domains by AFM and/or multiple T$_g$'s by DMA (see below) |

Dynamic Mechanical Analysis (DMA)

The glass transition temperature (T$_g$) is measured using dynamic mechanical analysis. This test provides information about the small-strain mechanical response of a sample as a function of temperature over a temperature range that includes the glass transition region and the visco-elastic region prior to melting. Specimens are tested using a commercially available DMA instrument (e.g., TA Instruments DMA 2980 or Rheometrics RSA) equipped with a dual cantilever test fixture. The specimen is cooled to −130° C. then heated to 60° C. at a heating rate of 2° C./min while subjecting to an oscillatory deformation at 0.1% strain and a frequency of 1 rad/sec. The output of these DMA experiments is the storage modulus (E') and loss modulus (E"). The storage modulus measures the elastic response or the ability of the material to store energy, and the loss modulus measures the viscous response or the ability of the material to dissipate energy. The ratio of E"/E', called Tan-delta, gives a measure of the damping ability of the material; peaks in Tan-delta are associated with relaxation modes for the material. T$_g$ is defined to be the peak temperature associated with the β-relaxation mode, which typically occurs in a temperature range of −80 to +20° C. for polyolefins. In a hetero-phase blend, separate α-relaxation modes for each blend component may cause more than one T$_g$ to be detected for the blend; assignment of the T$_g$ for each component are preferably based on the T$_g$ observed when the individual components are similarly analyzed by DMA (although slight temperature shifts are possible).

Differential Scanning Calorimetry (DSC)

Crystallization temperature (T$_c$) and melting temperature (or melting point, T$_m$) are measured using Differential Scanning Calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Melting data (first heat) is acquired by heating the sample to at least 30° C. above its melting temperature, typically 220° C. for polypropylene, at a heating rate of 10° C./min. The sample is held for at least 5 minutes at this temperature to destroy its thermal history. Crystallization data are acquired by cooling the sample from the melt to at least 50° C. below the crystallization temperature, typically −50° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified.

For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, H$_f$, upon melting or heat of crystallization, H$_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Size-Exclusion Chromatography (SEC)

Molecular weight (weight-average molecular weight, M$_w$, number-average molecular weight, M$_n$, and molecular weight distribution, M$_w$/M$_n$ or MWD) are determined using a commercial High Temperature Size Exclusion Chromatograph (e.g., from Waters Corporation or Polymer Laboratories)

equipped with three in-line detectors: a differential refractive index detector (DRI), a light scattering (LS) detector, and a viscometer.

The following approach is used for polyolefins. Details not described, including detector calibration, can be found in *Macromolecules* 34, 6812-6820 (2001).

Column set: 3 Polymer Laboratories PLgel 10 mm Mixed-B columns

Flow rate: 0.5 mL/min

Injection volume: 300 μL

Solvent: 1,2,4-trichlorobenzene (TCB), containing 6 g of butylated hydroxy toluene dissolved in 4 liters of Aldrich reagent grade TCB Temperature: 135° C.

The various transfer lines, columns, DRI detector and viscometer are contained in an oven maintained at 135° C. The TCB solvent is filtered through a 0.7 μm glass pre-filter and subsequently through a 0.1 μm Teflon filter, then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. Injection concentration range from 1.0 to 2.0 mg/mL, with lower concentrations being used for higher molecular weight samples. Prior to running a set of samples, the DRI detector and injector are purged, the flow rate increased to 0.5 ml/min, and the DRI allowed to stabilize for 8-9 hours; the LS laser is turned on 1 hr before running samples.

The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the same as described below for the light scattering (LS) analysis. Units on parameters throughout this description are such that concentration is expressed in g/mL, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{M P(\theta)} + 2 A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers and 0.001 otherwise], $P(\theta)$ is the form factor for a monodisperse random coil, and $K_o$ is the optical constant for the system:

$$K_o = \frac{4\pi^2 n^2 \left(\frac{dn}{dc}\right)^2}{\lambda^4 N_A}$$

where $N_A$ is Avogadro's number, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index (g') is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromotographic slices, i, between the integration limits. The branching index g' is defined as:

$$g' = \frac{[\eta]_{avg}}{k M_v^\alpha}$$

where, for purpose of this invention and claims thereto, α=0.695 for ethylene, propylene, and butene polymers; and k=0.000579 for ethylene polymers, k=0.000262 for propylene polymers, and k=0.000181 for butene polymers. $M_v$ is the viscosity-average molecular weight based on molecular weights determined by LS analysis.

Composition Distribution Breadth Index (CDBI)

CDBI is a measure of the composition distribution of monomer within the polymer chains. It is measured as described in WO 93/03093, with the modification that any fractions having a weight-average molecular weight ($M_w$) below 20 kg/mol are ignored in the calculation.

$^{13}$C-NMR Spectroscopy on Polyolefins

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in POLYMER CONFORMATION AND CONFIGURATION (Academic Press, New York 1969) and J. Randall in POLYMER SEQUENCE DETERMINATION, $^{13}$C-NMR METHOD (Academic Press, New York, 1977).

The "propylene tacticity index", expressed herein as [m/r], is calculated as defined in H. N. Cheng, *Macromolecules,* 17, 1950 (1984). When [m/r] is 0 to less than 1.0, the polymer is generally described as syndiotactic, when [m/r] is 1.0 the polymer is atactic, and when [m/r] is greater than 1.0 the polymer is generally described as isotactic.

The "mm triad tacticity index" of a polymer is a measure of the relative isotacticity of a sequence of three adjacent propylene units connected in a head-to-tail configuration. More specifically, in the present invention, the mm triad tacticity index (also referred to as the "mm Fraction") of a polypropylene homopolymer or copolymer is expressed as the ratio of the number of units of meso tacticity to all of the propylene triads in the copolymer:

$$mm \text{ Fraction} \frac{PPP(mm)}{PPP(mm) + PPP(mr) + PPP(rr)}$$

where PPP(mm), PPP(mr) and PPP(rr) denote peak areas derived from the methyl groups of the second units in the possible triad configurations for three head-to-tail propylene units, shown below in Fischer projection diagrams:

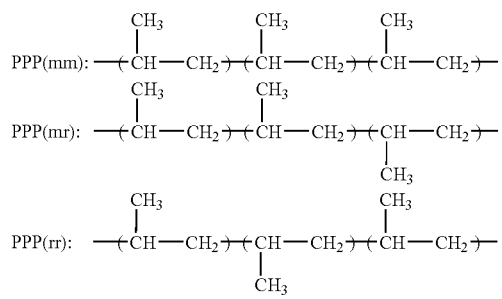

The calculation of the mm Fraction of a propylene polymer is described in U.S. Pat. No. 5,504,172 (homopolymer: column 25, line 49 to column 27, line 26; copolymer: column 28, line 38 to column 29, line 67). For further information on how the mm triad tacticity can be determined from a $^{13}$C-NMR spectrum, see 1) J. A. Ewen, CATALYTIC POLYMERIZATION OF OLEFINS: PROCEEDINGS OF THE INTERNATIONAL SYMPOSIUM ON FUTURE ASPECTS OF OLEFIN POLYMERIZATION, T. Keii and K. Soga, Eds. (Elsevier, 1986), pp. 271-292; and 2) U.S. patent application US2004/054086 (paragraphs [0043] to [0054]).

Ethylene content in ethylene copolymers is determined by ASTM D 5017-96, except that the minimum signal-to-noise should be 10,000:1. Propylene content in propylene copolymers is determined by following the approach of Method 1 in Di Martino and Kelchermans, *J. Appl. Polym. Sci.* 56, 1781 (1995), and using peak assignments from Zhang, *Polymer* 45, 2651 (2004) for higher olefin comonomers.

Fluid Molecular Weight

The number-average molecular weight ($M_n$) is determined by one of two methods:

1. For samples having a kinematic viscosity at 100° C. of 10 cSt or less use Gas Chromatography (GC) with a mass spectrometer detector, as generally described in MODERN PRACTICE OF GAS CHROMATOGRAPHY, $3^{RD}$ ED., R. L. Grob and E. F. Barry (Wiley-Interscience, 1995); or 2. For samples having a kinematic viscosity at 100° C. of more than 10 cSt use Gel Permeation Chromatography (GPC), as generally described in MODERN SIZE EXCLUSION LIQUID CHROMATOGRAPHS, W. W. Yan, J. J. Kirkland, and D. D. Bly, (J. Wiley & Sons, 1979), calibrated using polystyrene standards.

Fluid Carbon Type Composition

Carbon type composition is determined by ASTM D 2140, and gives the percentage of aromatic carbons ($C_A$), naphthenic carbons ($C_N$), and paraffinic carbons ($C_P$) in the fluid. Specifically, $C_A$ is the wt % of total carbon atoms in the fluid that are in aromatic ring-type structures; $C_N$ is the wt % of total carbon atoms in the fluid that are in saturated ring-type structures; and $C_P$ is the wt % of total carbon atoms in the fluid that are in paraffinic chain-type structures. ASTM D 2140 involves calculating a "Viscosity Gravity Constant" (VGC) and "Refractivity Intercept" (RI) for the fluid, and determining the carbon type composition from a correlation based on these two values. However, this method is known to fail for highly paraffinic oils, because the VGC and RI values fall outside the correlation range. Therefore, for purposes of this invention, the following protocol is used: If the calculated VGC (ASTM D 2140) for a fluid is 0.800 or greater, the carbon type composition including $C_P$ is determined by ASTM D 2140. If the calculated VGC (ASTM D 2140) is less than 0.800, the fluid is considered to have $C_P$ of at least 80%. If the calculated VGC (ASTM D 2140) is less than 0.800 but greater than 0.765, then ASTM D 3238 is used to determine the carbon type composition including $C_P$. If application of ASTM D 3238 yields unphysical quantities (e.g., a negative $C_A$ value), then $C_P$ is defined to be 100%. If the calculated VGC (ASTM D 2140) for a fluid is 0.765 or less, then $C_P$ is defined to be 100%.

Fluid Color

Color is determined on the APHA scale by ASTM D 1209. Note that an APHA color of 100 corresponds to a Saybolt color (ASTM D 156) of about +10; an APHA color of 20 corresponds to a Saybolt color of about +25; and an APHA color of 0 corresponds to a Saybolt color of about +30.

$^{13}$C-NMR Spectroscopy on Hydrocarbon Fluids

The composition and branching characteristics of paraffinic hydrocarbon fluids is determined by $^{13}$C-NMR spectroscopy, following the general procedures and peak assignments outlined in Breitmaier and Voelter, CARBON-13 NMR SPECTROSCOPY, $3^{RD}$ ED. (VCH, 1986).

NFP Content

The preferred method to determine the NFP content (weight percent basis) in a polyolefin composition is the Extraction Method. Alternatively, the NMR Method can be used. In event of conflict, the Extraction Method shall control.

The Extraction Method involves Soxhlet extraction, wherein at least a majority of the NFP is extracted with refluxing n-heptane. Analysis of the base polymer is also required because it may contain low molecular weight and/or amorphous material that is soluble in refluxing n-heptane. The level of NFP in the blend is determined by correcting its extractables level, in weight percent, by the extractables level for the base polymer, as described below.

The Soxhlet extraction apparatus consists of a 400 mL Soxhlet extractor, with a widened overflow tube (to prevent siphoning and to provide constant flow extraction); a metal screen cage fitted inside the main Soxhlet chamber; a Soxhlet extraction thimble (Whatman, single thickness, cellulose) placed inside the screen cage; a condenser with cooling water and drain; and a one-neck 1000 mL round bottom flask with appropriately sized stir bar and heating mantle.

The procedure is as follows. Dry the soxhlet thimbles in a 95° C. oven for 60 min. Weigh the dry thimble directly after removal from oven; record this weight as A in g. Weigh out 15-20 g of sample (either in pellet or ground pellet form) into the thimble; record as B in g. Place the thimble containing the polymer in the Soxhlet apparatus. Pour 300 mL of HPLC-grade n-heptane into the round bottom flask with stir bar and secure the flask on the heating mantle. Connect the round bottom flask, the soxhlet, and the condenser in series. Pour more n-heptane down through the center of the condenser into the Soxhlet main chamber until the solvent level is just below the top of the overflow tube. Turn on the cooling water to the condenser. Turn on the heating mantle and adjust the setting to generate a rolling boil in the round bottom flask and maintain a good reflux. Allow to reflux for 16 hrs. Turn the heat off but leave the cooling system on. Allow the system to cool down to room temperature. Disassemble the apparatus. Remove the thimble and rinse with a small amount of fresh n-heptane. Allow to air dry in the laboratory hood, followed by oven drying at 95° C. for 90 min. Weigh the thimble containing the polymer directly after removal from oven; record as C in g.

The quantity of extract is determined by calculating the weight loss from the sample, $W=(A+B-C)$, in g. The extractables level, E, in weight percent, is then calculated by $E=100$ (W/B). The NFP content in the blend, P, in weight percent, is calculated by $P=E(blend)-E(base\ polymer)$.

The NMR Method requires constructing a model based on a calibration curve (or set of calibration curves) of measured parameter(s) as a function of NFP concentration. The calibration blends are prepared using the same polymer and NFP as the blend(s) under investigation but at known NFP concentrations. This set of calibrants must number at least five, and include the neat polymer as well as at least one NFP concentration above the maximum for the blend(s) under investigation but not greater than 50 wt % NFP. The blend(s) under investigation are analyzed under the same conditions as the calibrants, and the NFP content determined by applying the model.

Specifically, the NMR Method involves high-temperature solution-phase $^{13}$C-nuclear magnetic resonance (HTS-CNMR). The composition is determined using the reference spectra of the neat polymer and neat NFP, as well as spectra for a set of calibration blends (i.e., prepared from the neat polymer and NFP at known wt % NFP). The spectra are analyzed to determine a set of one or more diagnostic resonances or clusters of resonances that increase or decrease in strength monotonically with increasing NFP content. The corresponding peaks are integrated and their fractional contribution to the total integral calculated as a function of NFP content (weight %) to generate a set of calibration curves. A chemometrics model is developed using these calibration curves to provide a method to calculate the NFP content. The number of diagnostic resonances is chosen to allow the model to predict NFP content with a precision of 1 wt % or better over the calibration range. For a general description of chemometrics and how to develop a chemometrics model, see CHEMOMETRIC TECHNIQUES FOR QUANTITATIVE ANALYSIS, Richard Kramer (Marcel Dekker, 1998). The blend(s) of unknown concentration are then run following the same HTS-CNMR procedure as used for the calibrants, and the results analyzed according to the model to determine the wt % NFP.

A typical HTS-CNMR procedure is as follows. Samples are prepared in 1,1,2,2-tetrachloroethane-$d_2$, with chromium acetylacetonate [Cr(acac)$_3$] added as a relaxation agent to accelerate data acquisition. The Cr(acac)$_3$ concentration in the stock solvent is approximately 15 mg/ml. Sample concentrations are between 10 and 15 wt %. Free induction decays of 15,000 transients are accumulated at a temperature of 120° C. on a Varian UnityPlus 500 instrument using a 10 mm broadband probe. Spectra are acquired with a 90° carbon excitation pulse, and inverse-gated WALTZ-16 proton decoupling. An acquisition time of approximately 1 second and recycle delay of 3.5 seconds are used to allow quantitative integration. Solvent choice and sample concentration may be adjusted to accommodate different solubility and to minimize spectral interference based on the specific composition of the blend. See CARBON-13 NMR SPECTROSCOPY: HIGH-RESOLUTION METHODS AND APPLICATIONS IN ORGANIC CHEMISTRY AND BIOCHEMISTRY, 3rd Ed., Eberhard Breitmaier and Wolfgang Voelter (VCH, 1990) for a general description of CNMR techniques.

Permanence

Permanence of the NFP is determined by ASTM D 1203, by measuring the weight loss from the plasticized composition in the form of a 0.25 mm thick sheet, after 300 hours in dry 70° C. oven. Permanence is 100% minus the Corrected % weight loss, where Corrected % weight loss=(% weight loss for the plasticized composition)–(% weight loss for the unplasticized composition under the same test conditions), % weight loss=$100\times(W-Wo)/Wo$, W=weight after drying and Wo is the weight before drying. The unplasticized composition is the same composition as the plasticized composition but without NFP added.

Atomic Force Microscopy (AFM)

AFM is used to determine if a polyolefin blend is a hetero-phase blend. AFM "phase images" acquired using the "tapping-mode" method provide a morphological map of the sample based primarily on modulus, which is a strong function of crystallinity for polyolefins. Therefore, if the sample is a hetero-phase blend, distinct domains will be observed if they have different crystallinity, as is the case for domains of EP Rubber and/or ethylene copolymer in a polypropylene matrix. Other factors that influence the tapping-mode AFM signal, such as adhesion and electrostatic charge, will generally not affect the ability to determine if a polyolefin blend is a hetero-phase blend.

A smooth surface for analysis is prepared by cryofacing a representative sample of the blend using a cryo-ultramicrotome equipped with a diamond knife and operated at a temperature of −130 to −150° C. The typical scan size is 20 microns by 20 microns, but smaller or larger scan sizes can be used depending on the size scale of the morphological features. The minimum size scale for a domain detectable by AFM is about 0.1 micron.

In tapping-mode AFM, a cantilever (equipped with a tip and housed in a scanner head) is oscillated at or slightly below its resonant frequency, which ensures repulsive contacts (i.e., positive phase shifts). Typical frequencies used are 50-100 kHz, but will vary depending on the actual stiffness of the assembly. During the imaging scan, the tip intermittently strikes the sample as the scanner head moves over the surface. A feedback loop maintains a constant oscillation amplitude of the cantilever based on the signal acquired by a photodiode detector that measures the intensity of light reflected from a laser aimed at the cantilever, which varies as the cantilever deflects. This constant oscillation amplitude insures a constant tip-sample interaction so features seen in the image are due to tip response to the sample and not factors driving the cantilever. The height image is determined by the vertical (z position) of the scanner at any (x, y) position on the surface. The phase image is determined by the phase shift between the driving oscillation for the cantilever and the response oscillation at any point on the surface. Higher modulus (harder) regions absorb more energy and therefore yield a larger phase shift compared to lower modulus (softer) regions. Specific parameters used to set the response of the feedback loop (integral and proportional gains) and the oscillation amplitude set-point (which is a fraction of the free oscillation amplitude) are readily established by those familiar with tapping-mode AFM.

Flow Marks

The tendency for a polyolefin material to exhibit flow marks (or "tiger striping") is evaluated by injection molding a plaque 14 in (35.6 cm), 5 in (12.7 cm) wide, 1 in (2.5 mm) thick at a melt temperature of 220° C., a mold temperature of 27° C., and a fixed injection speed. Prior to injection molding, carbon black is added to the test composition via a masterbatch to give a final carbon black treat rate of about 1 wt %. The severity of any visible flow marks is judged by a trained operator and assigned a "visibility rating" according to the following scale: 0=none, 1=very slight, 2=slight, 3=moderate, 4=severe. The tendency to exhibit flow marks is judged by measuring the distance from the gate to the first visible flow mark.

Scratch Resistance

The tendency for a polyolefin material to resist visible damage when scratched is evaluated using the Ford 5-Figer Scratch Test on an injection-molded plaque with an embossed surface pattern, specifically the CPM493 Stipple. Prior to injection molding, carbon black is added to the test composition via a masterbatch to give a final carbon black treat rate of about 1 wt %. The scratch resistance rating is the maximum load on the scratch finger that does not yield visible damage, as judged by a trained operator.

EXAMPLES

The present invention, while not meant to be limited by, may be better understood by reference to the following examples and tables.

Blend components used to prepare the Example Blends are reported in Table 1; compositions of Example (E) and Comparative (C) blends are reported in Tables 2a and 2b; evaluation results for Example (E) and Comparative (C) blends are reported in Tables 3a and 3b.

Blends were prepared by melt-mixing all components on a ZSK-30 twin-screw extruder (30 mm diameter) with underwater pelletizer, using loss-in-weight feeders for adding components through the extruder feed-throat. Example blends were prepared by melt-mixing a masterbatch composition with other components to yield the final composition, again using the ZSK-30 twin-screw extruder and feed-throat addition of all components except wollastonite, which was added using a side feeder. Two masterbatch (MB) compositions were prepared on a ZSK-25 twin-screw extruder (25 mm diameter, 44 L/D, 400 RPM) with underwater pelletizer, loss-in-weight feeders for addition of the solid components through the extruder feed-throat and for liquid injection of the NFP (injection point at barrel section 8 of 11):

MB-A: 72 wt % Plastomer-1/20 wt % PAO-2/8 wt % ICP-1

MB-B: 72 wt % Plastomer-1/20 wt % PAO-1/8 wt % ICP-1

MB-C: 72 wt % Plastomer-2/20 wt % PAO-2/8 wt % ICP-1

Test specimens were injection molded, conditioned, and tested as described in the Experimental Methods section.

TABLE 1

| Component | Description |
|---|---|
| ICP-1 | propylene/ethylene in-situ ICP (Ziegler-Natta catalyst) ethylene content ~9 wt %; EP Rubber content ~18 wt %; MFR ~35 dg/min; flexural modulus ~1270 MPa; nucleated |
| ICP-2 | propylene/ethylene in-situ ICP (Ziegler-Natta catalyst) ethylene content ~4 wt %; EP Rubber content ~8 wt %; MFR ~80 dg/min; flexural modulus ~1660 MPa; nucleated |
| ICP-3 | propylene/ethylene in-situ ICP (Ziegler-Natta catalyst) ethylene content ~16 wt %; EP Rubber content ~30 wt %; MFR ~15 dg/min; flexural modulus ~940 MPa; nucleated |
| Plastomer-1 | ethylene/octene plastomer (metallocene catalyst) MI ~5 dg/min; density ~0.87 g/cm$^3$; $T_m$ ~65° C.; flexural modulus ~13 MPa |
| Plastomer-2 | ethylene/octene plastomer (metallocene catalyst) MI ~3 dg/min; density ~0.86 g/cm$^3$; $T_m$ ~35° C.; flexural modulus ~4 MPa |
| PAO-1 | octene/decene/dodecene PAO KV @ 100° C. ~10 cSt; VI ~137; pour point ~−48° C.; specific gravity ~0.835 |
| PAO-2 | octene/decene/dodecene PAO KV @ 100° C. ~100 cSt; VI ~170; pour point ~−30° C.; specific gravity ~0.853 |
| Talc | median particle size ~1.5 micron |
| Wollastonite | median particle size ~5 micron; aspect ratio (L/D) ~10:1 |

TABLE 2a

| | Example | | | | | | | | |
|---|---|---|---|---|---|---|---|---|---|
| | C1 | E1 | E2 | E3 | E4 | E5 | E6 | E7 | E8 |
| ICP-1 (wt %) | 40.0 | 46.6 | 46.6 | 46.6 | 45.8 | 45.8 | 45.8 | 41.6 | 41.6 |
| ICP-2 (wt %) | 15.0 | 15.0 | 15.0 | 15.0 | 15.0 | 15.0 | 15.0 | 15.0 | 15.0 |
| Plastomer-1 (wt %) | 25.0 | 14.4 | 14.4 | 14.4 | 17.2 | 17.2 | — | 19.4 | — |
| Plastomer-2 (wt %) | — | — | — | — | — | — | 17.2 | — | 19.4 |
| Talc (wt %) | 20.0 | 20.0 | 20.0 | — | 20.0 | — | — | 20.0 | 20.0 |
| Wollastonite (wt %) | — | — | — | 20.0 | — | 20.0 | 20.0 | — | — |
| PAO-1 (wt %) | — | — | 4.0 | — | — | — | — | 4.0 | 4.0 |
| PAO-2 (wt %) | — | 4.0 | — | 4.0 | 2.0 | 2.0 | 2.0 | — | — |

TABLE 2b

| | Example | | | | | | | | |
|---|---|---|---|---|---|---|---|---|---|
| | C2 | E9 | E10 | E11 | E12 | E13 | E14 | E15 | E16 |
| ICP-1 (wt %) | 15.0 | 21.6 | 21.6 | 21.6 | 20.8 | 20.8 | 20.8 | 16.6 | 16.6 |
| ICP-2 (wt %) | 40.0 | 40.0 | 40.0 | 40.0 | 40.0 | 40.0 | 40.0 | 40.0 | 40.0 |
| Plastomer-1 (wt %) | 25.0 | 14.4 | 14.4 | 14.4 | 17.2 | 17.2 | — | 19.4 | — |

TABLE 2b-continued

|  | Example | | | | | | | | |
|---|---|---|---|---|---|---|---|---|---|
|  | C2 | E9 | E10 | E11 | E12 | E13 | E14 | E15 | E16 |
| Plastomer-2 (wt %) | — | — | — | — | — | — | 17.2 | — | 19.4 |
| Talc (wt %) | 20.0 | 20.0 | 20.0 | — | 20.0 | — | — | 20.0 | 20.0 |
| Wollastonite (wt %) | — | — | — | 20.0 | — | 20.0 | 20.0 | — | — |
| PAO-1 (wt %) | — | — | 4.0 | — | — | — | — | 4.0 | 4.0 |
| PAO-2 (wt %) | — | 4.0 | — | 4.0 | 2.0 | 2.0 | 2.0 | — | — |

TABLE 2c

|  | Example | | | | | | | |
|---|---|---|---|---|---|---|---|---|
|  | E17 | E18 | E19 | E20 | E21 | E22 | E23 | E24 |
| ICP-1 (wt %) | 0.8 | 0.8 | 50.0 | 30.0 | 30.0 | — | — | — |
| ICP-2 (wt %) | — | — | 15.0 | 35.0 | 15.0 | — | — | — |
| ICP-3 (wt %) | 75.0 | 75.0 | — | — | — | 72.0 | 63.4 | 89.8 |
| Plastomer-1 (wt %) | 7.2 | — | — | — | — | — | — | — |
| Plastomer-2 (wt %) | — | 7.2 | 17.0 | 15.0 | 24.8 | 5.0 | 15.0 | 5.0 |
| Talc (wt %) | 15.0 | 15.0 | 15.0 | 17.0 | 30.0 | 20.0 | 20.0 | 5.0 |
| PAO-1 (wt %) | 2.0 | 2.0 | 3.0 | 3.0 | 0.2 | 3.0 | 1.6 | 2.0 |

TABLE 3a

|  | Example | | | | | | | | |
|---|---|---|---|---|---|---|---|---|---|
|  | C1 | E1 | E2 | E3 | E4 | E5 | E6 | E7 | E8 |
| MFR (dg/min) | 23 | 36 | 36 | 51 | 29 | 34 | 31 | 34 | 31 |
| Flexural Modulus (MPa) | 1490 | 1328 | 1256 | 1552 | 1296 | 1615 | 1481 | 1269 | 1252 |
| Tensile Yield Strength (MPa) | 18.2 | 16.7 | 16.2 | 16.2 |  | 17.6 | 16.9 | 15.3 | 14.4 |
| Hardness, Sh D (15 sec) | 57 | 55 | 55 | 55 | 57 | 57 | 55 |  |  |
| HDT, 0.45 MPa (° C.) | 100 | 101 | 101 | 94 | 100 | 111 | 107 | 110 | 116 |
| Notched Charpy, 23° C. (kJ/m$^2$) | 57.5 | 40.6 | 38.6 | 54.5 | 43.8 | 35.7 | 44.1 | 52.0 | 60.5 |
| Notched Charpy, −30° C. (kJ/m$^2$) | 4.4 | 2.8 | 2.7 | 3.4 |  | 2.2 | 2.7 | 4.0 | 4.5 |
| Multi-Axial Impact, −30° C. (J) | 26.1 | 22.2 | 19.3 | 21.5 | 22.5 | 21.1 | 21.0 |  |  |
| # Ductile failures | 5 | 1 | 0 | 0 | 4 | 4 | 3 |  |  |
| # Mixed-Mode failures | 0 | 0 | 1 | 0 | 3 | 2 | 2 |  |  |
| # Brittle failures | 0 | 9 | 9 | 10 | 3 | 4 | 5 |  |  |
| Flow Marks - visibility rating | 3 |  | 3 | 2 | 4 | 3 | 3 | 3 | 2 |
| distance from gate (in) | 2.0 |  | 6.0 | 9.5 | 6.0 | 7.0 | 5.5 | 3.5 | 9.0 |
| Scratch Resistance (N) |  |  | 3 |  | 3 | 3 | 3 | 5 | 5 |

TABLE 3b

|  | Example | | | | | | | | |
|---|---|---|---|---|---|---|---|---|---|
|  | C2 | E9 | E10 | E11 | E12 | E13 | E14 | E15 | E16 |
| MFR (dg/min) | 26 | 44 | 45 | 63 | 36 | 52 | 39 | 41 | 38 |
| Flexural Modulus (MPa) | 1754 | 1520 | 1390 | 1747 | 1441 | 1779 | 1751 | 1634 | 1474 |
| Tensile Yield Strength (MPa) | 18.9 | 18.2 | 17.2 | 17.3 |  | 17.8 | 17.6 | 17.6 | 15.8 |
| Hardness, Sh D (15 sec) | 60 | 58 | 58 | 57 | 59 | 58 | 58 |  |  |
| HDT, 0.45 MPa (° C.) | 105 | 107 | 105 | 101 | 100 | 104 | 111 | 113 | 78 |
| Notched Charpy, 23° C. (kJ/m$^2$) | 53.7 | 14.5 | 23.9 | 39.5 | 36.2 | 48.6 | 37.8 | 40.9 | 50.8 |
| Notched Charpy, −30° C. (kJ/m$^2$) | 2.9 | 2.5 | 2.5 | 2.6 |  | 2.3 | 2.0 | 2.9 | 4.1 |
| Multi-Axial Impact, −30° C. (J) | 25.8 | 12.9 | 16.5 | 17.1 | 21.4 | 21.5 | 21.4 |  |  |
| # Ductile failures | 5 | 0 | 0 | 0 | 0 | 0 | 0 |  |  |
| # Mixed-Mode failures | 0 | 0 | 0 | 0 | 0 | 0 | 0 |  |  |
| # Brittle failures | 0 | 10 | 10 | 10 | 10 | 10 | 10 |  |  |
| Flow Marks - visibility rating | 3 | 2 | 1 | 3 | 2 | 2.5 | 4 | 3 |  |
| distance from gate (in) | 5.0 | 8.0 | 11.5 | 7.5 | 12.0 | 9.0 | 3.5 | 5.0 |  |
| Scratch Resistance (N) |  | <3 | 3 | 3 | 3 | 3 | 3 | 3 |  |

TABLE 3c

| | E17 | E18 | E19 | E20 | E21 | E22 | E23 | E24 |
|---|---|---|---|---|---|---|---|---|
| MFR (dg/min) | 18 | 18 | 33 | 39 | 17 | 17 | 14 | 16 |
| Flexural Modulus (MPa) | 1075 | 1000 | 1300 | 1600 | 1540 | 1290 | 990 | 1010 |
| Tensile Yield Strength (MPa) | 15.1 | 14.6 | 16.3 | 18.3 | 14.1 | 15.1 | 12.3 | 16.8 |
| Hardness, Sh D (15 sec) | 53 | 52 | 54 | 58 | 52 | | | |
| HDT, 0.45 MPa (° C.) | 49 | 47 | 101 | 106 | 101 | 94 | 84 | 81 |
| Notched Charpy, 23° C. (kJ/m$^2$) | 36.6 | 45.6 | 52.2 | 14.3 | 68.0 | | | |
| Notched Charpy, −30° C. (kJ/m$^2$) | 16.4 | 16.2 | 4.6 | 3.5 | 5.4 | | | |
| Multi-Axial Impact, −30° C. (J) | 21.8 | 21.1 | 24.3 | 22.8 | 23.4 | 29.6 | 21.8 | 28.3 |
| # Ductile failures | 9 | 9 | 8 | 7 | 10 | 10 | 10 | 10 |
| # Mixed-Mode failures | 1 | 1 | 2 | 3 | 0 | 0 | 0 | 0 |
| # Brittle failures | 0 | 0 | 0 | 0 | 0 | 0 | 0 | 0 |
| Flow Marks - visibility rating | 3 | 3 | 2 | 1 | 4 | 3 | 4 | 1 |
| distance from gate (in) | 5.0 | 5.0 | 7.0 | 7.0 | 2.5 | 3.5 | 2.5 | 7.5 |

All documents described herein are incorporated by reference herein, including any priority documents and/or testing procedures to the extent they are not inconsistent with this text, provided however that U.S. Ser. Nos. 10/782,228, 10/640,435, 60/402,665, 10/634,351, are not incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A hetero-phase polyolefin composition comprising:
   a) 30 to 99.7 wt % of a polypropylene-based TPO comprising at least 50 wt % propylene and at least 10 wt % ethylene wherein the polypropylene-based TPO comprises a matrix having a $T_m$ of 110° C. or more and a dispersed phase having a $T_g$ of −20° C. or less, and
   b) 0.1 to 20 wt % of one or more non-functionalized plasticizer(s) (NFP),
   c) 5 to 50 wt % of one or more filler(s); and
   d) 5 to 40 wt % of at least one ethylene copolymer having a density of less than 0.90 g/cm$^3$; based upon the weight of the composition, and having:
   i) an melt flow rate (MFR) of 5 dg/min or more, and
   ii) a flexural modulus of 1100 MPa or more, and
   iii) a notched Charpy impact strength at −30° C. of 1 kJ/m$^2$ or more or a notched Izod impact strength at −18° C. of 50 J/m or more; and
   wherein when the composition is injection molded the distance from the gate to the first visible flow mark is 5 in or more.

2. The composition of claim 1 wherein the composition has an MFR of 10 dg/min or more.

3. The composition of claim 1 wherein the composition has an MFR of 15 to 400 dg/min.

4. The composition of claim 1 wherein the composition has a flexural modulus of 1100 to 3500 MPa.

5. The composition of claim 1 wherein the composition has a notched Charpy impact strength at −30° C. of 2 kJ/m$^2$ or more and a notched Izod impact strength at −18° C. of 50 J/m or more.

6. The composition of claim 1 wherein the composition has a notched Charpy impact strength at −30° C. of 2.5 to 15 kJ/m$^2$ or more and a notched Izod impact strength at −18° C. of 50 J/m or more.

7. The composition of claim 1 wherein the composition has a notched Charpy impact strength at −30° C. of 2 kJ/m$^2$ or more and a notched Izod impact strength at −18° C. of 60 J/m or more.

8. The composition of claim 1 wherein the composition has a notched Charpy impact strength at −30° C. of 2 kJ/m$^2$ or more and a notched Izod impact strength at −18° C. of 70 to 500 J/m.

9. The composition of claim 1 wherein the composition comprises 35 to 95 wt % of the polypropylene-based TPO.

10. The composition of claim 1 wherein the composition comprises 40 to 90 wt % of the polypropylene-based TPO.

11. The composition of claim 1 wherein the polypropylene-based TPO comprises at least 55 wt % propylene.

12. The composition of claim 1 wherein the polypropylene-based TPO comprises at least 60 wt % propylene.

13. The composition of claim 1 wherein the polypropylene-based TPO comprises at least 15 wt % ethylene.

14. The composition of claim 1 wherein the polypropylene-based TPO comprises at least 20 wt % ethylene.

15. The composition of claim 1 wherein the composition comprises 0.5 to 15 wt % of one or more non-functionalized plasticizer(s).

16. The composition of claim 1 wherein the composition comprises 1 to 10 wt % of one or more non-functionalized plasticizer(s).

17. The composition of claim 1 wherein the composition comprises 0.5 to 40 wt % of one or more filler(s).

18. The composition of claim 1 wherein the composition comprises 1 to 30 wt % of one or more filler(s).

19. The composition of claim 1 wherein the polypropylene-based TPO is a polypropylene impact copolymer.

20. The composition of claim 1 wherein the polypropylene-based TPO comprises a homopolypropylene matrix.

21. The composition of claim 1 wherein the polypropylene-based TPO comprises a propylene copolymer matrix.

22. The composition of claim 1 wherein the polypropylene-based TPO comprises an isotactic polypropylene matrix.

23. The composition of claim 1 wherein the polypropylene-based TPO comprises a matrix having a $T_m$ of 120° C. or more.

24. The composition of claim 1 wherein the polypropylene-based TPO comprises a matrix having a $T_m$ of 140° C. or more.

25. The composition of claim 1 wherein the polypropylene-based TPO comprises a matrix having a $T_m$ of 160° C. or more.

26. The composition of claim 1 wherein the polypropylene-based TPO comprises a dispersed phase having a $T_g$ of −30° C. or less.

27. The composition of claim 1 wherein the polypropylene-based TPO comprises a dispersed phase having a $T_g$ of −40° C. or less.

28. The composition of claim 1 wherein the polypropylene-based TPO comprises a dispersed phase having a $T_g$ of −50° C. or less.

29. The composition of claim 1 wherein the polypropylene-based TPO is an impact copolymer having a $T_m$ of 120° C. or more and a $T_g$ of −30° C. or less.

30. The composition of claim 1 wherein the polypropylene-based TPO is an impact copolymer having a matrix phase comprising polypropylene having a $T_m$ of 120° C. or more and a dispersed phase comprising propylene copolymer having a $T_g$ of −30° C. or less.

31. The composition of claim 1 wherein the polypropylene-based TPO is an impact copolymer having a rubber content of 5 to 40 wt %, a melt flow rate of 5 to 150 dg/min, and a flexural modulus of 300 to 3000 MPa.

32. The composition of claim 1 wherein the polypropylene-based TPO is an in-situ impact copolymer.

33. The composition of claim 1 wherein the polypropylene-based TPO comprises two or more in-situ impact copolymers.

34. The composition of claim 1 wherein the polypropylene-based TPO comprises two or more in-situ impact copolymers, where the combination of the impact copolymers comprises at least 50 wt % propylene and at least 10 wt % ethylene, based upon the weight of the impact copolymers.

35. The composition of claim 1 where the composition further comprises 1 to 40 wt % of an ethylene copolymer.

36. The composition of claim 1 wherein the polypropylene-based TPO is an impact copolymer present at 20 to 98.7 wt % and the composition further comprises 1 to 40 wt % of one or more ethylene copolymer(s).

37. The composition of claim 1 wherein the polypropylene-based TPO is an in-situ impact copolymer present at 20 to 98.7 wt % and the composition further comprises 1 to 40 wt % of one or more ethylene copolymer(s) having a density of 0.90 g/cm³ or less.

38. The composition of claim 1 where the composition further comprises 5 to 35 wt % of a copolymer of ethylene and one or more of propylene, butene, hexene, or octene, and the copolymer has a density of 0.85 to 0.90 g/cm³ and a melt index of 0.1 to 100 dg/min.

39. The composition of claim 1 where the composition further comprises 5 to 35 wt % of a copolymer of ethylene and one or more of propylene, butene, hexene or octene, and the copolymer has a density of 0.85 to 0.88 g/cm³ and a melt index of 0.3 to 60 dg/min.

40. The composition of claim 1 wherein the polypropylene-based TPO is an impact copolymer and the composition further comprises one or more EP Rubber(s).

41. The composition of claim 1 wherein the polypropylene-based TPO is an impact copolymer present at 20 to 98.8 wt % and the composition further comprises 1 to 40 wt % of one or more EP Rubber(s).

42. The composition of claim 1 wherein the polypropylene-based TPO is an in-situ impact copolymer present at 20 to 98.8 wt % and the composition further comprises 1 to 40 wt % of one or more EP Rubber(s) having an ethylene content of 25 to 80 wt % and a Mooney viscosity (ML 1+4, 125° C.) of 10 to 100.

43. The composition of claim 1 wherein the polypropylene-based TPO comprises at least one propylene polymer having a melting point of 110° C. and at least one ethylene copolymer having a density of less than 0.90 g/cm³.

44. The composition of claim 1 wherein the polypropylene-based TPO comprises at least one propylene polymer having a melting point of 110° C. and at least one EP Rubber having a density of less than 0.87 g/cm³.

45. The composition of claim 1 wherein the polypropylene-based TPO comprises at least one propylene polymer and at least one EP Rubber having a density of less than 0.87 g/cm³.

46. The composition of claim 1 wherein the composition has:
   a) a melt flow rate of 10 to 500 dg/min, and
   b) a flexural modulus of 1100 to 3500 MPa; and the composition has one or both of the following properties:
   c) a notched Charpy impact strength at −30° C. of 1.5 to 15 kJ/m², and/or
   d) a notched Izod impact strength at −18° C. of 60 to 500 J/m.

47. The composition of claim 1 wherein the composition has:
   a) a melt flow rate of 10 to 500 dg/min, and
   b) a flexural modulus of 1100 to 3500 MPa ; and the composition has one or both of the following properties:
   c) a notched Charpy impact strength at −30° C. of 1.5 to 15 kJ/m², and/or
   d) a notched Izod impact strength at −18° C. of 60 to 500 J/m;
   and the composition has one or more of the following properties:
   e) a notched Charpy impact strength at 23° C. of 20 kJ/m² or more, and/or
   f) a notched Izod impact strength at 23° C. of 100 J/m or more, and/or
   g) a ductile failure in a multi-axial impact strength test at 23° C., and/or
   h) a heat distortion temperature (HDT) of 60° C. or more, and/or
   i) a tensile strength of 10 MPa or more, and/or
   j) shrinkage upon injection molding of 0.1 to 5%, and/or
   k) a fogging number of 70 or more.

48. The composition of claim 1 wherein the composition has:
   a) a melt flow rate of 10 to 500 dg/min, and
   b) a flexural modulus of 1100 to 3500 MPa, and
   c) a notched Charpy impact strength at −30° C. of 1.5 to 15 kJ/m², and
   d) a notched Izod impact strength at −18° C. of 60 to 500 J/m, and
   e) a notched Charpy impact strength at 23° C. of 20 kJ/m² or more.

49. The composition of claim 1 wherein the composition has:
   a) a melt flow rate of 10 to 500 dg/min, and
   b) a flexural modulus of 1100 to 3500 MPa, and
   c) a notched Charpy impact strength at −30° C. of 1.5 to 15 kJ/m², and
   d) a notched Izod impact strength at −18° C. of 60 to 500 J/m, and
   e) a notched Izod impact strength at 23° C. of 100 J/m or more.

50. The composition of claim 1 wherein the composition has:
   a) a melt flow rate of 10 to 500 dg/min, and
   b) a flexural modulus of 1100 to 3500 MPa, and
   c) a notched Charpy impact strength at −30° C. of 1.5 to 15 kJ/m², and d) a notched Izod impact strength at −18° C. of 60 to 500 J/m, and
e) a ductile failure in a multi-axial impact strength test at 23° C.

51. The composition of claim 1 wherein the composition has:
a) a melt flow rate of 10 to 500 dg/min, and
b) a flexural modulus of 1100 to 3500 MPa, and
c) a notched Charpy impact strength at −30° C. of 1.5 to 15 kJ/m², and
d) a notched Izod impact strength at −18° C. of 60 to 500 J/m, and
e) a heat distortion temperature (HDT) of 60° C. or more.

52. The composition of claim 1 wherein the composition has:
a) a melt flow rate of 10 to 500 dg/min, and
b) a flexural modulus of 1100 to 3500 MPa, and
c) a notched Charpy impact strength at −30° C. of 1.5 to 15 kJ/m², and
d) a notched Izod impact strength at −18° C. of 60 to 500 J/m, and
e) a tensile strength of 10 MPa or more.

53. The composition of claim 1 wherein the composition has:
a) a melt flow rate of 10 to 500 dg/min, and
b) a flexural modulus of 1100 to 3500 MPa, and
c) a notched Charpy impact strength at −30° C. of 1.5 to 15 kJ/m², and
d) a notched Izod impact strength at −18° C. of 60 to 500 J/m, and
e) shrinkage upon injection molding of 0.1 to 5%.

54. The composition of claim 1 wherein the composition has:
a) a melt flow rate of 10 to 500 dg/min, and
b) a flexural modulus of 1100 to 3500 MPa, and
c) a notched Charpy impact strength at −30° C. of 1.5 to 15 kJ/m², and
d) a notched Izod impact strength at −18° C. of 60 to 500 J/m, and
e) a fogging number of 70 or more.

55. The composition of claim 1 wherein the glass transition temperature ($T_g$) of at least one polymer component in the composition is depressed by at least 2° C. for every 1 wt % of NFP present in the composition, while the peak melting temperature of the highest melting component remains within 5° C. of its value for the same composition absent the NFP.

56. The composition of claim 1 wherein the melt flow rate of the composition increases by at least 2% for every 1 wt % of NFP present in the composition as compared to the same composition absent the NFP.

57. The composition of claim 1 wherein the NFP has a kinematic viscosity at 100° C. of 4 cSt or more.

58. The composition of claim 1 wherein the NFP has a kinematic viscosity at 100° C. of 6 cSt or more.

59. The composition of claim 1 wherein the NFP has a kinematic viscosity at 100° C. of 8 cSt or more.

60. The composition of claim 1 wherein the NFP has a kinematic viscosity at 100° C. of 10 cSt or more.

61. The composition of claim 1 wherein the NFP has a kinematic viscosity at 100° C. of 6 to 5000 cSt.

62. The composition of claim 1 wherein the NFP has a kinematic viscosity at 100° C. of 8 to 3000 cSt.

63. The composition of claim 1 wherein the NFP has a kinematic viscosity at 100° C. of 10 to 1000 cSt.

64. The composition of claim 1 wherein the NFP has a pour point of −20° C. or less.

65. The composition of claim 1 wherein the NFP has a pour point of −30° C. or less.

66. The composition of claim 1 wherein the NFP has a pour point of −40° C. or less.

67. The composition of claim 1 wherein the NFP has a pour point of −30° C. or less and a kinematic viscosity at 40° C. of 20 to 600 cSt.

68. The composition of claim 1 wherein the NFP has a $T_g$ of −40° C. or less.

69. The composition of claim 1 wherein the NFP has a viscosity index of 100 or more.

70. The composition of claim 1 wherein the NFP has a viscosity index of 110 or more.

71. The composition of claim 1 wherein the NFP has a viscosity index of 120 or more.

72. The composition of claim 1 wherein the NFP has a viscosity index of 130 or more.

73. The composition of claim 1 wherein the NFP has a viscosity index of 135 to 300.

74. The composition of claim 1 wherein the NFP has a flash point of 200° C. or more.

75. The composition of claim 1 wherein the NFP has a flash point of 210° C. or more.

76. The composition of claim 1 wherein the NFP has a flash point of 230° C. or more.

77. The composition of claim 1 wherein the NFP has a specific gravity of 0.86 or less.

78. The composition of claim 1 wherein the NFP has a specific gravity of 0.855 or less.

79. The composition of claim 1 wherein the NFP has a viscosity index of 120 or more, a flash point of 200° C. or more, and a pour point of −10° C. or less.

80. The composition of claim 1 wherein the NFP has a kinematic viscosity at 100° C. of 35 cSt or more, a specific gravity of 0.87 or less, and a flash point of 200° C. or more.

81. The composition of claim 1 wherein the NFP has a) a flash point of 200° C. or more;
b) a specific gravity of 0.86 or less; and c1) a pour point of −10° C. or less and a viscosity index of 120 or more, or c2) a pour point of −20° C. or less, or c3) a kinematic viscosity at 100° C. of 35 cSt or more.

82. The composition of claim 1 wherein the NFP has a) a specific gravity of 0.85 or less; and b1) a kinematic viscosity at 100° C. of 3 cSt or more, and/or b2) a number-average molecular weight ($M_n$) of at least 280 g/mol.

83. The composition of claim 1 wherein the NFP has a) a specific gravity of 0.86 or less;
and b1) a kinematic viscosity at 100° C. of 5 cSt or more, and/or b2) a number-average molecular weight ($M_n$) of at least 420 g/mol.

84. The composition of claim 1 wherein the NFP has a) a specific gravity of 0.87 or less;
and b1) a kinematic viscosity at 100° C. of 10 cSt or more, and/or b2) a number-average molecular weight ($M_n$) of at least 700 g/mol.

85. The composition of claim 1 wherein the NFP has a kinematic viscosity at 100° C. of 3 to 100 cSt, and a number average molecular weight ($M_n$) of 300 to 3,000 g/mol.

86. The composition of claim 1 wherein the non-functionalized plasticizer has a kinematic viscosity at 100° C. of 5 cSt or more, a viscosity index of 100 or more, a pour point of −20° C. or less, a specific gravity less than 0.86, and a flash point greater than 200° C.

87. The composition of claim 1 wherein the non-functionalized plasticizer comprises at least 50 weight% of $C_6$ to $C_{150}$ isoparaffins.

88. The composition of claim 1 wherein the non-functionalized plasticizer has a pour point of −40° C. or less and a specific gravity of less than 0.85.

89. The composition of claim 1 wherein the non-functionalized plasticizer comprises oligomers of $C_5$ to $C_{18}$ alpha-olefins.

90. The composition of claim 1 wherein the non-functionalized plasticizer comprises oligomers of $C_6$ to $C_{14}$ alpha-olefins.

91. The composition of claim 1 wherein the non-functionalized plasticizer comprises oligomers of $C_8$ to $C_{12}$ alpha-olefins.

92. The composition of claim 1 wherein the non-functionalized plasticizer comprises oligomers of decene.

93. The composition of claim 1 wherein the non-functionalized plasticizer comprises oligomers of $C_3$ to $C_{24}$ linear alpha-olefins wherein $C_3$ and $C_4$ linear alpha-olefins are present at 10 wt % or less.

94. The composition of claim 1 wherein the non-functionalized plasticizer comprises oligomers of two or more $C_3$ to $C_{18}$ linear alpha-olefins wherein $C_3$ and $C_4$ linear alpha-olefins are present at 10 wt % or less.

95. The composition of claim 1 wherein the non-functionalized plasticizer comprises oligomers of $C_5$ to $C_{18}$ linear alpha-olefins and has a branching ratio of 0.20 or less.

96. The composition of claim 1 wherein the non-functionalized plasticizer comprises $C_{15}$ to $C_{1500}$ oligomers of alpha-olefins and has a kinematic viscosity at 100° C. of 3 cSt or more.

97. The composition of claim 1 wherein the non-functionalized plasticizer comprises $C_{20}$ to $C_{1000}$ oligomers of alpha-olefins and has a kinematic viscosity at 100° C. of 5 cSt or more.

98. The composition of claim 1 wherein the non-functionalized plasticizer comprises $C_{15}$ to $C_{1500}$ oligomers of alpha-olefins and has a kinematic viscosity at 100° C. of 8 cSt or more, a viscosity index of 120 or more, and a specific gravity of 0.86 or less.

99. The composition of claim 1 wherein the non-functionalized plasticizer comprises $C_{15}$ to $C_{1500}$ oligomers of alpha-olefins and has a kinematic viscosity of 10 cSt or more at 100° C. and a viscosity index of 120 or more, and a specific gravity of 0.86 or less.

100. The composition of claim 1 wherein the non-functionalized plasticizer comprises oligomers of $C_5$ to $C_{18}$ linear alpha-olefins and has a kinematic viscosity of 8 cSt or more at 100° C., a viscosity index of 120 or more, and a pour point of −25° C. or less.

101. The composition of claim 1 wherein the non-functionalized plasticizer comprises:
  1) a copolymer of a $C_4$ olefins derived from a $C_4$ raffinate stream or 2) a poly(n-butene) or 3) a copolymer of at least isobutylene derived units, 1-butene derived units, and 2-butene derived units;
  and has a pour point of −20° C. or less and a kinematic viscosity at 100° C. of 6 to 150 cSt.

102. The composition of claim 1 wherein the non-functionalized plasticizer comprises a mineral oil having a saturates levels of 90% or more, a sulfur content of less than 0.03%, and a VI of 120 or more.

103. The composition of claim 1 wherein the non-functionalized plasticizer comprises a paraffinic process oil with
  A) a viscosity index of 90 to 119, and
  B) a $C_p$ of 65% or more, and
  C) a $C_A$ of 1% or less, and
  D) a kinematic viscosity at 40° C. of 80 cSt or more, and
  E) a pour point of −15° C. or less.

104. The composition of claim 1 wherein the non-functionalized plasticizer is a hydrocarbon fluid derived from a Gas-To-Liquids process comprising hydroisomerized Fischer-Tropsch waxes and having a pour point of about −20 to −60° C. and a kinematic viscosity of about 6 to 20 cSt.

105. The composition of claim 1 wherein the non-functionalized plasticizer comprises a mixture of paraffins has two or more of the following properties:
  1) a naphthenic content of less than 40 wt %, based on the total weight of the paraffin mixture; and/or
  2) a normal paraffins content of less than 5 wt %, based on the total weight of the paraffin mixture; and/or
  3) an aromatic content of 1 wt % or less, based on the total weight of the paraffin mixture; and/or
  4) a saturates level of 90 wt % or higher; and/or
  5) a percentage of carbons in chain-type paraffinic structures ($C_p$) of 80% or more; and/or
  6) a branched paraffin:normal paraffin ratio greater than about 10:1; and/or
  7) sidechains with 4 or more carbons making up less than 10% of all sidechains; and/or
  8) sidechains with 1 or 2 carbons making up at least 50% of all sidechains; and/or
  9) a sulfur content of 300 ppm or less (weight basis); and/or
  10) a nitrogen content of 300 ppm or less (weight basis); and/or
  11) a number-average molecular weight of 300 to 1800 g/mol; and/or
  12) a kinematic viscosity at 40° C. of 10 cSt or more; and/or
  13) a kinematic viscosity at 100° C. ranging from 2 to 50 cSt; and/or
  14) a viscosity index (VI) of 80 or greater; and/or
  15) a pour point of −5° C. or lower; and/or
  16) a flash point of 200° C. or more; and/or
  17) a specific gravity of 0.86 or less; and/or
  18) an aniline point of 120° C. or more; and/or
  19) a bromine number of 1 or less.

106. The composition of claim 1 wherein the filler is selected from the group consisting of mineral aggregates (natural or synthetic), fibers, carbon black, graphite, wollastonite, natural and synthetic clays including nanoclays and organoclays, sand, and glass beads.

107. The composition of claim 1 wherein the filler has a median particle diameter of 0.1- 100 microns.

108. The composition of claim 1 wherein the filler has an aspect ratio greater than 1.2.

109. The composition of claim 1 wherein the filler has a specific surface area of 10 to 300 $m^2/cm^3$.

110. The composition of claim 1 wherein the filler is selected from the group consisting of talc, mica, wollastonite, titanium dioxide, silicon carbide, silica, silicon dioxide and other oxides of silica (precipitated or not), calcium silicate, calcium and barium sulfates, calcium carbonate (calcite), lead carbonate, magnesium silicate, magnesium oxysulfates, antimony oxide, zinc white, lithopone, zircon, corundum, spinel, apatite, Barytes powder, magnesiter, dolomite, zinc borate, hydrotalcite compounds of the ions Mg, Ca, or Zn with Al, Cr or Fe and $CO_3$ and/or $HPO_4$ (hydrated or not), quartz powder, hydrochloric magnesium carbonate, alumina, chrome, phosphorous and brominated flame retardants, antimony trioxide, silicone, and blends thereof.

111. The composition of claim 1 wherein the filler is selected from the group consisting of glass fibers (long or short), carbon fibers, and natural and synthetic polymer fibers.

112. The composition of claim 1 wherein the filler is selected from the group consisting of polyethylene terephthalate (PET) fibers and rayon fibers.

113. The composition of claim 1 wherein the filler is selected from the group consisting of clays comprising one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

114. The composition of claim 1 wherein the filler is selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and florine mica.

115. The composition of claim 1 wherein the filler is a nano-clay with mean particle diameter of less than 1 micron.

116. The composition of claim 1 wherein the composition further comprises a slip agent, present at 0.001 to 0.5 wt % based upon the weight of the composition.

117. The composition of claim 1 wherein the composition further comprises a slip agent selected from the group consisting of magnesium stearate, calcium stearate, sodium stearate, zinc stearate, calcium oleate, zinc oleate, magnesium oleate, castor oil, corn oil, cottonseed oil, olive oil, rapeseed oil, soybean oil, sunflower oil, glycerol monostearate, pentaerythritol monooleate, oleamide, erucamide, linoleamide, Carbowax, adipic acid, sebacic acid, carnauba wax, microcrystalline wax, polyolefin waxes, polytetrafluoroethylene, fluorine oils, fluorine waxes, silicone oils, polydimethylsiloxane, amino-modified polydimethylsiloxane, palmitamide, stearamide, arachidamide, behenamide, oleamide, erucamide, linoleamide, stearyl stearamide, palmityl palmitamide, stearyl arachidamide, stearamidoethylstearamide, stearamidoethylpalmitamide, palmitamido-ethylstearamide, ethylenebisstearamide, ethylenebisoleamide, stearylerucamide, erucamidoethylerucamide, oleamidoethyloleamide, erucamidoethyloleamide, oleamidoethylerucamide, stearamidoethylerucamide, erucamidoethylpalmitamide, palmitamidoethyloleamide, and N,N'-ethylenebisstearamide).

118. The composition of claim 1 wherein the composition further comprises a tackifier, present at less than 10 wt % based upon the weight of the composition.

119. The composition of claim 1 wherein the composition further comprises a nucleating agent, present at 0.01 to 1 wt % based upon the weight of the composition.

120. The composition of claim 1 wherein the composition further comprises a nucleating agent selected from the group consisting of silica, kaolin, carbon black, and talc; sodium salts, lithium salts, potassium salts, phosphonic acid salts, carboxylate salts, and aromatic carboxylic-acid salts; sodium phosphates, phosphate esters, and phosphate ester salts, metal salts of suberic acid, metal salts of hexahydrophthalic acid; salts of disproportionated rosin esters; sorbitol, dibenzylidene sorbitol, sorbitol acetal, and sorbitol di-acetal,; quinacridone dyes, naphthalene carboxamide; benzenetrisamide, 1,3,5-benzenetrisamide, trimesic acid, poly(3-methyl-1-butene), poly(dimethylstyrene), poly(ethylene terephthalate), polyamides (nylons), and polycarbonates.

121. The composition of claim 1 wherein the composition further comprises a nucleating agent selected from the group consisting of sodium benzoate, sodium naphthenoate, sodium 2,2' -methylenebis(4,6-di-tert-butylphenyl) phosphate, aluminum 2,2'-methylenebis(4,6-di-tert-butylphenyl) phosphate, di(p-tolylidene) sorbitol, dibenzylidene sorbitol, di(p-methylbenzylidene) sorbitol, di(p-ethylbenzylidene) sorbitol, bis(3,4-dimethylbenzylidene) sorbitol, N',N'-dicyclohexyl-2,6-naphthalenedicarboxamide, 1,3:2,4-dibenzylidenesorbitol, 1,3:2,4-bis-(p-methylbenzylidene)sorbitol, 1,3:2,4-bis(3,4-dimethylbenzylidene)sorbitol, and 2.2.1-heptane-bicyclodicarboxylic acid, 2,2'-methylenebis(4,6-di-tertbutylphenol) phosphate salt, and 2,2'-methylenebis(4,6-di-tertbutylphenol) phosphate aluminum complex, 1,3:2,4-bis-(p-ethylbenzylidene)sorbitol; N,N'-dicyclohexyl-2,6-naphathalene dicarboxamide], N,N'-dicyclohexyl-2,6-naphathalene diczroxamide, 1,3:2,4-dibenzylidenesorbitol, 1,3:2,4-bis-(p-methylbenzylidene)sorbitol; (1,3:2,4) dimethyldibenylidene sorbitol, and sorbitol.

122. The composition of claim 1 wherein the composition further comprises a nucleating agent selected from the group consisting of 1,3:2,4-bis(3,4-dimethylbenzylidene)sorbitol, 2.2.1-heptane-bicyclodicarboxylic acid, 1,3:2,4-bis-(p-methylbenzylidene)sorbitol, 2,2'-methylenebis(4,6-di-tertbutylphenol) phosphate salt, and sodium benzoate.

123. An article comprising the composition of claim 1.

124. A molded automotive part comprising the composition of claim 1.

125. The article of claim 123 where the article is selected from the group consisting of films, tapes, sheets, fibers, tubing, pipes, coatings, fabrics (woven and nonwoven), tarps, agricultural barriers, packaging (durable and disposable), household appliances, washing machines, refrigerators, blenders, air conditioners, furniture (indoor and outdoor), tables, chairs, benches, shelving, sporting equipment, skis, surfboards, skateboards, skates, boots, sleds, scooters, kayaks, paddles, solid wheels, stadium seating, amusement park rides, personal protective equipment, safety helmets, shin guards, emergency response equipment, cookware, utensils, trays, pallets, carts, tanks, tubs, pond liners, storage containers, crates, pails, jars, bottles, toys, child car seats and booster chairs, medical devices, sportswear, luggage, tool housings, electronics housings, building construction materials, flooring, siding, roofing, counter tops, electrical housings and connectors, lighting, gardening equipment, handles on shovels, handles on wheelbarrows, playground equipment, motor housings, pump housings, battery housings, instrument housings, switches, knobs, buttons, handles, pet supplies, laboratory supplies, personal hygiene devices, razors, brushes, hairdryers, cleaning supplies, brooms, dust pans, musical instrument cases, statues, trophies, artwork, costume jewelry, picture frames, eyeglass frames, plant pots, firearm components, and automotive components.

126. The article of claim 123 where the article is selected from the group consisting of bumpers, bumper fascias; exterior body panels, door panels, grills, exterior trim, body side moldings, side cladding, side molding, end caps, hoods, deck lids, mirror housings, roof racks, wheel covers, wheel liners, wheel flares, fender liners, hub caps, running boards, step pads, sill plates, air dams, splash shields, mud guards, bed liners, and rocker panels; fuel tanks; interior trim, including steering column covers, consoles, door panels, pillars, supports, knobs, buttons, handles, safety screens, instrument panels, dash boards, knee bolsters; passenger side airbag covers, headliners, glove boxes, trays, cup holders, compartments, lids, seat components, backs, supports, safety belt securing devices, under-hood parts, battery trays, fan shrouds, electrical housings; cable bearings, structural components, door carriers, truck bed separators, load floors, and trunk dividers.

127. A vehicle comprising the composition of claim 1 wherein the vehicle is selected from the group consisting of cars, trucks, buses, boats, all terrain vehicles, personal water craft, golf carts, snowmobiles, motorcycles, mopeds, tractors, mowers, wagons, bicycles, airplanes, helicopters, trains, military machines, and gondolas.

128. An article comprising the composition of claim 1 wherein the article has at least one overall dimension greater than 30 cm.

129. An article comprising the composition of claim 1 wherein the article has as a length greater than 30 cm.

130. An automotive part comprising the composition of claim 1 wherein the article has as a length greater than 30 cm.

131. A process to prepare the composition of claim 1 by combining the components in an extruder.

132. A process to prepare a molded part comprising heating the composition of claim 1, then introducing the heated composition into a mold and thereafter cooling the composition and removing it from the mold.

133. The composition of claim 1 wherein naphthenic and aromatic mineral oils are substantially absent.

134. The composition of claim 1 wherein paraffinic mineral oils with a kinematic viscosity at 40° C. of less than 80 cSt and a pour point of greater than −15° C. are substantially absent.

135. The composition of claim 1 wherein the composition has a flow mark visibility rating of 3 or less.

136. The composition of claim 1 wherein the composition has a scratch resistance rating of 3 N or more.

137. The composition of claim 1 wherein the non-functionalized plasticizer comprises a mixture of paraffins has two or more of the following properties:

1) a naphthenic content of less than 40 wt %, based on the total weight of the paraffin mixture; and/or
2) a normal paraffins content of less than 5 wt %, based on the total weight of the paraffin mixture; and/or
3) an aromatic content of 1 wt % or less, based on the total weight of the paraffin mixture; and/or
4) a saturates level of 90 wt % or higher; and/or
5) a percentage of carbons in chain-type paraffinic structures ($C_p$) of 80% or more; and/or
6) a branched paraffin:normal paraffin ratio greater than about 10:1; and/or
7) sidechains with 4 or more carbons making up less than 10% of all sidechains; and/or
8) sidechains with 1 or 2 carbons making up at least 50% of all sidechains; and/or
9) a sulfur content of 300 ppm or less (weight basis); and/or
10) a nitrogen content of 300 ppm or less (weight basis).

138. The composition of claim 1 wherein the non-functionalized plasticizer comprises a mixture of paraffins has two or more of the following properties:

1) a number-average molecular weight of 300 to 1800 g/mol; and/or
2) a kinematic viscosity at 40° C. of 10 cSt or more; and/or
3) a kinematic viscosity at 100° C. ranging from 2 to 50 cSt; and/or
4) a viscosity index (VI) of 80 or greater; and/or
5) a pour point of −5° C. or lower; and/or
6) a flash point of 200° C. or more; and/or
7) a specific gravity of 0.86 or less; and/or
8) an aniline point of 120° C. or more; and/or
9) a bromine number of 1 or less.

139. A vehicle replacement part comprising the composition of claim 1.

* * * * *